US012335550B2

(12) United States Patent
Hong et al.

(10) Patent No.: US 12,335,550 B2
(45) Date of Patent: *Jun. 17, 2025

(54) HUB DEVICE, MULTI-DEVICE SYSTEM INCLUDING THE HUB DEVICE AND PLURALITY OF DEVICES, AND OPERATING METHOD OF THE HUB DEVICE AND MULTI-DEVICE SYSTEM

(71) Applicant: SAMSUNG ELECTRONICS CO., LTD., Suwon-si (KR)

(72) Inventors: Jiyeon Hong, Suwon-si (KR); Hyeonmok Ko, Suwon-si (KR); Sungja Choi, Suwon-si (KR); Changho Paeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,357

(22) Filed: Dec. 27, 2023

(65) Prior Publication Data

US 2024/0129567 A1 Apr. 18, 2024

Related U.S. Application Data

(63) Continuation of application No. 17/085,565, filed on Oct. 30, 2020, now Pat. No. 11,930,230.

(30) Foreign Application Priority Data

Nov. 1, 2019 (KR) .................. 10-2019-0138767
May 29, 2020 (KR) .................. 10-2020-0065181

(51) Int. Cl.
*H04N 5/445* (2011.01)
*H04N 21/236* (2011.01)
(Continued)

(52) U.S. Cl.
CPC ..... *H04N 21/25891* (2013.01); *H04N 21/236* (2013.01); *H04N 21/24* (2013.01); *H04N 21/262* (2013.01)

(58) Field of Classification Search
CPC .......... H04N 21/25891; H04N 21/236; H04N 21/24; H04N 21/262; H04N 21/42203;
(Continued)

(56) References Cited

U.S. PATENT DOCUMENTS 9,984,686 B1 * 5/2018 Mutagi .................... G10L 17/22
10,127,908 B1 * 11/2018 Deller .................... H04L 67/306
(Continued)

FOREIGN PATENT DOCUMENTS

CN 110045618 A 7/2019
CN 209433203 U 9/2019
(Continued)

OTHER PUBLICATIONS

Communication dated Feb. 10, 2021 issued by the International Searching Authority in counterpart Application No. PCT/KR2020/015070 (PCT/ISA/220, PCT/ISA/210, and PCT/ISA/237).
(Continued)

*Primary Examiner* — Jefferey F Harold
*Assistant Examiner* — Sahar Aqil Riaz
(74) *Attorney, Agent, or Firm* — Sughrue Mion, PLLC

(57) ABSTRACT

A method, performed by a hub device, of storing a voice assistant model for controlling a device includes receiving information about a first device connected to the hub device, requesting a voice assistant server to update a device determination model stored in the hub device; receiving the updated device determination model from the voice assistant server and storing the received updated device determination model; requesting, from the voice assistant server, information about a function determination model corresponding to
(Continued)

the first device; receiving the information about the function determination model corresponding to the first device from the voice assistant server, and determining whether to store the function determination model in the hub device based on the received information; and based on the function determination model being determined to be stored in the hub device, storing, in the hub device, the function determination model corresponding to the first device.

8 Claims, 20 Drawing Sheets

(51) Int. Cl.
  *H04N 21/24* (2011.01)
  *H04N 21/258* (2011.01)
  *H04N 21/262* (2011.01)
(58) Field of Classification Search
  CPC ........... H04N 21/42204; H04N 21/436; H04N 21/44227; H04N 21/6547; H04N 21/414; G10L 15/22; G10L 15/30; H04L 67/12
  USPC .......................................................... 725/46
  See application file for complete search history.

(56) References Cited

U.S. PATENT DOCUMENTS

| | | | |
|---|---|---|---|
| 10,218,745 B2 | 2/2019 | Na et al. | |
| 10,332,513 B1 | 6/2019 | D'Souza | |
| 10,375,340 B1* | 8/2019 | Dodge | H04N 21/42204 |
| 10,504,513 B1 | 12/2019 | Gray | |
| 10,623,246 B1* | 4/2020 | Iyer | H04L 12/2832 |
| 10,694,442 B2 | 6/2020 | Lee et al. | |
| 10,755,537 B1 | 8/2020 | Palmer | |
| 10,755,706 B2 | 8/2020 | Huang | |
| 10,770,065 B2 | 9/2020 | Kim et al. | |
| 11,217,244 B2 | 1/2022 | Yi | |
| 11,508,378 B2 | 11/2022 | Kim | |
| 11,538,470 B2 | 12/2022 | Kim | |
| 11,695,809 B2 | 7/2023 | Lee | |
| 11,930,236 B2* | 3/2024 | Jeon | H04N 21/42222 |
| 11,949,533 B2 | 4/2024 | Rexach et al. | |
| 2002/0161572 A1* | 10/2002 | Kusumoto | H04N 21/42203 348/E5.103 |
| 2017/0060848 A1 | 3/2017 | Liu | |
| 2018/0068663 A1* | 3/2018 | Choi | G10L 15/30 |
| 2018/0151045 A1 | 5/2018 | Kim | |
| 2018/0174580 A1 | 6/2018 | Kim et al. | |
| 2018/0270731 A1 | 9/2018 | Lee et al. | |
| 2019/0074016 A1 | 3/2019 | Orr et al. | |
| 2019/0182068 A1* | 6/2019 | Gould | H04N 21/4131 |
| 2019/0202062 A1* | 7/2019 | Park | G05D 1/0274 |
| 2019/0260866 A1 | 8/2019 | Choi et al. | |
| 2020/0193994 A1* | 6/2020 | Ahn | G10L 15/22 |
| 2020/0349952 A1* | 11/2020 | Lee | G10L 15/1822 |
| 2021/0012779 A1* | 1/2021 | Mixter | G10L 21/0216 |
| 2021/0065685 A1* | 3/2021 | Hwang | G10L 15/063 |
| 2021/0329165 A1 | 10/2021 | Liu | |
| 2023/0119868 A1* | 4/2023 | Wang | H04N 21/462 725/38 |

FOREIGN PATENT DOCUMENTS

| | | |
|---|---|---|
| EP | 1 293 964 A2 | 3/2003 |
| EP | 1 293 964 A3 | 5/2004 |
| KR | 10-1387928 B1 | 4/2014 |
| KR | 10-2017-0049817 A | 5/2017 |
| KR | 10-2018-0054157 A | 5/2018 |
| KR | 10-2018-0070970 A | 6/2018 |
| KR | 10-2018-0105463 A | 9/2018 |

OTHER PUBLICATIONS

Communication issued Nov. 21, 2021 by the Korean Intellectual Property Office in counterpart Korean Patent Application No. 10-2020-0065181.
Communication dated Apr. 4, 2022 issued by the European Patent Office in application No. 20881858.3.
Communication dated May 25, 2022 issued by the Korean Intellectual Property Office in application No. 10-2020-0065181.
Communication dated May 4, 2023, issued by the European Patent Office in counterpart European Application No. 20881858.3.
Office Action dated Jan. 19, 2024, issued by European Patent Office In European Patent Application No. 20881858.3.
Communication dated Feb. 7, 2025 issued by the European Patent Office in European Patent Application No. 20881858.3.

\* cited by examiner

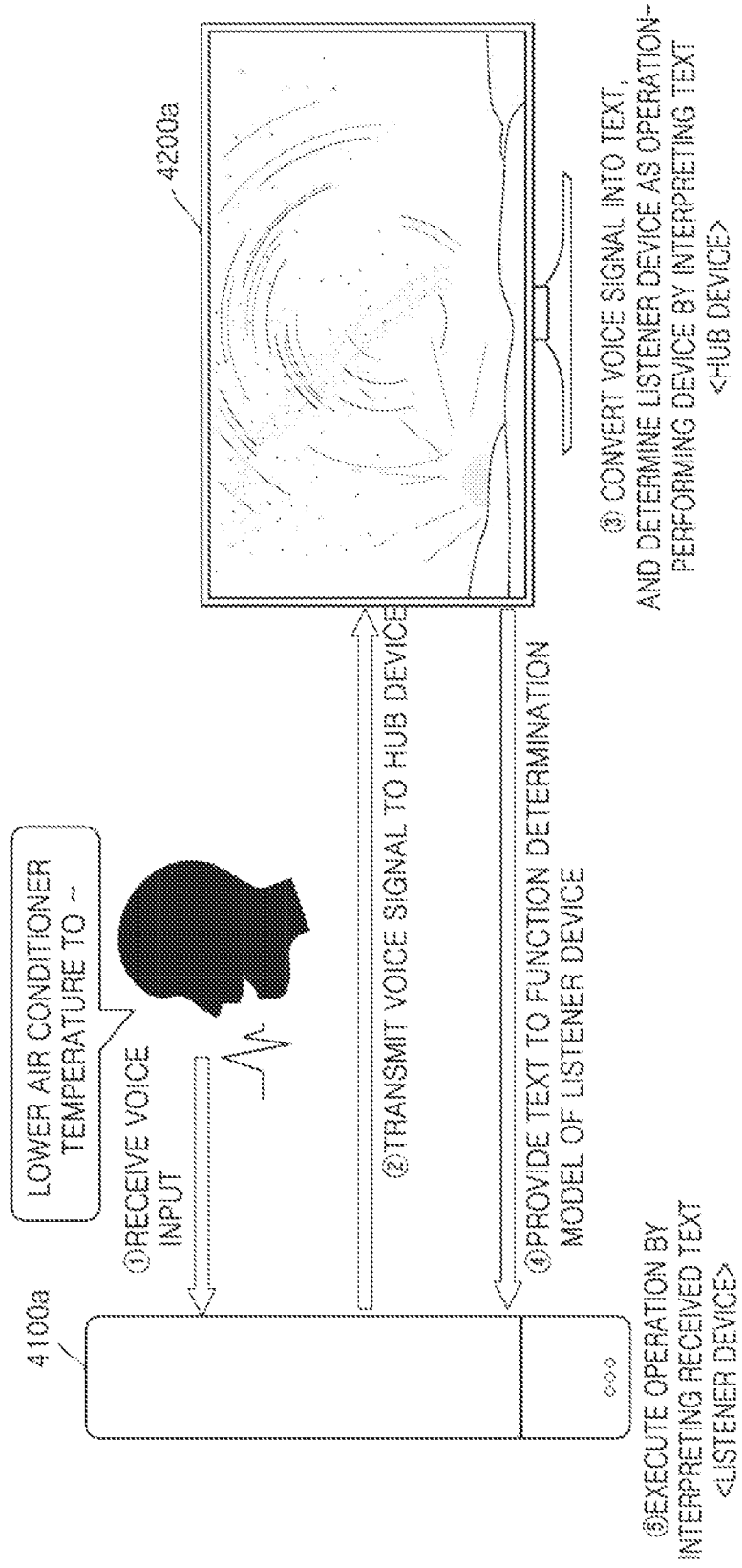

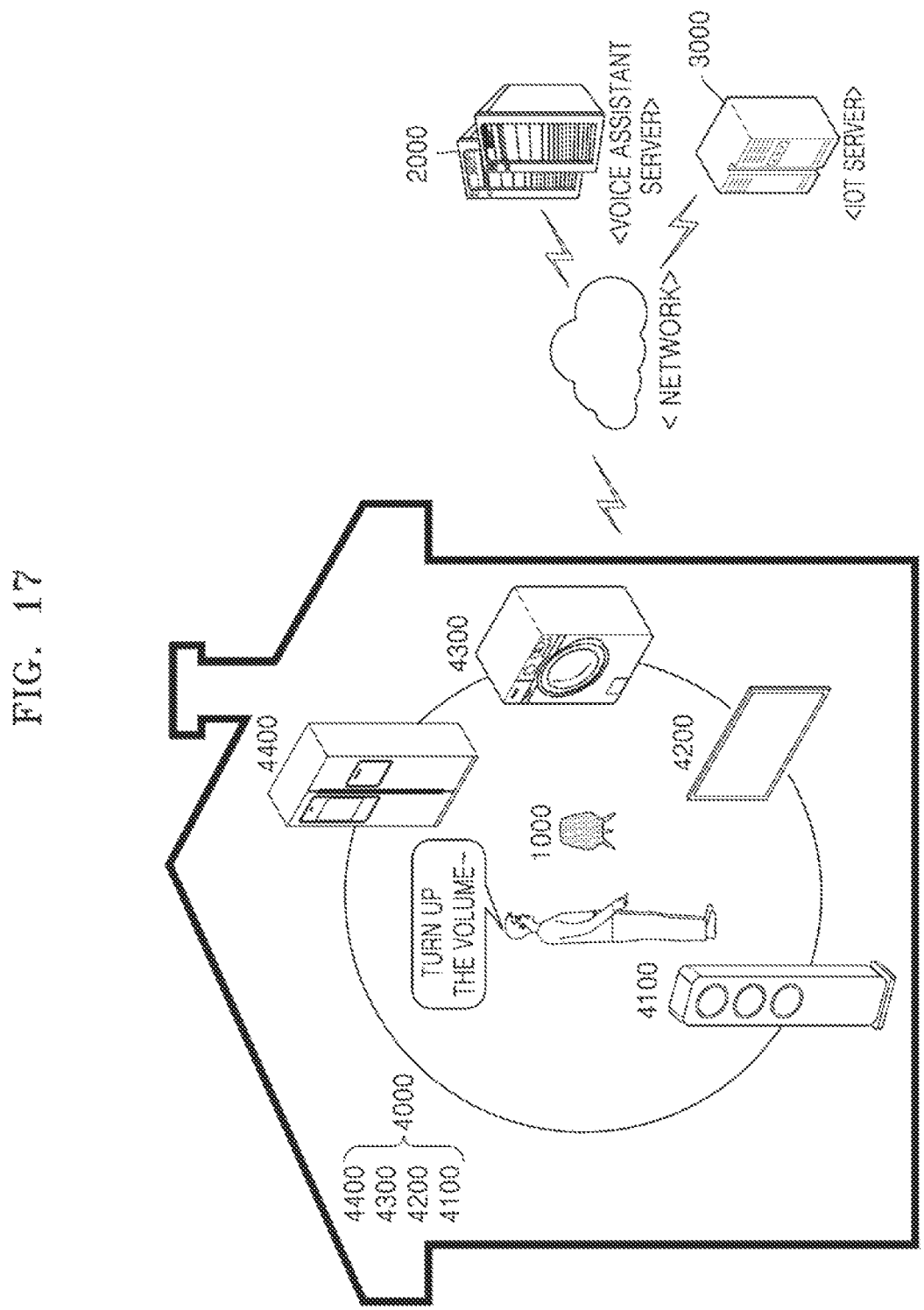

HUB DEVICE, MULTI-DEVICE SYSTEM INCLUDING THE HUB DEVICE AND PLURALITY OF DEVICES, AND OPERATING METHOD OF THE HUB DEVICE AND MULTI-DEVICE SYSTEM

CROSS-REFERENCE TO RELATED APPLICATIONS

This application is a continuation application of U.S. patent application Ser. No. 17/085,565, filed on Oct. 30, 2020, in the U.S. Patent and Trademark Office, which claims priority to Korean Patent Application No. 10-2019-0138767, filed on Nov. 1, 2019, and Korean Patent Application No. 10-2020-0065181, filed on May 29, 2020, in the Korean Intellectual Property Office, the disclosures of which are incorporated by reference herein in their entireties.

BACKGROUND

1. Field

The disclosure relates to a hub device including: an artificial intelligence (AI) model for determining an operation-performing device for performing an operation according to a user's intention based on a voice input received from the user; and an AI model for controlling an operation performed by the determined operation-performing device, in a multi-device environment including the hub device and a plurality of devices, a multi-device system, and an operating method of the hub device and the multi-device system.

2. Description of Related Art

As multimedia technology and network technology have developed, users may receive various services by using devices. In particular, with the development of voice recognition technology, a user may input a voice (e.g., an utterance) to a device and may receive a response message to the input voice through a service providing agent.

However, in a multi-device system such as a home network environment including a plurality of devices, when a user wants to receive a service by using a device other than a client device that interacts through a voice input or the like, the user has to inconveniently select a device to provide the service. In particular, because types of services that may be provided by the plurality of devices are different, there is a demand for technology capable of recognizing an intention included in the voice input of the user and effectively providing a corresponding service.

In order to recognize an intention based on a voice input of a user, artificial intelligence (AI) technology may be used, and rule-based natural language understanding (NLU) technology may also be used. When a voice input of a user is received through a hub device, because the hub device may not directly select a device for providing a service according to the voice input and has to control the device by using a separate voice assistant service-providing server, the user has to pay network usage fees, and because the voice assistant service-providing server is used, a response speed is reduced. In order to solve the above problems, the hub device may adopt an on-device model method by which a voice assistant model for controlling the device for providing the service based on the voice input is stored in an internal memory. However, when the on-device model method is used, the voice assistant model may not be stored due to a capacity of the internal memory of the hub device, a random-access memory (RAM) residual capacity, a processing speed, or the like.

SUMMARY

Provided is a multi-device system including the hub device and a plurality of devices, and an operating method of the hub device and the multi-device system, and more particularly, to a hub device that receives a voice input of a user and stores, in an internal memory of the hub device, at least some of a voice assistant model that automatically determines a device for performing an operation according to the user's intention based on the received voice input and a voice assistant model that provides pieces of information required to perform a service according to the determined device, a multi-device system, and an operating method of the hub device and the multi-device system.

According to an aspect of the disclosure, a method, performed by a hub device, of storing a voice assistant model for controlling a device includes receiving information about a first device connected to the hub device, and after receiving the information about the first device, requesting a voice assistant server to update a device determination model stored in the hub device; receiving the updated device determination model from the voice assistant server and storing the received updated device determination model; requesting, from the voice assistant server, information about a function determination model corresponding to the first device; receiving the information about the function determination model corresponding to the first device from the voice assistant server, and determining whether to store the function determination model in the hub device based on the received information; and based on the function determination model being determined to be stored in the hub device, storing, in the hub device, the function determination model corresponding to the first device.

The method may further include, based on the function determination model being determined not to be stored in the hub device, receiving access information of the function determination model corresponding to the first device.

The access information may include at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

The determining whether to store the function determination model in the hub device may include determining whether to store the function determination model based on a resource state of the hub device and the information about the function determination model corresponding to the first device.

The hub device may be selected by the voice assistant server based on resource state information about each of a plurality of devices pre-registered according to a user account.

The method may further include selecting at least one hub device candidate from among a plurality of devices pre-registered in an Internet of things (IoT) server according to a user account logged into the hub device; selecting one device from among the least one hub device candidate based on use history information and performance information of each of the at least one hub device candidate; and changing the hub device by replacing the hub device with the selected one device from among the at least one hub device candidate.

The selecting of the at least one hub device candidate may include selecting the at least one hub device candidate from among the plurality of devices pre-registered in the IoT server based on at least one of consistency of power supply, computing power, or a power consumption amount of each of the plurality of devices pre-registered in the IoT server.

The selecting of the one device from among the at least one hub device candidate may include obtaining information about a frequency of use of each of the hub device and the at least one hub device candidate, by analyzing a use history log database stored in the hub device; obtaining information about an utterance processing time of each of the hub device and the at least one hub device candidate, by analyzing a performance history log database stored in the hub device; and selecting a device for replacing the hub device, based on the information about the frequency of use and the information about the utterance processing time of each of the hub device and the at least one hub device candidate.

The selecting of the at least one hub device candidate from among the plurality of devices pre-registered in an IoT server may be performed after the receiving of the information about the first device connected to the hub device.

The method may further include receiving a user input that selects one of the plurality of devices pre-registered in the IoT server according to the user account logged into the hub device; and selecting the one device of the plurality of devices pre-registered in the IoT server based on the user input as the hub device.

According to another aspect of the disclosure, a hub device for storing a voice assistant model for controlling a device may include a communication interface configured to perform data communication with at least one of a plurality of devices, a voice assistant server, or an Internet of things (IoT) server; a memory configured to store a program comprising one or more instructions; and a processor configured to execute the one or more instructions of the program stored in the memory to: receive information about a first device connected to the hub device, upon receiving the information about the first device, request the voice assistant server to update a device determination model stored in the memory, and control the communication interface to receive the updated device determination model from the voice assistant server; store the received updated device determination model in the memory; request, from the voice assistant server, information about a function determination model corresponding to the first device, and control the communication interface to receive the information about the function determination model corresponding to the first device from the voice assistant server; determine whether to store the function determination model in the hub device based on the received information; and based on the function determination model being determined to be stored in the hub device, store the function determination model corresponding to the first device in the memory.

The processor may be further configured to execute the one or more instructions to, based on the function determination model being determined not to be stored in the hub device, control the communication interface to receive access information of the function determination model corresponding to the first device.

The access information may include at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

The processor may be further configured to execute the one or more instructions to determine whether to store the function determination model in the memory, based on a resource state of the hub device and the information about the function determination model corresponding to the first device.

The hub device may be selected by the voice assistant server, based on resource state information about each of a plurality of devices pre-registered according to a user account.

The processor may be further configured to execute the one or more instructions to select at least one hub device candidate from among a plurality of devices pre-registered in the IoT server according to a user account logged into the hub device, select one device from among the at least one hub device candidate based on use history information and performance information of each of the at least one hub device candidate, and change the hub device by replacing the hub device with the selected on device from among the at least one hub device candidate.

The processor may be further configured to execute the one or more instructions to select the at least one hub device candidate from among the plurality of devices pre-registered in the IoT server based on at least one of consistency of power supply, computing power, or a power consumption amount of each of the plurality of devices pre-registered in the IoT server.

The device may further include a use history log database storing information about a frequency of use of each of the hub device and the at least one hub device candidate; and a performance history log database storing information about an utterance processing time of each of the hub device and the at least one hub device candidate.

The processor may be further configured to execute the one or more instructions to: obtain the information about the frequency of use of each of the hub device and the at least one hub device candidate by analyzing the use history log database; obtain the information about the utterance processing time of each of the hub device and the at least one hub device candidate by analyzing the performance history log database; and select a device for replacing the hub device, based on the information about the frequency of use and the information about the utterance processing time of each of the hub device and the at least one hub device candidate.

The device may further include a voice inputter configured to receive a voice input of a user that selects one of the plurality of devices pre-registered in the IoT server according to the user account logged into the hub device. The processor may be further configured to execute the one or more instructions to convert the voice input of the user received from the voice inputter into text by performing automatic speech recognition (ASR), and select the one device of the plurality of devices pre-registered in the IoT server according to the voice input of the user as the hub device by interpreting the text by using a natural language understanding (NLU) model.

According to another aspect of the disclosure, a method, performed by a voice assistant server and a hub device, of storing a voice assistant model for controlling a device may include, after receiving information about a first device, requesting, by the hub device, the voice assistant server to update a device determination model stored in the hub device; based on receiving a request to update the device determination model, updating, by the voice assistant server, the device determination model of the hub device; receiving, by the hub device, the updated device determination model from the voice assistant server and storing the received updated device determination model; requesting, by the hub device, information about a function determination model corresponding to the first device from the voice assistant server; obtaining, by the voice assistant server, the information about the function determination model corresponding to the first device; transmitting, by the voice assistant server, the information about the function determination model to the hub device; receiving, by the hub device, the information about the function determination model corresponding to the first device from the voice assistant server; and determining, by the hub device, whether to store the function determination model in the hub device based on the received information.

The method may further include, based on the function determination model being determined to be stored in the hub device, storing, by the hub device, the function determination model corresponding to the first device.

The method may further include, based on the function determination model being determined not to be stored in the hub device, requesting, by the hub device, access information of the function determination model corresponding to the first device from the voice assistant server.

The access information may include at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

The hub device may be selected by the voice assistant server, based on resource state information about each of a plurality of devices pre-registered according to a user account.

According to another aspect of the disclosure, a system may include a hub device and a voice assistant server. The hub device may include a communication interface configured to perform data communication with the voice assistant server; a memory configured to store a program comprising one or more instructions; and a processor configured to execute the one or more instructions of the program stored in the memory to: control the communication interface to receive information about a first device and request the voice assistant server to update a device determination model pre-stored in the memory; receive the updated device determination model from the voice assistant server, and store the received updated device determination model in the memory; request, from the voice assistant server, information about a function determination model corresponding to the first device, and control the communication interface to receive the information about the function determination model corresponding to the first device from the voice assistant server; and determine whether to store the function determination model in the hub device based on the received information. The voice assistant server may be configured to, based on a request to update the device determination model being received from the hub device, update the device determination model pre-stored in the hub device, obtain the information about the function determination model corresponding to the first device, and transmit the obtained information to the hub device.

The processor may be further configured to execute the one or more instructions to, based on the function determination model being determined to be stored in the hub device, store the function determination model corresponding to the first device in the memory.

The processor may be further configured to execute the one or more instructions to, based on the function determination model being determined not to be stored in the hub device, request, from the voice assistant server, access information of the function determination model corresponding to the first device, and control the communication interface to receive the access information from the voice assistant server.

The access information may include at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

The hub device may be selected by the voice assistant server, based on resource state information about each of a plurality of devices pre-registered according to a user account.

BRIEF DESCRIPTION OF THE DRAWINGS

The above and other aspects and features of certain embodiments of the present disclosure will be more apparent from the following description taken in conjunction with the accompanying drawings, in which like reference numerals denote like structural elements, and in which:

FIG. 12A is a conceptual diagram of a hub device and a listener device, according to an embodiment;

FIG. 17 is a diagram of a multi-device system environment including a hub device, a voice assistant server, and a plurality of devices according to an embodiment;

DETAILED DESCRIPTION

Figure 1:
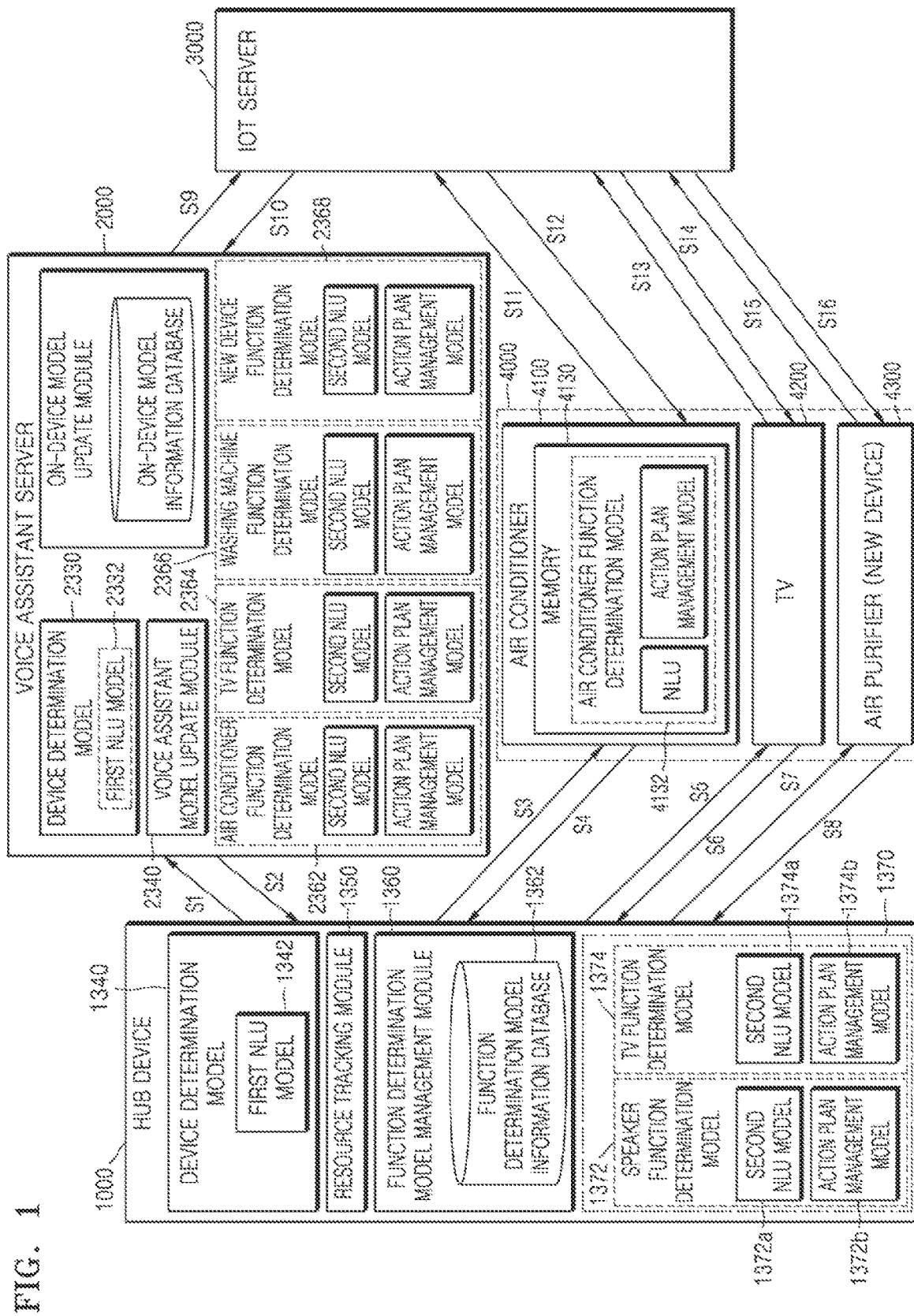
FIG. 1 is a block diagram of a multi-device system including a hub device, a voice assistant server, an Internet of things (IoT) server, and a plurality of devices, according to an embodiment.

Although the terms used herein are selected from among common terms that are currently widely used in consideration of their functions in the disclosure, the terms may vary according the intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used herein are not merely designations of the terms, but the terms are defined based on the meaning of the terms and content throughout the disclosure.

As used herein, the singular forms "a," "an," and "the" are intended to include the plural forms as well, unless the context clearly indicates otherwise. The terms including technical and scientific terms used herein may have the same meaning as commonly understood by one of ordinary skill in the art to which the disclosure belongs.

Throughout the disclosure, the expression "at least one of a, b or c" indicates only a, only b, only c, both a and b, both a and c, both b and c, all of a, b, and c, or variations thereof.

Throughout the present application, when a part "includes" an element, it is to be understood that the part additionally includes other elements rather than excluding other elements as long as there is no particular opposing recitation. Also, the terms such as " . . . unit," " . . . module," or the like used herein indicate a unit, which processes at least one function or operation, and the unit may be implemented as hardware or software, or a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in hardware. Instead, in some cases, the expression "system configured to . . . " may mean that the system is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

A 'first natural language understanding (NLU) model' used herein is a model trained to analyze text converted from a voice input and determine an operation-performing device based on an analysis result. The first NLU model may be used to determine an intent by interpreting the text and determine the operation-performing device based on the intent.

A 'second NLU model' used herein is a model trained to analyze text related to a specific device. The second NLU model may be a model trained to obtain operation information about an operation to be performed by the specific device by interpreting at least part of the text. A storage capacity of the second NLU model may be greater than a storage capacity of the first NLU model.

A 'voice assistant model' used herein may include a device determination model and a function determination model. A 'device determination model' is a model trained to determine an operation-performing device from among a plurality of devices pre-registered according to a user account, based on a text analysis result of a first NLU model. The device determination model may include the first NLU model. A 'function determination model' is a model used to obtain operation information about detailed operations for performing an operation according to a determined function of a device and a relationship between the detailed operations. The function determination model may include a second NLU model and an action plan management model.

An 'action plan management model' used herein may be a model trained to manage operation information related to a detailed operation of a device in order to generate detailed operations to be performed by an operation-performing device and an execution order of the detailed operations. The action plan management model may manage operation information about detailed operations of devices according to device types and a relationship between the detailed operations.

An 'intent' used herein is information indicating a user's intention determined by interpreting text. The intent that is information indicating the user's utterance intention may be information indicating an operation of an operation-performing device requested by the user. The intent may be determined by interpreting the text by using an NLU model. For example, when the text converted from a voice input of the user is "play the movie Avengers on TV", the intent may be "content playback". Alternatively, when the text converted from a voice input of the user is "lower the air conditioner temperature to 18° C.", the intent may be "temperature control".

The intent may include not only the information indicating the user's utterance intention (hereinafter, referred to as intention information) but also a numerical value corresponding to the information indicating the user's intention. The numerical value may indicate a probability that the text is related to information indicating a specific intention. After the text is interpreted by using the NLU model, when a plurality of pieces of intention information indicating the user's intention are obtained, intention information having a largest numerical value from among a plurality of numerical values corresponding to the plurality of pieces of intention information may be determined as the intent.

The term 'operation' of a device used herein may refer to at least one action performed by the device when the device executes a specific function. The operation may indicate at least one action performed by the device when the device executes an application. For example, the operation may indicate, for example, video playback, music playback, email creation, weather information reception, news information display, game play, and photography performed when the device executes the application. However, the operation is not limited to the above examples.

The operation of the device may be performed based on information about a detailed operation output from an action plan management model. The device may perform at least one action by executing a function corresponding to the detailed operation output from the action plan management model. The device may store instructions for executing the function corresponding to the detailed operation, and when the detailed operation is determined, the device may determine instructions corresponding to the detailed operation and may execute a specific function by executing the instructions.

Also, the device may store instructions for executing an application corresponding to the detailed operation. The instructions for executing the application may include instructions for executing the application itself and instructions for executing a detailed function constituting the application. When the detailed operations is determined, the device may execute the application by executing the instructions for executing the application corresponding to the detailed operation, and may execute the detailed function by executing the instructions for executing the detailed function of the application corresponding to the detailed operation.

'Operation information' used herein may be information related to detailed operations to be determined by a device, a relationship between each of the detailed operations and another detailed operation, and an execution order of the detailed operations. The relationship between each of the detailed operations and another detailed operation includes, when a first operation is to be executed, information about a second operation that has to be executed before the first operation is executed. For example, when an operation to be performed is "music playback", "power on" may be another detailed operation that has to be executed before "music playback" is performed. The operation information may include, but is not limited to, functions to be executed by an operation-performing device to perform a specific operation, an execution order of the functions, an input value required to execute the functions, and an output value output as an execution result of the functions.

The term 'operation-performing device' used herein refers to a device determined to perform an operation based on an intent obtained from text from among a plurality of devices. The text may be analyzed by using a first NLU model, and the operation-performing device may be determined based on an analysis result. The operation-performing device may perform at least one action by executing a function corresponding to a detailed operation output from an action plan management model. The operation-performing device may perform an operation based on operation information.

An 'Internet of things (IoT) server' used herein is a server that obtains, stores, and manages device information about each of a plurality of devices. The IoT server may obtain, determine, or generate a control command for controlling the device by using the stored device information. The IoT server may transmit the control command to the device determined to perform an operation based on operation information. The IoT server may be implemented as, but not limited to, a hardware device independent of a 'server' of the disclosure. The IoT server may be an element of a 'voice assistant server' of the disclosure, or may be a server designed to be classified as software.

Hereinafter, embodiments of the disclosure will be described in detail with reference to the attached drawings in order to enable one of ordinary skill in the art to easily embody and practice the disclosure. The disclosure may, however, be embodied in many different forms and should not be construed as being limited to the embodiments of the disclosure set forth herein.

Reference will now be made in detail to embodiments of the disclosure, examples of which are illustrated in the accompanying drawings.

FIG. 1 is a block diagram of a multi-device system including a hub device 1000, a voice assistant server 2000, an IoT server 3000, and a plurality of devices 4000 according to an embodiment.

In FIG. 1, for convenience of explanation, only essential elements for describing operations of the hub device 1000, the voice assistant server 2000, the IoT server 3000, and the plurality of devices 4000 are illustrated. Elements included in the hub device 1000, the voice assistant server 2000, the IoT server 3000, and the plurality of devices 4000 are not limited to those illustrated in FIG. 1.

Reference numerals S1 through S16 marked by arrows in FIG. 1 denote data movement, transmission, and reception between a plurality of entities through a network. Numbers attached to the English letter S in S1 through S16 are for identification and are not related to an order of data movement, transmission, and reception.

Referring to FIG. 1, the hub device 1000, the voice assistant server 2000, the IoT server 3000, and the plurality of devices 4000 may be connected to one another by using a wired or wireless communication method and may perform communication. In an embodiment, the hub device 1000 and the plurality of devices 4000 may be directly connected to each other through a communication network, but the disclosure is not limited thereto. The hub device 1000 and the plurality of devices 4000 may be connected to the voice assistant server 2000, and the hub device 1000 may be connected to the plurality of devices 4000 through the voice assistant server 2000. Also, the hub device 1000 and the plurality of devices 4000 may be connected to the IoT server 3000. In another embodiment, each of the hub device 1000 and the plurality of devices 4000 may be connected to the voice assistant server 2000 through a communication network, and may be connected to the IoT server 3000 through the voice assistant server 2000.

The hub device 1000, the voice assistant server 2000, the IoT server 3000, and the plurality of devices 4000 may be connected through a local area network (LAN), a wide area network (WAN), a value-added network (VAN), a mobile radio communication network, a satellite communication network, or a combination thereof. Examples of the wireless communication method may include, but are not limited to, Wi-Fi, Bluetooth, Bluetooth low energy (BLE), Zigbee, Wi-Fi Direct (WFD), Ultra-wideband (UWB), Infrared Data Association (IrDA), and Near-Field Communication (NFC).

The hub device 1000 is a device that receives a voice input of a user and controls at least one of the plurality of devices 4000 based on the received voice input. The hub device 1000 may be a listener device that receives the voice input from the user. For example, the hub device 1000 may be, but is not limited to, a voice assistant speaker.

The hub device 1000 may be selected by the voice assistant server 2000, based on resource state information about each of a plurality of devices pre-registered in the IoT server 3000 according to a user account.

At least one of the plurality of devices 4000 may be an operation-performing device that performs a specific operation by receiving a control command of the hub device 1000 or the IoT server 3000. The plurality of devices 4000 may be devices that are logged in by using the same user account as a user account of the hub device 1000 and are pre-registered in the IoT server 3000 by using the user account of the hub device 1000. However, the disclosure is not limited thereto, and the plurality of devices 4000 may include a new device 4300 newly registered in the IoT server 3000 according to the user account. The new device 4300 may be a device that is newly obtained by the user of the hub device 1000, and is registered in the IoT server 3000 by being logged in by using the same user account as that of the hub device 1000 and other devices (e.g., a first device 4100 and a second device 4200).

At least one of the plurality of devices 4000 may receive the control command from the IoT server 3000 (S12, S14, and S16), or may receive at least part of text converted from the voice input from the hub device 1000 (S3 and S5). At least one of the plurality of devices 4000 may receive the control command from the IoT server 3000 (S12, S14, and S16) without receiving the at least part of the text from the hub device 1000.

The hub device 1000 may include a device determination model 1340 that determines a device for performing an operation based on the voice input of the user. The device determination model 1340 may determine an operation-performing device from among the plurality of devices 4000 that are registered according to the user account. In an embodiment, the hub device 1000 may receive, from the voice assistant server 2000, device information including at least one of identification information of each of the plurality of devices 4000 (e.g., device id information), a device type of each of the plurality of devices 4000, a function execution capability of each of the plurality of devices 4000, position information, or state information (S2). The hub device 1000 may determine the device for performing the operation according to the voice input of the user from among the plurality of devices 4000 based on the received device information, by using data about the device determination model 1340.

In another embodiment, the hub device 1000 may directly receive, from a plurality of devices, device information including at least one of identification information of each of the plurality of devices 4000 (e.g., device id information), a device type of each of the plurality of devices 4000, a function execution capability of each of the plurality of devices 4000, position information, or state information. The hub device 1000 may identify a plurality of devices connected to an access point connected to the hub device 1000, and may obtain the device information by requesting the identified plurality of devices for the device information. In this case, the plurality of devices may include a SW module configured to transmit the device information according to a request of the hub device 1000. Also, the hub device 1000 may obtain the device information by receiving the device information transmitted by the plurality of devices. In this case, the plurality of devices may include a SW module configured to identify the hub device 1000 connected to the access point connected to the plurality of devices and a SW module configured to transmit the device information to the identified hub device 1000.

When the hub device 1000 obtains information about a new device (first device) connected to the hub device 1000, the hub device 1000 may request the voice assistant server 2000 to update a device determination model stored in the hub device 1000. In an embodiment, the hub device 1000 may analyze text related to the new device from a voice input of the user based on device information of the new device received from the IoT server 3000, and may transmit a query signal for requesting to update the device determination model stored in a memory 1300 (see FIG. 2) to the voice assistant server 2000 to determine the new device as an operation-performing device. In this case, the hub device 1000 may transmit at least user account information and identification information of the hub device 1000 (e.g., id information of the hub device 1000) along with the query signal to the voice assistant server 2000.

The hub device 1000 receives the updated device determination model from the voice assistant server 2000 in response to the request of the hub device 1000, and stores the received updated device determination model. In an embodiment, the hub device 1000 may analyze the voice input of the user about the new device, may download the updated device determination model from the voice assistant server 2000 to determine the new device as an operation-performing device as an analysis result, and may store the updated device determination model in the memory 1300 (see FIG. 2) inside the hub device 1000.

Also, a function determination model corresponding to the operation-performing device determined by the hub device 1000 may be stored in the memory 1300 (see FIG. 2) of the hub device 1000, may be stored in the operation-performing device itself, or may be stored in a memory 2300 (see FIG. 3) of the voice assistant server 2000. The memory 1300 of the hub device 1000 is a nonvolatile memory. The nonvolatile memory refers to a memory medium that may store and retain information even when power is not supplied and may use stored information when power is supplied, and may include at least one of, for example, a flash memory, a hard disk, a solid state drive (SSD), a multimedia card micro type, a card-type memory (e.g., an SD or XD memory), a read-only memory (ROM), a magnetic memory, a magnetic disk, or an optical disk. The term 'function determination model' corresponding to each device refers to a model used to obtain operation information about detailed operations for performing an operation according to a determined function of the device and a relationship between the detailed operations.

The hub device 1000 may monitor resource states of the hub device 1000 and the plurality of devices 4000 and may obtain resource state information, by using a resource tracking module 1350. The resource state information includes information related to usage states of processors 1200, 4120, 4220, and 4320 and memories 1300, 4130, 4230, and 4330 of the hub device 1000 and the plurality of devices 4000. The resource state information may include at least one of, for example, residual capacity, average RAM usage capacity, or average processor occupancy information of the memories 1300, 4130, 4230, and 4330 of the hub device 1000 and the plurality of devices 4000. The resource tracking module 1350 may provide the obtained resource state information to a function determination model management module 1360.

The hub device 1000 may determine whether to store and process a function determination model 1370 in the memories 1300, 4130, 4230, and 4330 of the hub device 1000 and the plurality of devices 4000, by using the function determination model management module 1360. When there are a plurality of function determination models 1370, the hub device 1000 may determine whether to store and process each of the plurality of function determination models 1370 in the memories 1300, 4130, 4230, and 4330 of the hub device 1000 and the plurality of devices 4000. The function determination model management module 1360 may compare information (e.g., capacity information) of a function determination model received from the voice assistant server 2000 with the resource state information received from the resource tracking module 1350 and may analyze the compared information. The function determination model management module 1360 may determine whether to download the function determination model from the voice assistant server 2000 and store the function determination model in the memories 1300, 4130, 4230, and 4330 of the hub device 1000 and the plurality of devices 4000, by using a comparison/analysis result.

In an embodiment, based on the function determination model management module 1360 determines to download the function determination model from the voice assistant server 2000 and store the function determination model in the memory 1300, the hub device 1000 may transmit a query for requesting the voice assistant server 2000 to transmit the function determination model, may receive the function determination model from the voice assistant server 2000, and may store the function determination model in the memory 1300.

In another embodiment, based on the function determination model management module 1360 determining to download the function determination model from the voice assistant server 2000 and store the function determination model in the memory 4130, 4230, or 4330 of at least one of the plurality of devices 4000 other than the hub device 1000, the hub device 1000 may transmit a query for requesting the voice assistant server 2000 to transmit the function determination model, may receive the function determination model from the voice assistant server 2000, and may transmit the function determination model to at least one of the plurality of devices 4000. The voice assistant server 2000 may transmit the function determination model to at least one of the plurality of devices 4000 other than the hub device 1000.

In another embodiment, based on the function determination model management module 1360 determining not to download the function determination model from the voice assistant server 2000, the hub device 1000 may receive access information of the function determination model pre-stored in the voice assistant server 2000 and may store the received access information in a function determination model information database 1362.

The function determination model information database 1362 may store capacity information and access information of a function determination model corresponding to a device that is newly registered or is registered by using the same user account as that of the hub device 1000 from among a plurality of function determination models 2362, 2364, 2366, and 2368 that are pre-stored in the voice assistant server 2000. The access information may include at least one of identification information (e.g., server id) of the voice assistant server 2000 storing each function determination model, position information, Internet protocol (IP) address information, a media access control (MAC) address, application programming interface (API) information accessible to each function determination model in the voice assistant server 2000, a use language of each function determination model, or identification information of a corresponding device.

In an embodiment, when a new device is registered by using the user account, the hub device 1000 receives information (e.g., capacity information) about a function determination model corresponding to the new device from the voice assistant server 2000, by using the function determination model management module 1360. The hub device 1000 may determine whether to download the function determination model from the voice assistant server 2000 and store the function determination model in the memory 1300 (see FIG. 2), based on the received information about the function determination model. Based on the function determination model being determined to be stored in the memory 1300, the hub device 1000 may download the function determination model corresponding to the new device from the voice assistant server 2000 and may store the function determination model in the memory 1300. Based on the function determination model being determined not to be stored, the hub device 1000 may store access information of the function determination model corresponding to the new device in the function determination model information database 1362.

The hub device 1000 may determine a function of the hub device 1000 itself, and may store a first function determination model 1372 for performing an operation according to the determined function and a second function determination model 1374 corresponding to at least one of the plurality of devices 4000. For example, when the hub device 1000 is a voice assistant speaker, the hub device 1000 may store the first function determination model 1372 (e.g., speaker function determination model) used to obtain operation information about detailed operations for performing a function of the hub device 1000 and a relationship between the detailed operations. Alternatively, the hub device 1000 may store the second function determination model 1374 (e.g., TV function determination model) used to obtain operation information about detailed operations corresponding to a TV and a relationship between the detailed operations. The TV may be a device pre-registered in the IoT server 3000 by using the same user account as the user account of the hub device 1000.

The first function determination model 1372 (e.g., speaker function determination model) and the second function determination model 1374 (e.g., TV function determination model) may respectively include second NLU models 1372a and 1374a and action plan management models 1372b and 1374b. The second NLU models 1372a and 1374a and the action plan management models 1372b and 1374b will be described in detail with reference to FIG. 2.

The voice assistant server 2000 may determine an operation-performing device for performing an operation intended by the user, based on text received from the hub device 1000. The voice assistant server 2000 may receive user account information from the hub device 1000 (S1). When the voice assistant server 2000 receives the user account information from the hub device 1000, the voice assistant server 2000 may transmit, to the IoT server 3000, a query for requesting device information about the plurality of devices 4000 that are pre-registered according to the received user account information (S9), and may receive the device information about the plurality of devices 4000 from the IoT server 3000 (S10). The device information may include at least one of identification information (e.g., device id information) of each of the plurality of devices 4000, a device type of each of the plurality of devices 4000, a function execution capability of each of the plurality of devices 4000, position information, or state information. The voice assistant server 2000 may transmit the device information received from the IoT server 3000 to the hub device 1000 (S2).

The voice assistant server 2000 may include a device determination model 2330, a voice assistant model update module 2340, an on-device model update module 2350, and the plurality of function determination models 2362, 2364, 2366, and 2368. The voice assistant server 2000 may select a function determination model corresponding to at least part of the text received from the hub device 1000 from among the plurality of function determination models 2362, 2364, 2366, and 2368 by using the device determination model 2330, and may obtain operation information for performing an operation of the operation-performing device by using the selected function determination model. The voice assistant server 2000 may transmit the operation information to the IoT server 3000 (S9).

The voice assistant server 2000 may update a voice assistant model, by using the voice assistant model update module 2340. When a new device is newly registered by using a user account in the IoT server 3000 or a new function is added to an existing device, the voice assistant server 2000 may update the device determination model 2330 and the function determination model 2368 by using the voice assistant model update module 2340. For example, when the function determination model 2364 corresponding to the second device 4200 is updated, for example, when a function of the second device 4200 is added or changed, the voice assistant model update module 2340 may update the device determination model 2330 to a new model through learning or the like so that the device determination model 2330 determines the second device 4200 as an operation-performing device related to the updated function by interpreting the updated function. In an embodiment, the voice assistant model update module 2340 may update a first NLU model 2332 to a new model through learning or the like so that the first NLU model 2332 of the device determination model 2330 interprets text related to the newly updated function.

Figure 3:
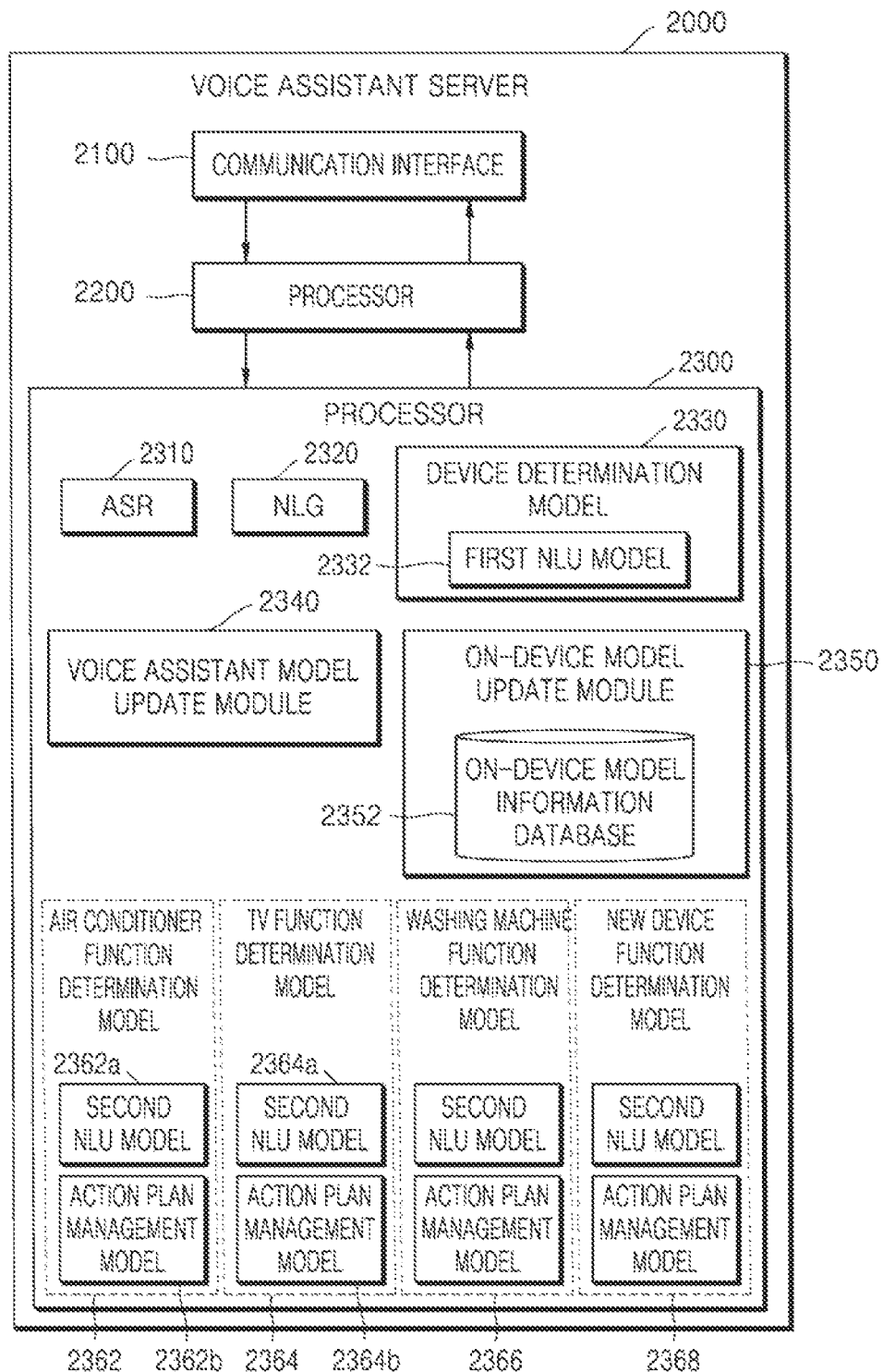
FIG. 3 is a block diagram of a voice assistant server according to an embodiment.

For example, when the new device 4300 is registered by using a user account in the IoT server 3000, the voice assistant model update module 2340 may receive identification information of the new device 4300 and the function determination model 2368 corresponding to the new device 4300 from the IoT server 3000, and may additionally store the received function determination model 2368 in the function determination models 2362, 2364, and 2366 in the memory 2300 (see FIG. 3). The voice assistant model update module 2340 may update the device determination model 2330 to a new model through learning or the like so that the device determination model 2330 interprets an intent from text and determines the new device 4300 as an operation-performing device related to the intent as an interpretation result. In an embodiment, the voice assistant model update module 2340 may update the first NLU model 2332 to a new model through learning or the like so that the first NLU model 2332 of the device determination model 2330 interprets text related to the new device 4300.

The voice assistant server 2000 may train voice assistant models according to user accounts by using the on-device model update module 2350, and may determine whether to transmit at least some of voice assistant models updated through learning to the hub device 1000. In another embodiment, the voice assistant server 2000 may determine to transmit at least some of the voice assistant models updated through learning to at least one of the plurality of devices 4000 other than the hub device 1000. The on-device model update module 2350 may include an on-device model information database 2352 that stores configuration information of the voice assistant models according to user accounts. The on-device model information database 2352 may store at least one of, for example, user account information, identification information about a plurality of devices registered according to user accounts, identification information of a function determination model corresponding to each of the plurality of devices, version information of the function determination model, version information of a device determination model, or information about a device type that may be determined by the device determination model as an operation-performing device.

When the voice assistant server 2000 determines to transmit the updated device determination model 2330 to the hub device 1000 by using the on-device model update module 2350, the voice assistant server 2000 may transmit the updated device determination model 2330 to the hub device 1000 through a communication interface 2100 (see FIG. 3) (S2). In an embodiment, when the voice assistant server 2000 receives a signal for requesting to transmit the function determination model 2368 corresponding to the new device from the hub device 1000 (S1), the voice assistant server 2000 may transmit the function determination model 2368 corresponding to the new device to the hub device 1000 by using the on-device model update module 2350 (S2). In another embodiment, the voice assistant server 2000 may transmit the function determination model 2368 corresponding to the new device to at least one of the plurality of devices 4000 by using the on-device model update module 2350.

Each of the plurality of function determination models 2362, 2364, 2366, and 2368 stored in the voice assistant server 2000 will be described in detail with reference to FIG. 3.

The IoT server 3000 may be connected through a network, and may store information about the plurality of devices 4000 that are pre-registered by using the user account of the hub device 1000. In an embodiment, the IoT server 3000 may receive at least one of user account information used to log into each of the plurality of devices 4000, identification information (e.g., device id information) of each of the plurality of devices 4000, a device type of each of the plurality of devices 4000, or function execution capability information of each of the plurality of devices 4000 (S11, S13, and S15). In an embodiment, the IoT server 3000 may receive state information about power on/off of each of the plurality of devices 4000 or an operation that is being executed from the plurality of devices 4000 (S11, S13, and S15). The IoT server 3000 may store the device information and the state information received from the plurality of devices 4000.

The IoT server 3000 may transmit the device information and the state information received from each of the plurality of devices 4000 to the voice assistant server 2000 (S10).

The IoT server 3000 may generate a control command readable and executable by the operation-performing device based on the operation information received from the voice assistant server 2000. The IoT server 3000 may transmit the control command to the device determined as the operation-performing device from among the plurality of devices 4000 (S12, S14, and S16).

Elements of the IoT server 3000 will be described in detail with reference to FIG. 4.

In FIG. 1, the plurality of devices 4000 may include the first device 4100, the second device 4200, and the new device 4300. Although the first device 4100 is an air conditioner, the second device 4200 is a TV, and the new device 4300 is an air purifier in FIG. 1, the disclosure is not limited thereto. The plurality of devices 4000 may include not only an air conditioner, a TV, and an air purifier, but also a home appliance such as a robot cleaner, a washing machine, an oven, a microwave oven, a scale, a refrigerator, or an electronic picture frame and a mobile device such as a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device.

At least one of the plurality of devices 4000 itself may store a function determination model. For example, the memory 4130 of the first device 4100 may store a function determination model 4132 used to obtain operation information about detailed operations needed for the first device 4100 to perform an operation determined from a voice input of the user and a relationship between the detailed operations and generate a control command based on the operation information.

Each of the second device 4200 and the new device 4300 from among the plurality of devices 4000 does not store a function determination model. However, the disclosure is not limited thereto. In an embodiment, a function determination model corresponding to the new device 4300 may be stored in an internal memory of the new device 4300 itself.

At least one of the plurality of devices 4000 may transmit information about whether the device itself stores a function determination device corresponding to each of the plurality of devices 4000 to the hub device 1000 (S4, S6, and S8).

Figure 2:
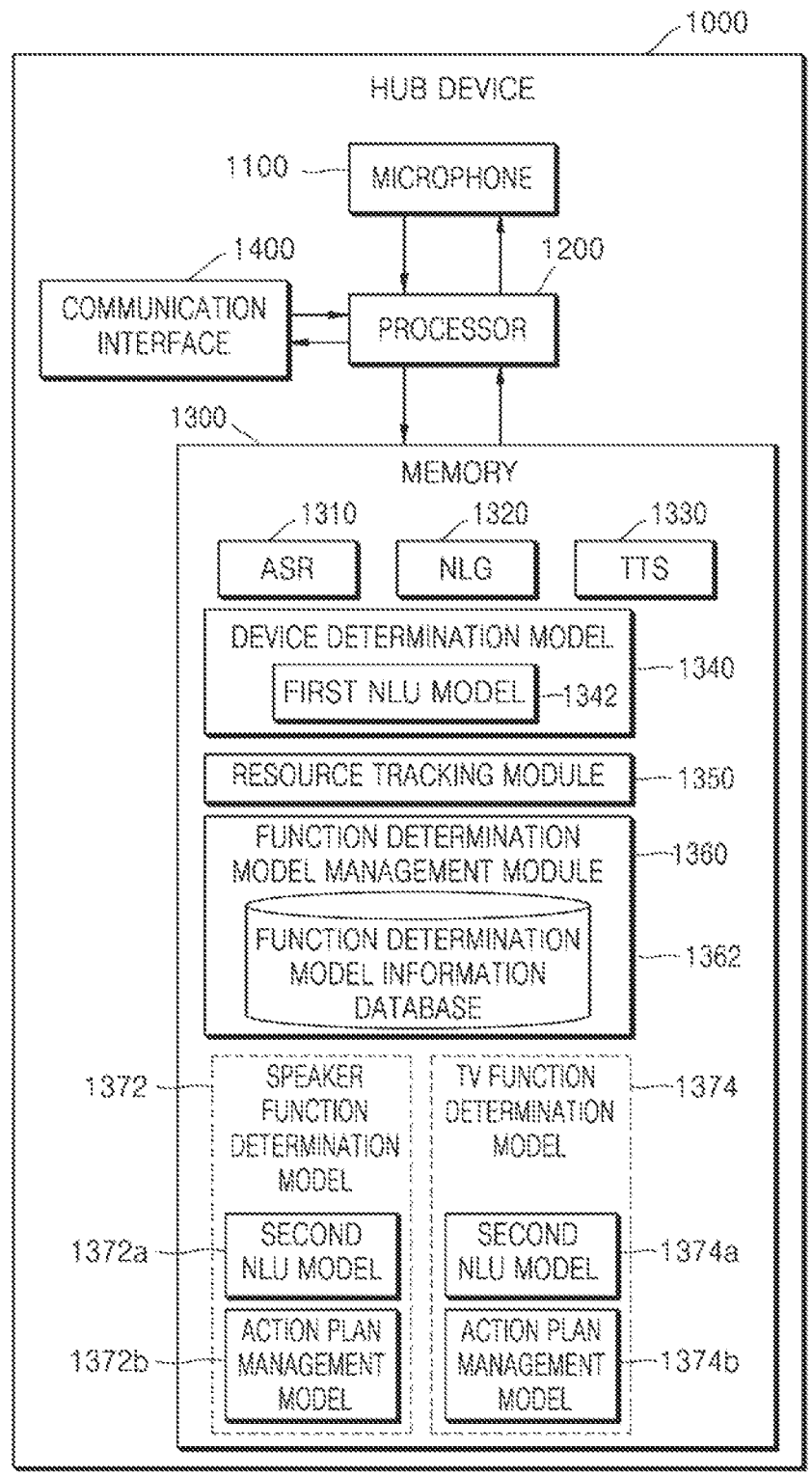
FIG. 2 is a block diagram of a hub device according to an embodiment.

FIG. 2 is a block diagram of the hub device 1000 according to an embodiment.

The hub device 1000 is a device that receives a voice input of a user and controls at least one of the plurality of devices 4000 based on the received voice input. The hub device 1000 may be a listener device that receives the voice input from the user.

Referring to FIG. 2, the hub device 1000 may include at least a microphone 1100, the processor 1200, the memory 1300, and a communication interface 1400. The hub device 1000 may receive the voice input (e.g., the user's utterance) from the user through the microphone 1100, and may obtain a voice signal from the received voice input. In an embodiment, the processor 1200 of the hub device 1000 may convert a sound received through the microphone 1100 into an acoustic signal, and may obtain the voice signal by removing noise (e.g., a non-voice component) from the acoustic signal.

Although not shown in FIG. 2, the hub device 1000 may include a voice recognition module having a function of detecting a designated voice input (e.g., a wake-up input such as 'Hi, Bixby' or 'OK, Google') or a function of pre-processing the voice signal obtained from part of the voice input.

The processor 1200 may execute one or more instructions of a program stored in the memory 1300. The processor 1200 may include hardware components that perform arithmetic, logic, and input/output operations and signal processing. The processor 1200 may include at least one of, but not limited to, a central processing unit, a microprocessor, a graphics processing unit, an application-specific integrated circuit (ASIC), a digital signal processor (DSP), a digital signal processing device (DSPD), a programmable logic device (PLD), or a field programmable gate array (FPGA).

A program including instructions for controlling the plurality of devices 4000 based on the voice input of the user received through the microphone 1100 may be stored in the memory 1300. Instructions and program code readable by the processor 1200 may be stored in the memory 1300. In the following embodiments, the processor 1200 may be implemented by executing the instructions or the code stored in the memory.

The memory 1300 may store data about an automatic speech recognition (ASR) module 1310, data about a natural language generation (NLG) module 1320, data about a text-to-speech (TTS) module 1330, data about the device determination model 1340, data about the resource tracking module 1350, data about the function determination model management module 1360, and data corresponding to each of a plurality of function determination models 1370.

The memory 1300 may include a nonvolatile memory. The memory 1300 may include at least one type of storage medium from among, for example, a flash memory type, a hard disk type, a solid state drive (SSD), a multimedia card micro type, a card-type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The processor 1200 may convert the voice signal received through the microphone 1100 into text by performing automatic speech recognition (ASR) by using the data about the ASR module 1310 stored in the memory 1300.

The processor 1200 may analyze the text by using the data about the device determination model 1340 stored in the memory 1300 and may determine an operation-performing device from among the plurality of devices 4000 based on an analysis result of the text. The device determination model 1340 may include a first NLU model 1342. In an embodiment, the processor 1200 may analyze the text by using data about the first NLU model 1342 included in the device determination model 1340, and may determine the operation-performing device for performing an operation according to the user's intention from among the plurality of devices 4000 based on an analysis result of the text.

The first NLU model 1342 is a model trained to analyze the text converted from the voice input and determine the operation-performing device based on an analysis result. The first NLU model 1342 may be used to determine an intent by interpreting the text and determine the operation-performing device based on the intent.

In an embodiment, the processor 1200 may parse the text in units of morphemes, words, or phrases by using the data about the first NLU model 1342 stored in the memory 1300, and may infer the meaning of a word extracted from the parsed text by using linguistic features (e.g., grammatical constituents) of the morphemes, words, or phrases. The processor 1200 may compare the inferred meaning of the word with pre-defined intents provided by the first NLU model 1342 and may determine an intent corresponding to the inferred meaning of the word.

The processor 1200 may determine a device related to the intent recognized from the text as the operation-performing device, based on a matching model for determining a relation between the intent and the device. In an embodiment, the matching model may be included in the data about the device determination model 1340 stored in the memory 1300 and may be obtained through learning through a rule-based system, but the disclosure is not limited thereto.

In an embodiment, the processor 1200 may obtain a plurality of numerical values indicating relation degrees between the intent and the plurality of devices 4000 by applying the matching model to the intent, and may determine a device having a largest numerical value from among the obtained plurality of numerical values as a final operation-performing device. For example, when the intent is related to each of the first device 4100 (see FIG. 1) and the second device 4200 (see FIG. 1), the processor 1200 may obtain a first numerical value indicating a relation degree between the intent and the first device 4100 and a second numerical value indicating a relation degree between the intent and the second device 4200, and may determine the first device 4100 having a larger numerical value from among the first numerical value and the second numerical value as an operation-performing device.

For example, when the hub device 1000 receives a voice input of the user saying "lower the set temperature 2° C. because it is hot" from the user, the processor 1200 may perform ASR of converting the voice input into text by using data about the ASR module 1310 and may obtain an intent corresponding to 'set temperature adjustment' by analyzing the converted text by using the data related to the first NLU model 1342. The processor 1200 may obtain a first numerical value indicating a relation degree between the intent of 'set temperature adjustment' and the first device 4100 that is an air conditioner, a second numerical value indicating a relation degree between the intent of 'set temperature adjustment' and the second device 4200 that is a TV, and a third numerical value indicating a relation degree between the intent of 'set temperature adjustment' and the new device 4300 (see FIG. 1) that is an air purifier, by applying the matching model. The processor 1200 may determine the first device 4100 as an operation-performing device related to 'set temperature adjustment' by using the first numerical value that is a largest value from among the obtained numerical values.

As another example, when the hub device 1000 receives a voice input of the user saying "play the movie Avengers" from the user, the processor 1200 may analyze text converted from the voice input and may obtain an intent corresponding to 'content playback'. The processor 1200 may determine the second device 4200 as an operation-performing device related to 'content playback', based on second numerical value information that is a largest value from among a first numerical value indicating a relation degree between the intent of 'content playback' and the first device 4100 that is an air conditioner, a second numerical value indicating a relation degree between the intent of 'content playback' and the second device 4200 that is a TV, and a third numerical value indicating a relation degree between the intent of 'content playback' and the new device 4300 that is an air purifier calculated by using the matching model.

However, the disclosure is not limited to the above examples, and the processor 1200 may arrange, in an ascending order, numerical values indicating relation degrees between an intent and a plurality of devices and may determine a pre-determined number of devices as operation-performing devices. In an embodiment, the processor 1200 may determine a device whose numerical value indicating a relation degree is equal to or greater than a certain threshold value as an operation-performing device related to an intent. In this case, a plurality of devices may be determined as operation-performing devices.

Although the processor 1200 may train the matching model between an intent and an operation-performing device by using, for example, a rule-based system, the disclosure is not limited thereto. An artificial intelligence (AI) model used by the processor 1200 may be, for example, a neural network-based system (e.g., a convolution neural network (CNN) or a recurrent neural network (RNN)), a support-vector machine (SVM), linear regression, logistic regression, Naïve Bayes, a random forest, a decision tree, or a k-nearest neighbor algorithm. Alternatively, the AI model may be a combination of the above examples or any of other AI models. AI models used by the processor 1200 may be stored in the device determination model 1340.

The device determination model 1340 stored in the memory 1300 of the hub device 1000 may determine an operation-performing device from among the plurality of devices 4000 that are registered according to a user account of the hub device 1000. The hub device 1000 may receive device information about each of the plurality of devices 4000 from the voice assistant server 2000, by using the communication interface 1400. The device information may include at least one of, for example, identification information (e.g., device id information) of each of the plurality of devices 4000, a device type of each of the plurality of devices 4000, a function execution capability of each of the plurality of devices 4000, position information, or state information. The processor 1200 may determine a device for performing an operation according to an intent from among the plurality of devices 4000 based on the device information, by using the data about the device determination model 1340 stored in the memory 1300.

In an embodiment, the processor 1200 may analyze numerical values indicating relation degrees between the intent and the plurality of devices 4000 that are pre-registered by using the same user account as the user account of the hub device 1000 by using the device determination model 1340, and may determine a device having a largest value from among the numerical values indicating the relation degrees between the intent and the plurality of devices 4000 as an operation-performing device.

Because the device determination model 1340 is configured to determine an operation-performing device by using only the plurality of devices 4000 that are logged in and registered by using the same user account as that of the hub device 1000 as device candidates, there is a technical effect in that the amount of calculation performed by the processor 1200 in order to determine a relation degree with the intent may be reduced to be less than that of a processor 2200 (see FIG. 3) of the voice assistant server 2000. Also, due to the reduction in the amount of calculation, a processing time required to determine the operation-performing device may be reduced, and thus a response speed may be improved.

In an embodiment, the processor 1200 may obtain a name of a device from text by using the first NLU model 1342, and may determine an operation-performing device based on the name of the device by using the data about the device determination model 1340 stored in the memory 1300. In an embodiment, the processor 1200 may extract a common name related to the device and a word or a phrase regarding an installation position of the device from the text by using the first NLU model 1342, and may determine the operation-performing device based on the extracted common name and installation position of the device. For example, when text converted from a voice input is "play the movie Avengers on TV", the processor 1200 may parse the text in units of words or phrases by using the first NLU model 1342, and may recognize the name of the device corresponding to 'TV' by comparing a word or a phrase with pre-stored words or phrases. The processor 1200 may determine the second device 4200, which is logged in by using the same account as the user account of the hub device 1000 and is a TV from among the plurality of devices 4000 connected to the hub device 1000, as an operation-performing device.

The natural language generation (NLG) module 1320 may be used to provide a response message during an interaction between the hub device 1000 and the user. For example, the processor 1200 may generate a response message such as "I will play the movie on TV" or "I will lower the set temperature of the air conditioner by 2° C." by using the NLG module 1320. The response message generated by the NLG module 1320 may be a message including text.

When there exist a plurality of operation-performing devices determined by the processor 1200 or there exist a plurality of devices having similar relation degrees with an intent, the NLG module 1320 may store data used to generate a query message for determining a specific operation-performing device. In an embodiment, the processor 1200 may generate a query message for selecting one operation-performing device from among a plurality of device candidates by using the data about the NLG module 1320. The query message may be a message for requesting a response from the user regarding which one of the plurality of device candidates is to be determined as an operation-performing device.

The TTS module 1330 may convert a response message or a query message including text generated by the NLG module 1320 into an audio signal. In an embodiment, the processor 1200 may control a response message or a query message including text to be converted into an audio signal by using data about the TTS module 1330 and to be transmitted through a speaker. In an embodiment, the hub device 1000 may receive a notification message indicating an execution result of an operation from an operation-performing device. In this case, the notification information may include text, and the processor 1200 may convert the notification message including text into an audio signal by using the data about the TTS module 1330. The processor 1200 may output the notification message converted into the audio signal through the speaker.

When the hub device 1000 obtains information about a new device connected to the hub device 1000, the hub device 1000 requests the voice assistant server 2000 to update a device determination model stored in the hub device 1000. In an embodiment, the hub device 1000 may analyze text related to the new device from the voice input of the user based on device information of the new device (e.g., identification information of the new device and type information of the new device) received from the IoT server 3000, and may transmit a query signal for requesting to update a device determination model pre-stored in the memory 1300 (see FIG. 2) to the voice assistant server 2000 to determine the new device as an operation-performing device. In this case, the hub device 1000 may transmit at least user account information and identification information of the hub device 1000 (e.g., id information of the hub device 1000) along with the query signal to the voice assistant server 2000.

In another embodiment, the hub device 1000 may receive the device information of the new device (e.g., identification information of the new device and type information of the new device) from the new device. In this case, the hub device 1000 may transmit the query signal for requesting to update the device determination model pre-stored in the hub device 1000, based on the device information of the new device received from the new device.

In response to a request of the hub device 1000, the hub device 1000 receives the updated device determination model from the voice assistant server 2000 and stores the received updated device determination model. In an embodiment, the hub device 1000 may analyze the voice input of the user about the new device, may download the updated device determination model from the voice assistant server 2000 to determine the new device as an operation-performing device as an analysis result, and may store the updated device determination model in the memory 1300 (see FIG. 2) in the hub device 1000. An operation of requesting to update a device determination model and receiving and storing the updated device determination model may be performed by a separate software module. Alternatively, this operation may be performed by the function determination model management module 1360.

The resource tracking module 1350 is a module that monitors resource states of elements, for example, the processors 1200, 4120, 4220, and 4230 and the memories 1300, 4130, 4230, and 4330, of the hub device 1000 and the plurality of devices 4000 and obtains resource state information. The resource state information is information indicating usage states of the processors 1200, 4120, 4220, and 4320 and the memories 1300, 4130, 4230, and 4330 of the hub device 1000 and the plurality of devices 4000. The resource state information may include at least one of, for example, residual capacity, average RAM usage capacity, or average processor occupancy information of the memories 1300, 4130, 4230, and 4330 of the hub device 1000 and the plurality of devices 4000. In an embodiment, the hub device 1000 may monitor periodically or in real time at least one of an average processing speed of the processors 1200, 4120, 4220, and 4320, a residual capacity of the memories 1300, 4130, 4230, and 4330, or an average RAM residual capacity, by using the resource tracking module 1350. The resource tracking module 1350 may provide resource state information obtained through monitoring to the function determination model management module 1360.

The function determination model management module 1360 may determine whether to store and process the function determination model 1370 in the memories 1300, 4130, 4230, and 4330 of the hub device 1000 and the plurality of devices 4000. When a plurality of function determination models 1370 are provided, the function determination model management module 1360 may determine whether to respectively store and process the plurality of function determination models 1370 in the memories 1300, 4130, 4230, and 4330 of the hub device 1000 and the plurality of devices. The function determination model management module 1360 may determine which one of the memories 1300, 4130, 4230, 4330 of the hub device 1000 and the plurality of devices 4000 is to be used to store the function determination model 1370.

The function determination model management module 1360 may compare and analyze information of a function determination model (e.g., capacity information of the function determination model) received from the voice assistant server 2000 (see FIG. 1) with the resource state information received from the resource tracking module 1350. The function determination model management module 1360 may download the function determination model from the voice assistant server 2000 and may determine whether to store the downloaded function determination model in the memories 1300, 4130, 4230, and 4330 of the hub device 1000 and the plurality of devices 4000, by using a comparison/analysis result. In an embodiment, the function determination model management module 1360 may determine whether to store a function determination model corresponding to the new device 4300 (see FIG. 1) received from the voice assistant server 2000 in the memories 1300, 4130, 4230, and 4330. In an embodiment, the function determination model management module 1360 may analyze a residual capacity and an occupancy of the processors 1200, 4120, 4220, and 4320 and the memories 1300, 4130, 4230, and 4330 according to a usage pattern of the hub device 1000 and the plurality of devices 4000, based on the resource state information obtained from the resource tracking module 1350. For example, when the user frequently plays music or video content through the hub device 1000, decoding continuously occurs, and thus an occupancy of the processor 1200 through calculation may be high and a RAM residual capacity may be low. In another embodiment, when the user performs only a simple operation such as an operation of asking about weather information by using one of the plurality of devices 4000, an occupancy of the processors 4120, 4220, and 4320 may not be high and a residual capacity of the memories 4130, 4230, and 4330 may be large. The function determination model management module 1360 of the hub device 1000 may determine whether to store a function determination model in the memory 1300 of the hub device 1000 or the memories 4130, 4230, and 4310 of the plurality of devices 4000, by comparing the resource state information of the processors 1200, 4120, 4220, and 4320 and the memories 1300, 4130, 4230, and 4330 with information of the function determination model. The information of the function determination model may include at least one of capacity information of the function determination model, RAM occupancy information used to read the function determination model, or information about a simulated processing time required for the processors 1200, 4120, 4220, and 4320 to obtain operation information through detailed operations according to a function and an order of the detailed operations by reading the function determination model.

In an embodiment, the hub device 1000 may perform a simulation to compare a residual capacity of the memories 1300, 4130, 4230, and 4330 with capacity information of the received function determination model, based on the information of the function determination model received from the voice assistant server 2000, by using data about the function determination model management module 1360. In an embodiment, the hub device 1000 may perform a simulation to compare an average residual capacity of a RAM connected to the processors 1200, 4120, 4220, and 4320 with a RAM capacity used to process the function determination model, by using the data about the function determination model management module 1360. In an embodiment, the hub device 1000 may simulate a processing time required to process the function determination model considering an average processing speed of the processor 1200, by using the data about the function determination model management module 1360.

In an embodiment, when a difference between a residual capacity of the memory 1300 and a capacity of the function determination model is less than a preset threshold value, the function determination model management module 1360 may determine not to store the function determination model in the memory 1300. In an embodiment, when a simulated processing time of the function determination model is greater than a preset threshold time, the function determination model management module 1360 may determine not to store the function determination model in the memory 1300. A detailed method, performed by the hub device 1000, of determining whether to store the function determination model in the memory 1300 by using the data about the function determination model management module 1360 will be described below in detail with reference to FIG. 7.

In another embodiment, the function determination model management module 1360 may analyze characteristics of the function determination model corresponding to the new device 4300. The characteristics of the function determination model are analyzed based on detailed information about a function determined to be performed by the device. The detailed information about the function may include the name of the function, a detailed description of the function, resources required to perform the function (e.g., a memory amount and a processing speed), an application required to perform the function, and a type of content subjected to the function. The function determination model management module 1360 obtains the detailed information about the function, and analyzes the characteristics of the function determination model, according to a pre-stored voice assistant usage pattern of the user, one or more pre-determined rules, and a type according to sensitive information that is pre-input by the user.

The characteristics of the function determination model include a minimum time required for a device to perform a function and output a result through the device or another peripheral device, and the required minimum time may be determined by a pre-determined rule. For example, the hub device 1000 may store information indicating that a default minimum time for a function of power on/off of the device is 0.1 ms, and a default minimum time for a function of searching and playing video content in the device is 1 s. In addition, when a device through which the user inputs a voice and a device that is subjected to the function are different from each other, the hub device 1000 may store a rule indicating that 0.5 ms is added to the default minimum time.

Also, the characteristics of the function determination model include whether a function is similar to a function frequently used by the user by considering a voice assistant usage pattern of the user. For example, the hub device 1000 may store usage pattern information indicating that the hub device 1000 plays music once every two days. In this case, it may be determined that the function determination model of the new device includes a function related to music playback by using detailed information about a function included in the function determination model of the new device and the function is identical to a function performed by the user once every two days.

Also, the characteristics of the function determination model may include whether to use sensitive information of the user to perform the function, and the sensitive information of the user may be determined according to a pre-determined rule or may be determined according to a type of the sensitive information that is pre-input by the user. For example, when the function determination model of the new device has a function of obtaining schedule information and registering the schedule information in a calendar application, the hub device 1000 determines whether the schedule information is the sensitive information of the user. The hub device 1000 may determine that the schedule information is the sensitive information of the user, according to the type of the sensitive information that is pre-input by the user.

The function determination model management module 1360 may determine whether to download the function determination model corresponding to the new device, by analyzing the characteristics of the function determination model. For example, as a result of analysis of the characteristics of the function determination model, when a minimum time required to perform some of functions included in the function determination model and output a result is equal to or less than a certain time, the function determination model management module 1360 may determine to download the function determination model to the hub device 1000 or the new device.

As another example, as a result of analysis of the characteristics of the function determination model, when it is determined that some of functions included in the function determination model are similar to a function frequently used by the user, the function determination model management module 1360 may determine to download the function determination model to the hub device 1000 or the new device. As another example, as a result of analysis of the characteristics of the function determination model, when it is determined that some of functions included in the function determination model use sensitive information of the user, the function determination model management module 1360 may determine to download the function determination model to the hub device 1000 or the new device.

As another example, the function determination model management module 1360 may obtain manufacturer or model name information of the new device, and may determine whether to download the function determination model corresponding to the new device according to the manufacturer or model name information. The hub device 1000 may pre-store data about whether to download a function determination model for each manufacturer or model name. When it is determined by using the pre-stored data that the manufacturer or model name information of the new device is designated to download the function determination model, the hub device 1000 may determine to download the function determination model. Also, when manufacturer information of the hub device 1000 and the manufacturer information of the new device are compared with each other and are determined to be identical to each other, the hub device 1000 may determine to download the function determination model corresponding to the new device.

In another embodiment, the function determination model management module 1360 may obtain the manufacturer or model name information of the new device, and when the function determination model corresponding to the new device is downloaded according to the manufacturer or model name information, the function determination model management module 1360 may also download a data adaptor module (not shown) along with the function determination model. The data adaptor module (not shown) refers to a software (SW) module that converts output data of the voice assistant server into data processable by the IoT server to link the voice assistant server and the IoT server. In an embodiment, the data adaptor module may determine a similarity between data obtained by a device from the outside and data stored inside the device, and may convert the data obtained from the outside into data most similar thereto. The conversion of the data may be performed based on a database including pairs of data before conversion and after conversion. In this case, the data adaptor module determines a similarity between the data obtained from the outside and the data before conversion, and identifies data, from among the data before conversion, most similar to the data obtained from the outside. The data adaptor module identifies corresponding data after conversion by using the identified data before conversion, and outputs the identified data after conversion. In another embodiment, the data adaptor module may convert the data obtained from the outside by using a data conversion model instead of the database. Alternatively, the data adaptor module may use both the database and the data conversion model.

Data processable by the IoT server may be the same type of data as data received by at least one of a plurality of devices from the IoT server and used to perform a specific function. Also, the data adaptor module may perform an operation of converting output data of the IoT server into data processable by the voice assistant server. The data processable by the voice assistant server may be the same type of data as information about at least one of the plurality of devices received by the hub device 1000 from the voice assistant server.

For example, output data of the voice assistant server includes information about a detailed operation, and output data of the IoT server includes device information including at least one of identification information of a device, a device type, a function execution capability, position information, or state information. When the hub device 1000 downloads the data adaptor module to the hub device 1000, the data adaptor module (not shown) converts output data of the hub device 1000 to link the hub device and the new device. In detail, the data adaptor module converts output data of the function determination model into data processable by the new device, to link the function determination model downloaded to the hub device 1000 and a SW module (not shown) for executing the detailed operation stored in the new device. Also, when the hub device 1000 receives device information about the new device from the new device, the data adaptor module converts the received device information into data processable by the hub device 1000.

The data adaptor module may be configured to correspond to a manufacturer or a model name of the new device. In this case, the voice assistant server may store a data adaptor module for each manufacturer or model name, and may store a plurality of data adaptor modules. The hub device 1000 may request the voice assistant server for a data adaptor module corresponding to the new device, based on manufacturer or model name information of the new device. Also, even when there is no request of the hub device 1000, the voice assistant server may transmit the data adaptor module corresponding to the new device to the hub device 1000 based on the manufacturer or model name information of the new device obtained from the IoT server.

In an embodiment, when the function determination model management module 1360 determines to download the function determination model from the voice assistant server 2000 and store the function determination model in the memory 1300, the hub device 1000 may transmit a query for requesting to transmit the function determination model to the voice assistant server 2000, may receive the function determination model from the voice assistant server 2000, and may store the function determination model in the memory 1300. In this case, the hub device 1000 may request the voice assistant server for the data adaptor module corresponding to the new device, based on the manufacturer or model name information of the new device. The data adaptor module (not shown) converts output data of the function determination model downloaded and stored in the hub device 1000 into data processable by the new device.

In another embodiment, when the function determination model management module 1360 determines not to download the function determination model from the voice assistant server 2000, the hub device 1000 may receive access information of the function determination model pre-stored in the voice assistant server 2000 and may store the received access information in the function determination model information database 1362. The access information may include at least one of identification information (e.g., server id) of the voice assistant server 2000 (see FIG. 1), position information, Internet protocol (IP) address information, a media access control (MAC) address, application programming interface (API) information accessible to each function determination model in the voice assistant server 2000, a use language of each function determination model, or identification information of the new device.

In an embodiment, when the new device is registered by using a user account, the hub device 1000 may receive, from the voice assistant server 2000, information (e.g., capacity information) about the function determination model corresponding to the new device by using data about the function determination model management module 1360, may download the function determination model from the voice assistant server 2000 based on the received information about the function determination model, and may determine whether to store the function determination model in the memory 1300. When the function determination model is determined to be stored in the memory 1300, the hub device 1000 may download the function determination model corresponding to the new device from the voice assistant server 2000 and may store the function determination model in the memory 1300. When the function determination model is determined not to be stored, the hub device 1000 may store access information of the function determination model corresponding to the new device in the function determination model information database 1362.

The hub device 1000 may determine a function of the hub device 1000 itself, and may store the first function determination model 1372 for performing an operation according to the determined function and the second function determination model 1374 corresponding to at least one of the plurality of devices 4000 (see FIG. 1). The term 'function determination model corresponding to an operation-performing device' refers to a model used to obtain operation information about detailed operations for performing an operation according to a determined function of the operation-performing device and a relationship between the detailed operations. In an embodiment, the first function determination model 1372 and the second function determination model 1374 stored in the memory 1300 of the hub device 1000 may respectively correspond to a plurality of devices that are logged in by using the same account as the user account and are connected to the hub device 1000 through a network.

For example, the first function determination model 1372 may be a model used to obtain operation information about detailed operations for performing an operation according to a function of the first device 4100 (see FIG. 1) and a relationship between the detailed operations. In an embodiment, the first function determination model 1372 may be, but is not limited to, a model used to obtain operation information according to a function of the hub device 1000. Likewise, the second function determination model 1374 may be a model used to obtain operation information about detailed operations for performing an operation according to a function of the second device 4200 (see FIG. 1) and a relationship between the detailed operations.

The first function determination model 1372 and the second function determination model 1374 may respectively include second NLU models 1372*a* and 1374*a* configured to analyze at least part of text and obtain operation information about an operation to be performed by the determined operation-performing device based on an analysis result of the at least part of the text. The first function determination model 1372 and the second function determination model 1374 may respectively include action plan management models 1372*b* and 1374*b* configured to manage operation information related to a detailed operation of a device to generate detailed operations to be performed by the device and an execution order of the detailed operations. The action plan management models 1372*b* and 1374*b* may mange operation information about detailed operations of devices according devices and a relationship between the detailed operations. The action plan management models 1372*b* and 1374*b* may plan detailed operations to be performed by a device and an execution order of the detailed operations, based on an analysis result of at least part of text.

The processor 1200 may obtain operation information about an operation to be performed by the operation-performing device by using the function determination model corresponding to the operation-performing device stored in the memory 1300, for example, the second NLU model 1374*a* of the second function determination model 1374 that is a TV function determination model. The second NLU model 1374*a* that is a model specialized for a specific device (e.g., a TV) may be an AI model trained to obtain an intent related to a device corresponding to an operation-performing device determined by the first NLU model 1342 and corresponding to text. Also, the second NLU model 1374*a* may be a model trained to determine an operation of the device related to the user's intention by interpreting the text. The operation may refer to at least one action performed by the device when the device executes a specific function. The operation may indicate at least one action performed by the device when the device executes an application.

In an embodiment, the processor 1200 may analyze the text by using the second NLU model 1374*a* of the second function determination model 1374 corresponding to the determined operation-performing device (e.g., a TV). The processor 1200 may parse text in units of morphemes, words, or phrases by using the second NLU model 1374*a*, may recognize the meaning of a morpheme, a word, or a phrase parsed through grammatical or semantic analysis, and may determine an intent and parameters by matching the recognized meaning to pre-defined words. The 'parameters' used herein refer to variable information for determining detailed operations of an operation-performing device related to the intent. For example, when text transmitted to the second function determination model 1374 is "play the movie Avengers on TV", an intent may be 'content playback' and parameters may be 'the movie Avengers' that is information about content to be played.

The processor 1200 may obtain operation information about at least one detailed operation related to the intent and the parameters, by using the action plan management model 1374*b* of the second function determination model 1374. The action plan management module 1374*b* may manage information about detailed operations of devices according to devices and a relationship between the detailed operations. The processor 1200 may plan detailed operations to be performed by an operation-performing device (e.g., a TV) and an execution order of the detailed operations based on the intent and the parameters by using the action plan management module 1374*b*, and may obtain operation information. The operation information may be information related to detailed operations to be performed by a device and an execution order of the detailed operations. The operation information may include information related to detailed operations to be performed by a device, a relationship between each of the detailed operations and another detailed operation, and an execution order of the detailed operations. The operation information may include, but is not limited to, functions to be executed by an operation-performing device to perform a specific operation, an execution order of the functions, an input value required to execute the functions, and an output value output as an execution result of the functions.

The processor 1200 may generate a control command for controlling the operation-performing device based on the operation information. The control command refers to instructions readable and executable by the operation-performing device so that the operation-performing device performs the detailed operations included in the operation information. In this case, the processor 1200 has to receive a control command conversion module for converting operation information into a control command from the IoT server 3000 through the communication interface 1400. In an embodiment, the processor 1200 may transmit a query for requesting to transmit the control command conversion module for converting operation information about an operation-performing device into a control command to the IoT server 3000, may receive the control command conversion module from the IoT server 3000, and may store the control command conversion module in the memory 1300, by controlling the communication interface 1400. However, the disclosure is not limited thereto, and the control command conversion module corresponding to the operation-performing device may be pre-stored in the memory 1300.

The processor 1200 may control the communication interface 1400 to transmit the generated control command to the operation-performing device.

The communication interface 1400 may perform data communication with the voice assistant server 2000, the IoT server 3000, and the plurality of devices 4000. The communication interface 1400 may perform data communication with the voice assistant server 2000, the IoT server 3000, and the plurality of devices 4000 by using at least one of data communication methods including wired LAN, wireless LAN, Wi-Fi, Bluetooth, Zigbee, Wi-Fi Direct (WFD), Infrared Data Association (IrDA), Bluetooth low energy (BLE), Near-Field Communication (NFC), Wireless Broadband Internet (Wibro), World Interoperability for Microwave Access (WiMAX), Shared Wireless Access Protocol (SWAP), Wireless Gigabit Alliance (WiGig), or Radio-Frequency (RF) communication.

In an embodiment, the processor 1200 may receive device information about the new device 4300 (see FIG. 1) that is logged in and newly registered in the IoT server 3000 (see FIG. 1) by using the same account as the user account of the hub device 1000, through the communication interface 1400. The processor 1200 may receive the device information about the new device 4300 by using the communication interface 1400 from the IoT server 3000, but the disclosure is not limited thereto. The IoT server 3000 may transmit the device information and user account information about the new device 4300 that is newly registered by using the user account to the voice assistant server 2000 (see FIG. 1), and the processor 1200 of the hub device 1000 may control the communication interface 1400 to receive the device information of the new device 4300 from the voice assistant server 2000.

The processor 1200 may request the voice assistant server 2000 to update the device determination model 1340 stored in the memory 1300 through the communication interface 1400, and may receive the updated device determination model 1340 from the voice assistant server 2000. When the new device 4300 is newly registered by using the user account in the IoT server 3000, the voice assistant server 2000 may update the device determination model 2330 (see FIG. 1) and the function determination model 2368 (see FIG. 1). In this case, the processor 1200 may transmit, to the voice assistant server 2000, a query for inquiring about whether there exists the updated device determination model 2330 for device determination of the new device 43000, and when there exists the updated device determination model 2330, the processor 1200 may control the communication interface 1400 to transmit a signal for requesting to transmit the updated device determination model 2330 to the hub device 1000.

The processor 1200 may analyze text about the new device 4300 from the voice assistant server 2000 through the communication interface 1400, may receive the device determination model 2300 updated to determine the new device 4300 as an operation-performing device, and may store the received device determination model 2330 in the memory 1300.

The processor 1200 may transmit a query for requesting information about the function determination model corresponding to the new device 4300 to the voice assistant server 2000, through the communication interface 1400. The information of the function determination model corresponding to the new device 4300 may include at least one of, for example, capacity information or access information of the function determination model to obtain information related to detailed operations performed by the new device 4300, a relationship between each of the detailed operations and another detailed operation, and an execution order of the detailed operations. The processor 1200 may control the communication interface 1400 to download the function determination model from the voice assistant server 2000 or to receive only the access information of the function determination model, based on determination made by the function determination model management module 1360 as to whether to store the function determination model corresponding to the new device 4300.

In FIGS. 1 and 2, when the new device 4300 is logged in by using account information of the same user as the user of the hub device 1000 and is registered by using the user account, or when a new function is added to an existing device, the hub device 1000 may download the updated device determination model 2330 (see FIG. 1) from the voice assistant server 2000 and may store the updated device determination model 2330 in the memory 1300, and may determine whether to download a function determination model corresponding to the new device 4300 or an updated function determination model corresponding to the existing device and store the downloaded function determination model in the memory 1300 based on resource state information in the hub device 1000. In general, when the hub device 1000 determines an operation-performing device and obtains operation information about the operation-performing device, a processing speed may be higher than that when the voice assistant server 2000 performs the processes, and network usage fees for accessing the voice assistant server 2000 may be reduced. However, a resource problem may occur in storing all updated function determination models in the memory 1300 of the hub device 1000 itself. Therefore, according to an embodiment, because the updated device determination model is downloaded from the voice assistant server 2000 and stored in the memory 1300 but whether to download the updated function determination model and the function determination model corresponding to the new device 4300 is determined after resources of the hub device 1000 itself are reviewed, a resource problem may be solved and a processing speed of a voice command may be increased.

FIG. 3 is a block of the voice assistant server 2000 according to an embodiment.

The voice assistant server 2000 is a server that receives text converted from a voice input of a user from the hub device 1000, determines an operation-performing device based on the received text, and obtains operation information by using a function determination model corresponding to the operation-performing device.

Referring to FIG. 3, the voice assistant server 2000 may include at least the communication interface 2100, the processor 2200, and the memory 2300.

The communication interface 2100 of the voice assistant server 2000 may receive, from the IoT server 3000, device information including at least one of identification information (e.g., device id information) of each of the plurality of devices 4000 (see FIG. 1), a device type of each of the plurality of devices 4000, a function execution capability of each of the plurality of devices 4000, position information, or state information, by performing data communication with the IoT server 3000 (see FIG. 1). In an embodiment, the voice assistant server 2000 may receive user account information using which the new device 4300 is registered and device information about the new device 4300 from the IoT server 3000 through the communication interface 2100. The voice assistant server 2000 may receive user account information from the hub device 1000 through the communication interface 2100, and may transmit device information about the plurality of devices 4000 registered according to the received user account information to the hub device 1000. In an embodiment, the voice assistant server 2000 may transmit the updated device determination model 2330 to the hub device 1000, through the communication interface 2100. In an embodiment, the voice assistant server 2000 may transmit information of the function determination model 2368 corresponding to the new device 4300 to the hub device 1000 or may transmit the function determination model 2368 itself to the hub device 1000, through the communication interface 2100.

In another embodiment, when the function determination model 2368 corresponding to the new device 4300 is determined by the function determination model management module 1360 (see FIG. 2) of the hub device 1000 to be transmitted to one of the plurality of devices 4000 other than the hub device 1000, the voice assistant server 2000 may receive a query including identification information about the determined device and a signal indicating to transmit the function determination model from the hub device 1000 through the communication interface 2100 and may transmit the function determination model 2368 to the determined device in response to the received query.

The processor 2200 and the memory 2300 of the voice assistant server 2000 may perform functions that are the same as or similar to those of the processor 1200 (see FIG. 2) and the memory 1300 (see FIG. 2) of the hub device 1000 (see FIG. 2). Accordingly, the same description of the processor 2200 and the memory 2300 of the voice assistant server 2000 as that made for the processor 1200 and the memory 1300 of the hub device 1000 is not provided.

Data about an ASR module 2310, data about an NLG module 2320, data about the device determination model 2330, data about the voice assistant model update module 2340, data about the on-device model update module 2350, and data corresponding to each of a plurality of function determination models 2360 may be stored in the memory 2300 of the voice assistant server 2000. The memory 2300 of the voice assistant server 2000 may store the plurality of function determination models 2360 corresponding to a plurality of devices related to a plurality of different user accounts, instead of the plurality of function determination models 1370 (see FIG. 2) stored in the memory 1300 of the hub device 1000. Also, the plurality of function determination models 2360 for more types of devices than the plurality of function determination models 1370 stored in the memory 1300 of the hub device 1000 may be stored in the memory 2300 of the voice assistant server 2000. A total capacity of the plurality of function determination models 2360 stored in the memory 2300 of the voice assistant server 2000 may be greater than a capacity of the plurality of function determination models 1370 stored in the memory 1300 of the hub device 1000.

When at least part of text is received from the hub device 1000, the communication interface 2100 of the voice assistant server 2000 may transmit the received at least part of the text to the processor 2200, and the processor 2200 may analyze the at least part of the text by using the first NLU model 2332 stored in the memory 2300. The processor 2200 may determine an operation-performing device related to the at least part of the text based on an analysis result, by using the device determination model 2330 stored in the memory 2300. The processor 2200 may select a function determination model corresponding to the operation-performing device from among a plurality of function determination models stored in the memory 2300, and may obtain operation information about detailed operations for performing a function of the operation-performing device and a relationship between the detailed operations by using the selected function determination model.

For example, when it is determined that the operation-performing device is the first device 4100 that is an air conditioner, the processor 2200 may analyze the at least part of the text by using a second NLU model 2362*a* of the function determination model 2362 corresponding to the air conditioner, and may obtain operation information by planning detailed operations to be performed by a device and an execution order of the detailed operations by using an action plan management model 2362*b*.

For example, when the voice assistant server 2000 receives text corresponding to 'raise the temperature 1° C.' from the hub device 1000, the voice assistant server 2000 determines the air conditioner as an operation-performing device through the device determination model 2330. Next, the voice assistant server 2000 may select the function determination model 2362 corresponding to the air conditioner from among the plurality of function determination models 2360, may analyze the text by using data about the second NLU model 2362*a* of the selected function determination model 2362, and may obtain operation information for performing a temperature control operation based on a text analysis result by using data about the action plan management model 2362*b*.

For example, when the voice assistant server 2000 receives text corresponding to 'change the channel' from the hub device 1000, the voice assistant server 2000 determines a TV as an operation-performing device through the device determination model 2330. Next, the voice assistant server 2000 may select the function determination model 2364 corresponding to the TV from among the plurality of function determination models 2360, may analyze the text by using data about a second NLU model 2364*a* of the selected function determination model 2364, and may obtain operation information for performing a channel change operation based on a text analysis result by using data about an action plan management model 2364*b*.

The voice assistant server 2000 may update a voice assistant model, by using the voice assistant model update module 2340 stored in the memory 2300. When the new device 4300 (see FIG. 1) is newly registered by using a user account in the IoT server 3000 or a new function is added to an existing device, the voice assistant server 2000 may receive a user account and device information of the new device 4300 that is registered by using the user account from the IoT server 3000 through the communication interface 2100. The voice assistant server 2000 may update the device determination model 2330 and the function determination model 2368 corresponding to the new device 4300 by using the voice assistant model update module 2340.

For example, when the function determination model 2364 corresponding to the second device 4200 is updated, for example, when a function of the second device 4200 (see FIG. 1) is added or changed, the voice assistant model update module 2340 may update the device determination model 2330 to a new model through learning or the like so that the device determination model 2330 determines the second device 4200 as an operation-performing device related to the updated function by interpreting the updated function. In an embodiment, the voice assistant model update module 2340 may update the first NLU model 2332 to a new model through learning or the like so that the first NLU model 2332 of the device determination model 2330 interprets text related to the newly updated function.

For example, when the new device 4300 is registered by using a user account in the IoT server 3000, the voice assistant model update module 2340 may receive identification information of the new device 4300 and the function determination model 2368 corresponding to the new device 4300 from the IoT server 3000 and may additionally store the received function determination model 2368 in the function determination models 2362, 2364, and 2366 in the memory 2300. The voice assistant model update module 2340 may update the device determination model 2330 to a new model through learning or the like so that the device determination model 2330 interprets an intent from text and determines the new device 4300 as an operation-performing device related to the intent as an interpretation result. In an embodiment, the voice assistant model update module 2340 may update the first NLU model 2332 to a new model through learning or the like so that the first NLU model 2332 of the device determination model 2330 interprets text related to the new device 4300.

The voice assistant server 2000 may train voice assistant models according to user accounts by using the on-device model update module 2350, and may determine whether to transmit at least some of the voice assistant models updated through learning to the hub device 1000 (see FIG. 2). In another embodiment, the voice assistant server 2000 may determine to transmit at least some of the updated voice assistant models to at least one of the plurality of devices 4000 by using the on-device model update module 2350.

The on-device model update module 2350 may include the on-device model information database 2352 that stores configuration information of the voice assistant models according to user accounts. The on-device model information database 2352 may store at least one of, for example, user account information, identification information about a plurality of devices registered according to user accounts, identification information of a function determination model corresponding to each of the plurality of devices, version information of the function determination model, version information of a device determination model, or information about a device type that may be determined by the device determination model as an operation-performing device.

In an embodiment, the voice assistant server 2000 may determine to transmit the updated device determination model 2330 to the hub device 1000 (see FIG. 2), by using the on-device model update module 2350. In an embodiment, the voice assistant server 2000 may transmit the updated device determination model 2330 to the hub device 1000 through the communication interface 2100. In another embodiment, the voice assistant server 2000 may transmit the updated device determination model 2330 to at least one of the plurality of devices 4000 through the communication interface 2100.

In another embodiment, the voice assistant server 2000 receives a query signal for updating a device determination model pre-stored in the hub device 1000 along with information about a new device connected to the hub device 1000 from the hub device 1000. In this case, the voice assistant server 2000 may also receive at least user account information and identification information of the hub device 1000 (e.g., id information of the hub device 1000) along with the query signal from the hub device 1000. The on-device model update module2350 of the voice assistant server 2000 may update the device determination model pre-stored in the hub device 1000 by using at least the received account information and the information about the new device received from the hub device 1000.

Updating of the device determination model is similar to updating of the device determination model 2330 of the voice assistant server 2000. That is, the on-device model update module 2350 may update the device determination model of the hub device 1000 to a new model through learning or the like so that the device determination model of the hub device 1000 interprets an intent from text and determines the new device 4300 as an operation-performing device related to the intent as an interpretation result. In an embodiment, the on-device model update module 2350 may update a first NLU model to a new model through learning or the like so that the first NLU model of the device determination model of the hub device 1000 interprets text related to the new device 4300. Updating of a model will be described below in more detail with reference to FIGS. 18A and 18B.

In an embodiment, the voice assistant server 2000 may receive a signal for requesting to transmit the function determination model 2368 corresponding to the new device 4300 from the hub device 1000. When the signal for requesting to transmit the function determination model 2368 corresponding to the new device 4300 is received, the voice assistant server 2000 may transmit the function determination model 2368 corresponding to the new device 4300 to the hub device 1000 by using the on-device model update module 2350.

The voice assistant server 2000 may include a data adaptor module (not shown). The data adaptor module (not shown) refers to a software (SW) module that converts output data of the voice assistant server 2000 into data processable by the IoT server 3000 to link the voice assistant server 2000 and the IoT server 3000. The voice assistant server 2000 may store a data adaptor module for each manufacturer or model name, and may include a plurality of data adaptor modules. The voice assistant server 2000 may transmit a data adaptor module corresponding to the new device to the hub device 1000 in response to a request of the hub device 1000. In an embodiment, even when there is no request of the hub device 1000, the voice assistant server 2000 may transmit the data adaptor module corresponding to the new device to the hub device 1000 based on manufacturer or model name information of the new device obtained from the IoT server 3000.

In another embodiment, the voice assistant server 2000 may receive a query for requesting to transmit the function determination model 2368 corresponding to the new device 4300 to one of the plurality of devices 4000 from the hub device 1000. In this case, the voice assistant server 2000 may receive identification information (e.g., device id) about one of the plurality of devices 4000 along with the query. The voice assistant server 2000 may transmit the function determination model 2368 corresponding to the new device to the device determined according to received device information from among the plurality of devices 4000, by using the on-device model update module 2350.

Figure 4:
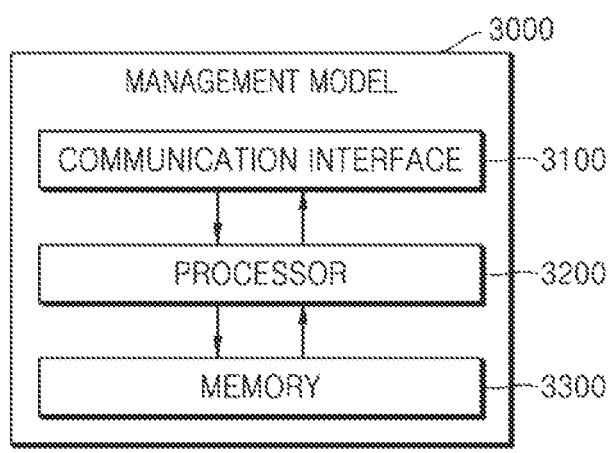
FIG. 4 is a block diagram of an IoT server according to an embodiment.

FIG. 4 is a block diagram of the IoT server 3000 according to an embodiment.

The IoT server 3000 is a server that obtains, stores, and manages device information about each of the plurality of devices 4000 (see FIG. 1). The IoT server 3000 may obtain, determine, or generate a control command for controlling a device by using the stored device information. Although the IoT server 3000 is implemented as an independent hardware device separate from the voice assistant server 2000 in FIG. 1, the disclosure is not limited thereto. In an embodiment, the IoT server 3000 may be an element of the voice assistant server 2000 (see FIG. 1), or may be a server designed to be classified as software.

Referring to FIG. 4, the IoT server 3000 may include at least a communication interface 3100, a processor 3200, and a memory 3300.

The IoT server 3000 may be connected via a network to the voice assistant server 2000 or an operation-performing device through the communication interface 3100, and may receive or transmit data. The IoT server 3000 may transmit data stored in the memory 3300 to the voice assistant server 2000 or the operation-performing device through the communication interface 3100 under the control of the processor 3200. Also, the IoT server 3000 may receive data from the voice assistant server 2000 or the operation-performing device through the communication interface 3100 under the control of the processor 3200.

In an embodiment, the communication interface 3100 may receive device information including at least one of device identification information (e.g., device id information), function execution capability information, position information, or state information from each of the plurality of devices 4000 (see FIG. 1). In an embodiment, the communication interface 3100 may receive user account information from each of the plurality of devices 4000. Also, the communication interface 3100 may receive information about power on/off or an operation that is being performed from the plurality of devices 4000. The communication interface 3100 may provide the received device information to the memory 3300.

In an embodiment, the communication interface 3100 may receive user account information using which the new device 4300 is logged in and device information about the new device 4300 from the new device 4300 (see FIG. 1).

In an embodiment, the communication interface 3100 may transmit the user account information of the new device 4300 and the device information of the new device 4300 registered by using a user account to the voice assistant server 2000 (see FIG. 1), under the control of the processor 3200.

The processor 3200 may store the device information about each of the plurality of devices 4000 received through the communication interface 3100 in the memory 3300. In an embodiment, the memory 3300 may classify the device information according to the user account information received from the plurality of devices 4000 and may store the classified device information in the form of a lookup table (LUT).

The processor 3200 may store, in the memory 3300, the device information about the new device and the user account information used to log into the new device 4300, which are received through the communication interface 3100. In an embodiment, the processor 3200 may store the device information of the new device 4300, for example, at least one of identification information (e.g., id information) of the new device 4300, function execution capability information, position information, or state information, in the user account information corresponding to the new device 4300 in the memory 3300 in the form of a lookup table.

In an embodiment, the communication interface 3100 may receive a query for requesting the user account information and the device information about the plurality of devices 4000 that are pre-registered by using the user account information from the voice assistant server 2000. In response to the received query, the processor 3200 may obtain, from the memory 3300, the device information about the plurality of devices 4000 that are pre-registered by using a user account in response to the received query, and may control the communication interface 3100 to transmit the obtained device information to the voice assistant server 2000.

In an embodiment, the communication interface 3100 may receive a query for requesting the device information about the new device 4300 that is newly registered by using the user account information from the voice assistant server 2000. In this case, the processor 3200 may control the communication interface 3100 to transmit the device information about the new device 4300 that is newly registered by using the user account to the voice assistant server 2000 in response to the received query.

The processor 3200 may control the communication interface 3100 to transmit a control command to the operation-performing device determined to perform an operation, based on operation information received from the voice assistant server 2000.

The IoT server 3000 may receive an operation execution result according to the control command through the communication interface 3100 from the operation-performing device.

Figure 5:
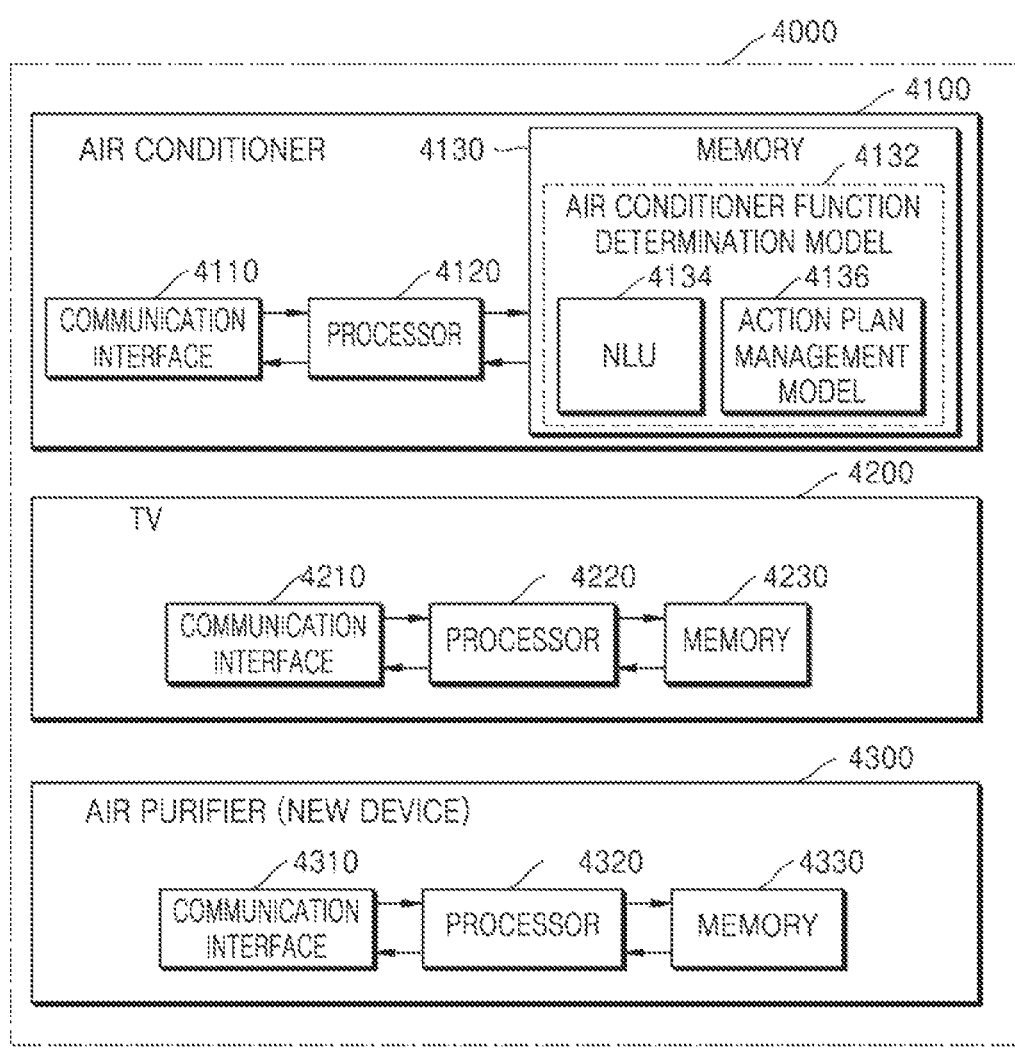
FIG. 5 is a block diagram of a plurality of devices according to an embodiment.

FIG. 5 is a block diagram of the plurality of devices 4000 according to an embodiment.

The plurality of devices 4000 may be devices that are controlled by the hub device 1000 (see FIG. 1) or the IoT server 3000 (see FIG. 1). In an embodiment, the plurality of devices 4000 may be executor devices that execute an operation based on a control command received from the hub device 1000 or the IoT server 3000.

Referring to FIG. 5, the plurality of devices 4000 may include the first device 4100, the second device 4200, and the new device 4300. However, the disclosure is not limited thereto, and in an embodiment, the plurality of devices 4000 may include only the first device 4100 and the second device 4200 that are pre-registered, and may not include the new device 4300.

The new device 4300 may be a device that is newly obtained by a user of the hub device 1000, and is registered in the IoT server 3000 (see FIG. 1) by being logged in by using the same user account as that of other pre-registered devices 4100 and 4200.

Although the first device 4100 is an air conditioner, the second device 4200 is a TV, and the new device 4300 is an air purifier of FIG. 5, the disclosure is not limited thereto. The plurality of devices 4000 are not limited to device types illustrated in FIG. 5.

Although each of the first device 4100, the second device 4200, and the new device 4300 includes only a processor, a memory, and a communication interface in FIG. 5, this is for convenience of explanation. In FIG. 5, elements required for each of the plurality of devices 4000 to execute an operation based on a control command are not shown in FIG. 5.

Some of the plurality of devices 4000 may store function determination models. In FIG. 5, the first device 4100 may include a communication interface 4110, a processor 4120, and the memory 4130, and the function determination model 4132 may be stored in the memory 4130. The function determination model 4132 stored in the first device 4100 may be a model used to obtain operation information about detailed operations for performing an operation of the first device 4100 and a relationship between the detailed operations. The function determination model 4132 may include an NLU model 4134 configured to analyze at least part of text received from the hub device 1000 or the IoT server 3000 and obtain operation information about an operation to be performed by the first device 4100 based on an analysis result of the at least part of the text. The function determination model 4132 may include an action plan management model 4136 configured to manage operation information related to a detailed operation of a device in order to generate detailed operations to be performed by the first device 4100 and an execution order of the detailed operations. The action plan management model 4136 may plan the detailed operations to be performed by the first device 4100 and the execution order of the detailed operations, based on an analysis result of the at least part of the text.

The second device 4200 may include a communication interface 4210, the processor 4220, and the memory 4230. The new device 4300 may include a communication interface 4310, the processor 4320, and a memory 4330. Each of the second device 4200 and the new device 4300 does not store a function determination model, unlike the first device 4100. Each of the second device 4200 and the new device 4300 does not receive at least part of text from the hub device 1000 (see FIG. 1) or the IoT server 3000 (see FIG. 1). Each of the second device 4200 and the new device 4300 may receive a control command from the hub device 1000 or the IoT server 3000, and may execute an operation based on the received control command.

However, this is for convenience of explanation, and the disclosure is not limited thereto. In an embodiment, the new device 4300 itself may include a function determination model for obtaining operation information about detailed operations for executing an operation of the new device 4300, a relationship between the detailed operations, and an execution order of the detailed operations.

The plurality of devices 4000 may transmit user account information and device information to the IoT server 3000 by using the communication interfaces 4110, 4210, and 4310. The device information may include at least one of, for example, identification information (e.g., device id information) of each of the plurality of devices 4000, a device type of each of the plurality of devices 4000, a function execution capability of each of the plurality of devices 4000, position information, or state information.

In an embodiment, at least one of the plurality of devices 4000 may include an updated function determination model for an added, changed, or removed function. For example, when a 'no-wind function (new function)' is added to the first device 4100, the function determination model 4132 stored in the memory 4130 of the first device 4100 may be updated. When the function determination model 4132 of the first device 4100 is updated, the first device 4100 may transmit information about the updated function determination model 4132 to the IoT server 3000 by using the communication interface 4110.

The new device 4300 may transmit user account information of a user who logs in to the new device 4300 and device information to the IoT server 3000 through the communication interface 4310. In an embodiment, the new device 4300 may transmit information about whether the new device 4300 itself includes a function determination model to the IoT server 3000, by using the communication interface 4310.

In an embodiment, the plurality of devices 4000 may transmit, to the hub device 1000 (see FIG. 1), user account information, information about whether each of the plurality of devices 4000 itself stores a device determination model, and information about whether each of the plurality of devices 4000 itself stores a function determination model, by using the communication interfaces 4110, 4210, and 4310.

Figure 6:
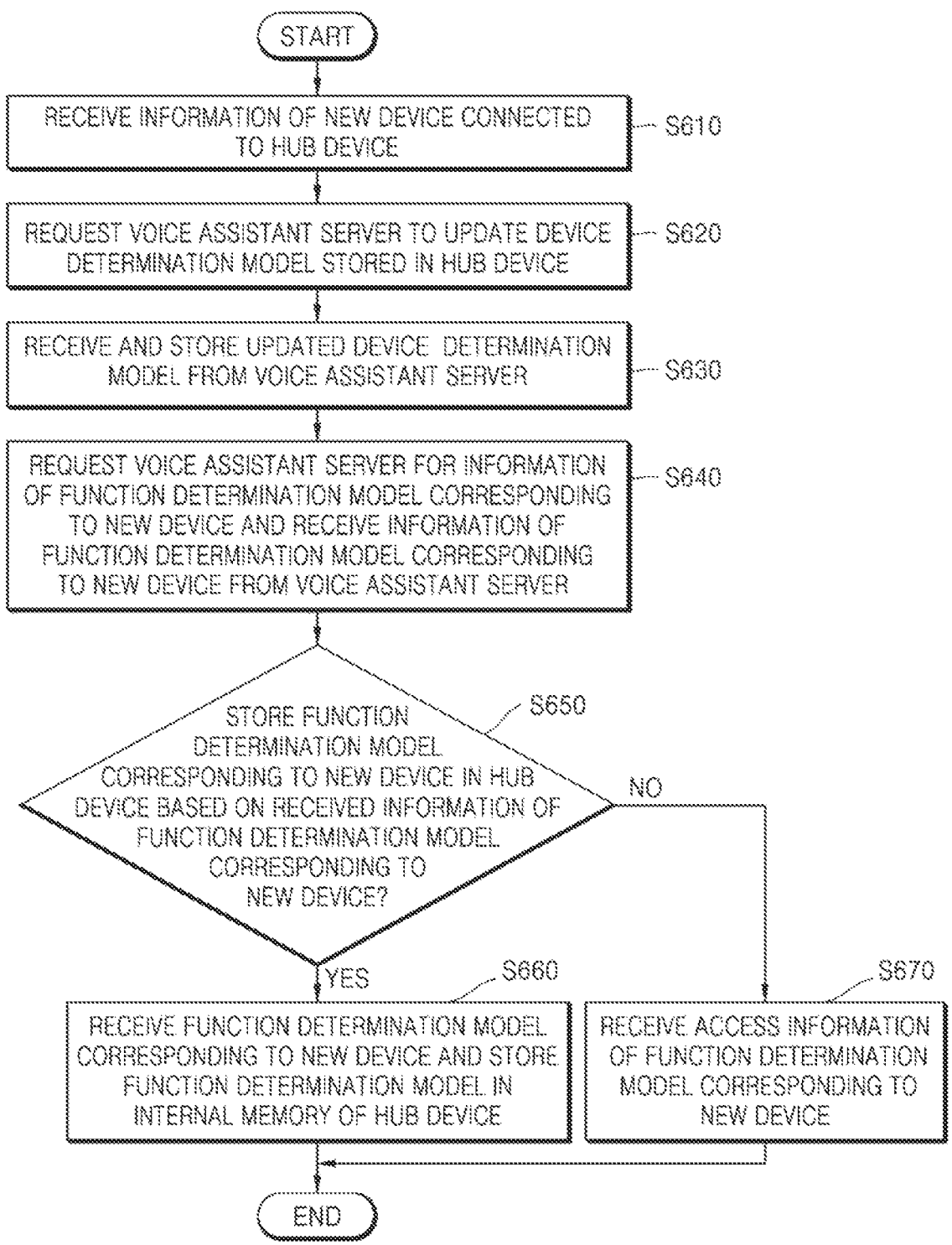
FIG. 6 is a flowchart of a method, performed by a hub device, of receiving and storing at least some of voice assistant models from a voice assistant server, according to an embodiment.

FIG. 6 is a flowchart of a method, performed by the hub device 1000, of receiving and storing at least some of voice assistant models from the voice assistant server 2000 according to an embodiment.

In operation S610, the hub device 1000 receives information of a new device connected to the hub device 1000. In an embodiment, the hub device 1000 may receive device information about the new device that is logged in by using the same user account as that of the hub device 1000 and is newly registered in the IoT server 3000 (see FIG. 1) by using the user account. The new device may be a device that is newly obtained by a user of the hub device 1000 through purchase or ownership transfer and is registered in the IoT server 3000 by being logged in by using the same user account as that of the hub device 1000. The device information of the new device received by the hub device 1000 may include at least one of, for example, identification information (e.g., device id information) of the new device, a device type of the new device, function execution capability information of the new device, or position information. In an embodiment, the hub device 1000 may receive state information about power on/off of the new device or an operation that is being currently executed.

The hub device 1000 may receive the device information of the new device from the IoT server 3000. However, the disclosure is not limited thereto, and the hub device 1000 may receive the device information of the new device from the voice assistant server 2000 (see FIG. 1).

In operation S620, the hub device 1000 requests the voice assistant server 2000 to update a device determination model stored in the hub device 1000. In an embodiment, the hub device 1000 may transmit a query signal for requesting to update a device determination model pre-stored in the memory 1300 (see FIG. 2) to the voice assistant server 2000 so that the hub device 1000 analyzes text related to the new device from a voice input of the user based on the device information of the new device received in operation S610 and determines the new device as an operation-performing device. In this case, the hub device 1000 may transmit user account information of the new device and identification information of the hub device 1000 (e.g., id information of the hub device 1000) along with the query signal to the voice assistant server 2000.

In operation S630, the hub device 1000 receives and stores the updated device determination model from the voice assistant server 2000. In an embodiment, the hub device 1000 may analyze the voice input of the user related to the new device, may download the updated device determination model from the voice assistant server 2000 to determine the new device as an operation-performing device as an analysis result, and may store the updated device determination model in the memory 1300 (see FIG. 2) in the hub device 1000.

In operation S640, the hub device 1000 requests the voice assistant server 2000 for information of a function determination model corresponding to the new device and receives the information of the function determination model corresponding to the new device from the voice assistant server 2000. In an embodiment, when the hub device 1000 requests the information of the function determination model corresponding to the new device, the hub device 1000 may transmit identification information (e.g., device id) of the hub device 1000 and the new device and user account information to the voice assistant server 2000.

The function determination model corresponding to the new device is a model for, when the new device is determined as an operation-performing device, obtaining information related to detailed operations to be performed by the new device, a relationship between each of the detailed operations and another detailed operation, and an execution order of the detailed operations. The information of the function determination model may include at least one of, for example, capacity information of a file constituting the function determination model corresponding to the new device, RAM occupancy information used to read the function determination model, or information about a simulated processing time required for the processor 1200 (see FIG. 2) of the hub device 1000 to obtain operation information through detailed operations according to a function and an order of the detailed operations by reading the function determination model.

In operation S650, the hub device 1000 determines whether to store the function determination model corresponding to the new device in the hub device 1000, based on the received information of the function determination model corresponding to the new device. In an embodiment, the hub device 1000 may determine whether to store the function determination model corresponding to the new device in the memory 1300 by monitoring resource states of the processor 1200 (see FIG. 2) and the memory 1300 (see FIG. 2) and comparing and analyzing resource state information and the information of the function determination model corresponding to the new device. The resource state information that is information indicating usage states of the processors 1200, 4120, 4220, and 4320 and the memories 1300, 4130, 4230, and 4330 of the hub device 1000 and the plurality of devices 4000 may include at least one of, for example, residual capacity, average RAM usage capacity, or average processor occupancy information of the memories 1300, 4130, 4230, and 4330 of the hub device 1000 and the plurality of devices 4000.

In an embodiment, the hub device 1000 may determine whether to download the function determination model corresponding to the new device from the voice assistant server 2000 and store the downloaded function determination model in the memory 1300 by monitoring in real time or periodically at least one of an average processing speed of the processor 1200, a residual capacity of the memory 1300, or an average RAM residual capacity and comparing monitoring result information with the information of the function determination model corresponding to the new device.

In another embodiment, the hub device 1000 may monitor resource state information of each of the plurality of devices 4000 (see FIG. 5) and may obtain the resource state information of each of the plurality of devices 4000. The resource state information of the plurality of devices 4000 that is information related to usage states of the processors 4120, 4220, and 4320 (see FIG. 5) and the memories 1300, 4130, 4230, and 4330 (see FIG. 5) may include at least one of residual capacity, average RAM usage capacity, or average processor occupancy information of the memories 4130, 4230, and 4330. The hub device 1000 may determine whether to store the function determination model corresponding to the new device in at least one of the plurality of devices 4000, based on the resource state information. The hub device 1000 may compare and analyze the information of the function determination model and the resource state information of each of the plurality of devices 4000, and may determine which one of the memories 4130, 4230, and 4330 of the plurality of devices 4000 is to be used to store the function determination model corresponding to the new device based on a comparison/analysis result.

In operation S650, a specific process, performed by the hub device 1000, of determining whether to store the function determination model corresponding to the new device will be described below in detail with reference to FIG. 7.

When the function determination model corresponding to the new device is determined to be stored (operation S660), the hub device 1000 receives the function determination model corresponding to the new device from the voice assistant server 2000 and stores the function determination model in the memory 1300 (see FIG. 2). Because the function determination model corresponding to the new device is stored in the memory 1300 in the hub device 1000, when the new device is determined as an operation-performing device, the hub device 1000 may obtain information about detailed operations about the new device, a relationship between the detailed operations, and an execution order of the detailed operations even without accessing the voice assistant server 2000. Accordingly, a time being consumed to access the voice assistant server 2000 and network usage fees may be prevented and a processing speed may be increased. Also, when a network may not be used, for example, when a wireless communication network may not be used or Wi-Fi communication may not be used, the hub device 1000 itself may obtain operation information about the new device.

Although the function determination model corresponding to the new device is stored in the memory 1300 of the hub device 1000 in operation S660, the disclosure is not limited thereto. When the hub device 1000 determines to store the function determination model corresponding to the new device in at least one of the plurality of devices 4000 based on the resource state information of each of the plurality of devices 4000 in operation S650, in operation S660, the hub device 1000 may receive the function determination model from the voice assistant server 2000 and may transmit the function determination model to the determined device.

In another embodiment, the hub device 1000 may transmit device information (e.g., device id) of the device determined to store the function determination model corresponding to the new device to the voice assistant server 2000. In this case, the voice assistant server 2000 may transmit the determined function determination model corresponding to the new device, based on the device information.

When the function determination model corresponding to the new device is determined not to be stored (operation S670), the hub device 1000 receives access information of the function determination model corresponding to the new device from the voice assistant server 2000. The access information may include at least one of, for example, identification information (e.g., server id) of the voice assistant server 2000 storing the function determination model corresponding to the new device, position information, IP address information, a MAC address, application programming interface (API) information accessible to the function determination model in the voice assistant server 2000, a use language of the function determination model, or identification information of the device. The hub device 1000 may store the received access information in the function determination model information database 1362 (see FIG. 2) in the memory 1300. Because the access information is stored in the memory 1300, the hub device 1000 may access the voice assistant server 2000 by using the access information even without storing the function determination model corresponding to the new device itself, and may obtain information about detailed operations about the new device, a relationship between the detailed operations, and an execution order of the detailed operations by using the function determination model corresponding to the new device stored in the voice assistant server 2000.

Figure 7:
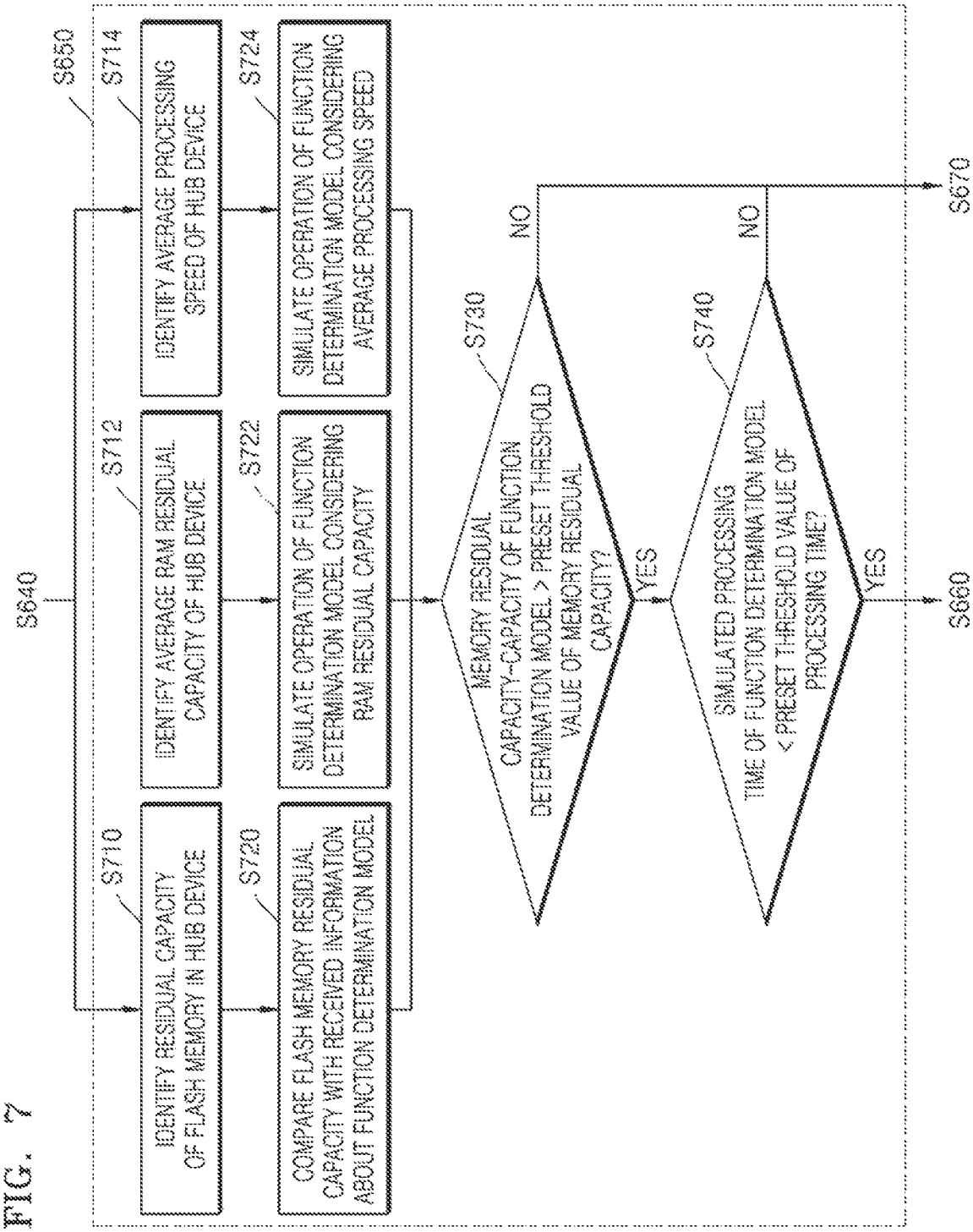
FIG. 7 is a flowchart of a method, performed by a hub device, of determining whether to store a function determination model based on information of the function determination model received from the voice assistant server, according to an embodiment.

FIG. 7 is a flowchart of a method, performed by the hub device 1000, of determining whether to store a function determination model based on information of the function determination model received from the voice assistant server 2000 according to an embodiment. FIG. 7 is a detailed flowchart of operation S650 of FIG. 6. Operations S710, S712, and S714 of FIG. 7 may be performed after operation S640 of FIG. 6.

In operation S710, the hub device 1000 identifies a residual capacity of a flash memory in the hub device 1000. The flash memory may be a storage medium that stores an updated device determination model and at least one function determination model in the hub device 1000. In an embodiment, the hub device 1000 may include a hard disk type, a solid state drive (SSD), or a card-type external memory (e.g., an SD or XD memory), instead of a flash memory type, as a storage medium.

In operation S712, the hub device 1000 identifies an average RAM residual capacity. The average RAM residual capacity indicates an average available RAM capacity, excluding an RAM capacity used by at least one application executed by the hub device 1000 to provide a service or at least one application executed in the background to receive a push notification or the like.

In operation S714, the hub device 1000 identifies an average processing speed. The hub device 1000 may identify an average processing speed of the processor 1200 (see FIG. 2). The average processing speed indicates an average computation speed at which the processor 1200 performs a function, for example, a function of executing at least one application, a function of converting a voice input of a user into text by performing ASR, or a function of determining an operation-performing device related to the text by using a device determination model.

Operations S710, S712, and S714 in which a resource state of the hub device 1000 is monitored and resource state information is obtained may be performed by the processor 1200 by using the resource tracking module 1350 stored in the memory 1300 (see FIG. 2). Operations S710, S712, and S714 may be performed in real time or periodically.

Although operations S710, S712, and S714 may be simultaneously performed, the disclosure is not limited thereto.

Operations S710, S712, and S714 may not be all performed, and at least one of operations S710, S712, and S714 may be performed. When one of operations S710, S712, and S714 is not performed, operations subsequent to the operation may also not be performed. For example, when operation S710 is not performed, operation S720 that is subsequent to operation S710 may not be performed.

Although operations S710, S712, and S714 respectively identify an internal flash memory residual capacity of the hub device 1000, an average RAM residual capacity of the hub device 1000, and an average processing speed of the hub device 1000, the disclosure is not limited thereto. In an embodiment, operations S710, S712, and S714 may respectively monitor a flash memory residual capacity, an average RAM residual capacity, and an average processing speed of the plurality of devices 4000 (see FIG. 5) other than the hub device 1000.

In operation S720, the hub device 1000 compares the flash memory residual capacity with received information about a function determination model. The information of the function determination model received in operation S640 may include at least one of capacity information of a file constituting the function determination model, RAM occupancy information used to read the function determination model, or information about a simulated processing time required for the processor 1200 (see FIG. 2) of the hub device 1000 to obtain operation information through detailed operations according to a function and an order of the detailed operations by reading the function determination model. The hub device 1000 may compare the flash memory residual capacity with the capacity information of the file constituting the function determination model. In an embodiment, the hub device 1000 may compare the flash memory residual capacity of each of the plurality of devices 4000 with the capacity information of the function determination model.

In operation S722, the hub device 1000 simulates an operation of the function determination model considering the RAM residual capacity. In an embodiment, the hub device 1000 may simulate a RAM occupancy capacity used by the processor 1200 to read and execute instructions written in a programming language included in the function determination model, by comparing the average RAM residual capacity identified in operation S712 with the RAM occupancy information in the information of the function determination model received in operation S640. In an embodiment, the hub device 1000 may simulate an operation of the function determination model considering the RAM residual capacity of each of the plurality of devices 4000.

In operation S724, the hub device 1000 simulates an operation of the function determination model considering the average processing speed. In one embodiment, the hub device 1000 may simulate a processing speed for reading the function determination model and obtaining operation information through detailed operations and an order of the detailed operations according to a read function, by comparing the average processing speed identified in operation S714 with the information about the simulated processing time in the information of the function determination model received in operation S640. In an embodiment, the hub device 1000 may simulate an operation of the function determination model considering the average processing speed of each of the processors 4120, 4220, and 4320 of the plurality of devices 4000.

In operation S730, the hub device 1000 determines whether a difference between the memory residual capacity and the capacity of the function determination model is greater than a preset threshold value of a memory residual capacity. In an embodiment, the hub device 1000 may calculate a difference value between the flash memory residual capacity and the capacity information of the file constituting the function determination model. The capacity information of the file constituting the function determination model may be obtained from the information of the function determination model received in operation S640. In an embodiment, the hub device 1000 may compare the calculated difference value with the preset threshold value of the memory residual capacity, and may determine whether the calculated difference value is greater than the preset threshold value as a comparison result.

When it is determined that the difference value between the flash memory residual capacity and the capacity of the function determination model is greater than the preset threshold value of the memory residual capacity (operation S740), the hub device 1000 determines whether the simulated processing time of the function determination model is less than a preset threshold value of a processing time. In an embodiment, the hub device 1000 may obtain information about the simulated processing time of the function determination model from the information of the function determination model received in operation S640. The hub device 1000 may compare the obtained simulated processing time of the function determination model with the preset threshold value of the processing time, and may determine whether the simulated processing time of the function determination model is less than the preset threshold value as a comparison result.

When it is determined that the difference value between the flash memory residual capacity and the capacity of the function determination model is less than the preset threshold value of the memory residual capacity (operation S670), the hub device 1000 receives access information of the function determination model corresponding to a new device from the voice assistant server 2000.

When it is determined that the simulated processing time of the function determination model is less than the preset threshold value of the processing time (operation S660), the hub device 1000 may receive the function determination model corresponding to the new device from the voice assistant server 2000 and may store the function determination model in an internal memory.

When it is determined that the simulated processing time of the function determination model is greater than the preset threshold value of the processing time (operation S670), the hub device 1000 receives the access information of the function determination model corresponding to the new device from the voice assistant server 2000.

Figure 8:
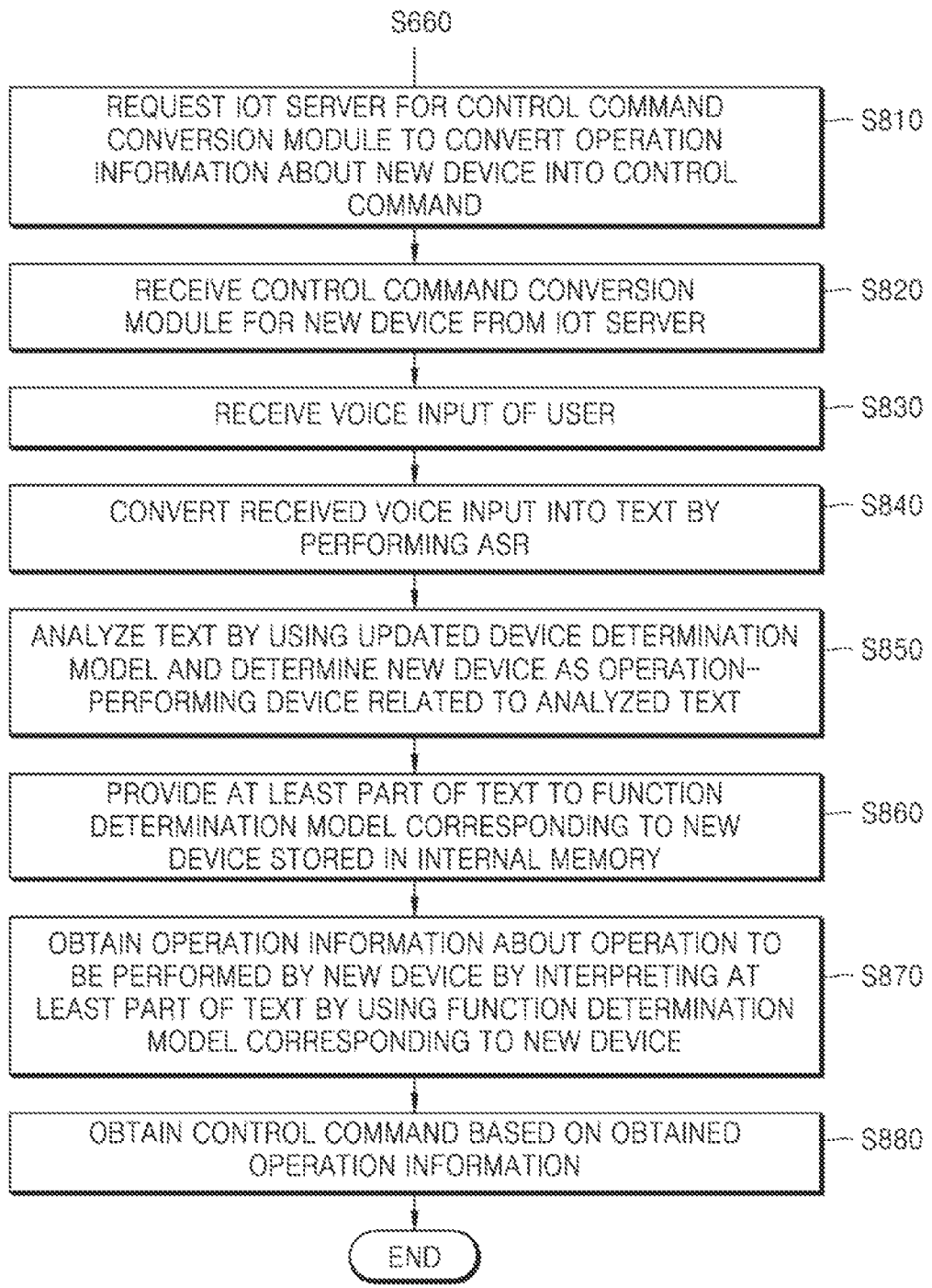
FIG. 8 is a flowchart of a method, performed by a hub device, of controlling an operation of a new device based on a voice input of a user, according to an embodiment.

FIG. 8 is a flowchart of a method, performed by the hub device 1000, of controlling an operation of a new device based on a voice input of a user according to an embodiment. FIG. 8 includes a series of operations performed after operation S660 of FIGS. 6 and 7. Operation S810 of FIG. 8 is an operation after the hub device 1000 receives a function determination model corresponding to a new device from the voice assistant server 2000 (see FIG. 1) and stores the received function determination model corresponding to the new device in an internal memory.

In operation S810, the hub device 1000 requests the IoT server 3000 (see FIG. 1) for a control command conversion module to convert operation information about the new device into a control command. The operation information about the new device that is information obtained by interpreting a voice input of a user by using the function determination model corresponding to the new device may be information related to detailed operations to be performed by the new device, a relationship between each of the detailed operations and another detailed operation, and an execution order of the detailed operations. The control command conversion module may be a module for converting the operation information into instructions or a set of instructions readable or executable by the new device so that the new device performs the detailed operations included in the operation information obtained by the hub device 1000. In an embodiment, the hub device 1000 may transmit a query for requesting identification information of the new device (e.g., id of the new device) and the control command conversion module to the IoT server 3000.

In operation S820, the hub device 1000 receives the control command conversion module for the new device from the IoT server 3000. In an embodiment, the hub device 1000 may store the received control command conversion module in the memory 1300 (see FIG. 2).

In operation S830, the hub device 1000 receives the voice input of the user. In an embodiment, the hub device 1000 may receive the voice input (e.g., the user's utterance) from the user through the microphone 1100 (see FIG. 2), and may obtain a voice signal from the received voice input. In an embodiment, the processor 1200 (see FIG. 2) of the hub device 1000 may convert a sound received through the microphone 1100 into an acoustic signal, and may obtain the voice signal by removing noise (e.g., a non-voice component) from the acoustic signal.

In operation S840, the hub device 1000 converts the received voice input into text, by performing automatic speech recognition (ASR). In an embodiment, the processor 1200 of the hub device 1000 may perform ASR that converts the voice signal into computer-readable text by using a pre-defined model such as an acoustic model (AM) or a language model (LM). When the hub device 1000 receives the acoustic signal from which noise is not removed, the processor 1200 may obtain the voice signal by removing noise from the received acoustic signal and may perform ASR on the voice signal.

In operation S850, the hub device analyzes the text by using an updated device determination model, and determines the new device as an operation-performing device related to the analyzed text. In an embodiment, the processor 1200 of the hub device 1000 may analyze the text by using an updated first NLU model included in the updated device determination model, and may determine the new device as an operation-performing device for performing an operation according to the user's intention from among a plurality of devices based on an analysis result of the text. The plurality of devices refer to devices that are logged in by using the same user account as that of the hub device 1000 and are connected to the hub device 1000 through a network. The plurality of devices may be devices that are registered in an IoT server by using the same user account as that of the hub device 1000.

The first NLU model is a model trained to analyze the text converted from the voice input and determine the operation-performing device based on an analysis result. The first NLU model may be used to determine an intent by interpreting the text and determine the operation-performing device based on the intent. The hub device 1000 may parse the text in units of morphemes, words, or phrases by using the first NLU model, and may infer the meaning of a word extracted from the parsed text by using linguistic features (e.g., grammatical constituents) of the morphemes, words, or phrases. The processor 1200 may compare the inferred meaning of the word with pre-defined intents provided by the first NLU model and may determine an intent corresponding to the inferred meaning of the word.

The hub device 1000 may determine a device related to the intent recognized from the text as the operation-performing device, based on a matching model for determining a relation between the intent and the device. In an embodiment, the matching model may be obtained through learning through a rule-based system, but the disclosure is not limited thereto.

In an embodiment, the hub device 1000 may obtain a plurality of numerical values indicating relation degrees between the intent and the plurality of devices by applying the matching model to the intent, and may determine a device having a largest value from among the obtained plurality of numerical values as a final operation-performing device. For example, when the intent is related to each of a first device and a second device, the hub device 1000 may obtain a first numerical value indicating a relation degree between the intent and the first device and a second numerical value indicating a relation degree between the intent and the second device, and may determine the first device having a larger numerical value from among the first numerical value and the second numerical value as the operation-performing device.

Although the hub device 1000 may train the matching model between the intent and the operation-performing device by using, for example, a rule-based system, the disclosure is not limited thereto. An AI model used by the hub device 1000 may be, for example, a neural network-based system (e.g., a convolution neural network (CNN) or a recurrent neural network (RNN)), a support-vector machine (SVM), linear regression, logistic regression, Naïve Bayes, a random forest, a decision tree, or a k-nearest neighbor algorithm. Alternatively, the AI model may be a combination of the above examples or any of other AI models.

The updated device determination model may be a model trained to determine an operation-performing device from among the plurality of devices that are pre-registered and the new device that is newly registered according to a user account of the hub device 1000. In an embodiment, the updated device determination model may be a model updated through learning or the like to analyze text about the new device, obtain an intent as an analysis result of the text, and determine the new device as an operation-performing device based on the obtained intent.

The updated device determination model may analyze and calculate a numerical value indicating a relation degree between the intent obtained from the text and each of the new device that is newly registered by being logged in by using the same user account as the user account of the hub device 1000 and the plurality of pre-registered devices, and may determine a device having a largest numerical value as an operation-performing device.

In an embodiment, the hub device 1000 may receive device information about each of the new device that is newly registered according to the user account and the plurality of pre-registered devices from the voice assistant server 2000 (see FIG. 1). The device information may include at least one of, for example, identification information (e.g., device id information) of each of the new device and the plurality of devices, a device type, a function execution capability, position information, or state information. The hub device 1000 may determine a device for performing an operation according to the intent from among the new device and the plurality of devices based on the received device information. In an embodiment, the hub device 1000 may determine the new device as an operation-performing device by analyzing the text by using the updated device determination model.

In operation S860, the hub device 1000 provides at least part of the text to the function determination model corresponding to the new device stored in then internal memory. Although not shown in FIG. 8, in operation S860, the hub device 1000 may select the function determination model corresponding to the new device from among one or more function determination models pre-stored in the internal memory. The 'function determination model corresponding to the new device' refers to a model used to obtain operation information about detailed operations for performing an operation according to a function determined by the new device determined as an operation-performing device, a relationship between the detailed operations, and an execution order of the detailed operations.

The hub device 1000 provides at least part of the text to the selected function determination model. In an embodiment, the processor 1200 (see FIG. 2) of the hub device 1000 may provide at least part of the text, instead of the whole of the text, to the selected function determination model. For example, when the new device is an air purifier and text converted from a voice input is "execute the deodorization mode in the air purifier", a name of an operation-performing device is specified in the phrase 'in the air purifier', and thus the phrase 'in the air purifier' may be unnecessary information for the function determination model corresponding to the new device. The processor 1200 may parse the text in units of words or phrases by using the updated first NLU model, may recognize a word or a phrase specifying a name, a common name, or an installation position of a device, and may provide part of the text other than the recognized word or phrase to the function determination model.

In operation S870, the hub device 1000 obtains operation information about an operation to be performed by the new device by interpreting the at least part of the text by using the function determination model corresponding to the new device. In an embodiment, the processor 1200 (see FIG. 2) of the hub device 1000 may analyze the at least part of the text by using a second NLU model included in the function determination model corresponding to the new device. The processor 1200 may parse the text in units of morphemes, words, or phrases by using the second NLU model, may recognize the meaning of a morpheme, a word, or a phrase parsed through grammatical or semantic analysis, and may determine an intent and parameters by matching the recognized meaning to pre-defined words. The 'parameters' used herein refer to variable information for determining detailed operations of an operation-performing device related to the intent. When text provided to the function determination model corresponding to the new device is "execute the deodorization mode", an intent may be 'operation mode execution' and parameters may be a 'deodorization mode' that is a mode to be performed.

The processor 1200 (see FIG. 2) may obtain operation information about at least one detailed operation related the intent and the parameters, by using an action plan management module of the function determination model corresponding to the new device. The action plan management module may manage information about detailed operations of the new device determined as an operation-performing device and a relationship between the detailed operations. The processor 1200 may plan detailed operations to be performed by the new device and an execution order of the detailed operations based on the intent and the parameters by using the action plan management module, and thus may obtain operation information.

The operation information may be information related to detailed operations to be performed by the new device and an execution order of the detailed operations. The operation information may include information related to detailed operations to be performed by the new device, a relationship between each of the detailed operations and another detailed operation, and an execution order of the detailed operations. The operation information may include, but is not limited to, functions to be executed by the new device to perform a specific operation, an execution order of the functions, an input value required to execute the functions, and an output value output as an execution result of the functions.

In operation S880, the hub device 1000 obtains a control command based on the obtained operation information. The control command refers to instructions or a set of instructions readable or executable by the new device so that the new device performs the detailed operations included in the operation information.

Figure 9:
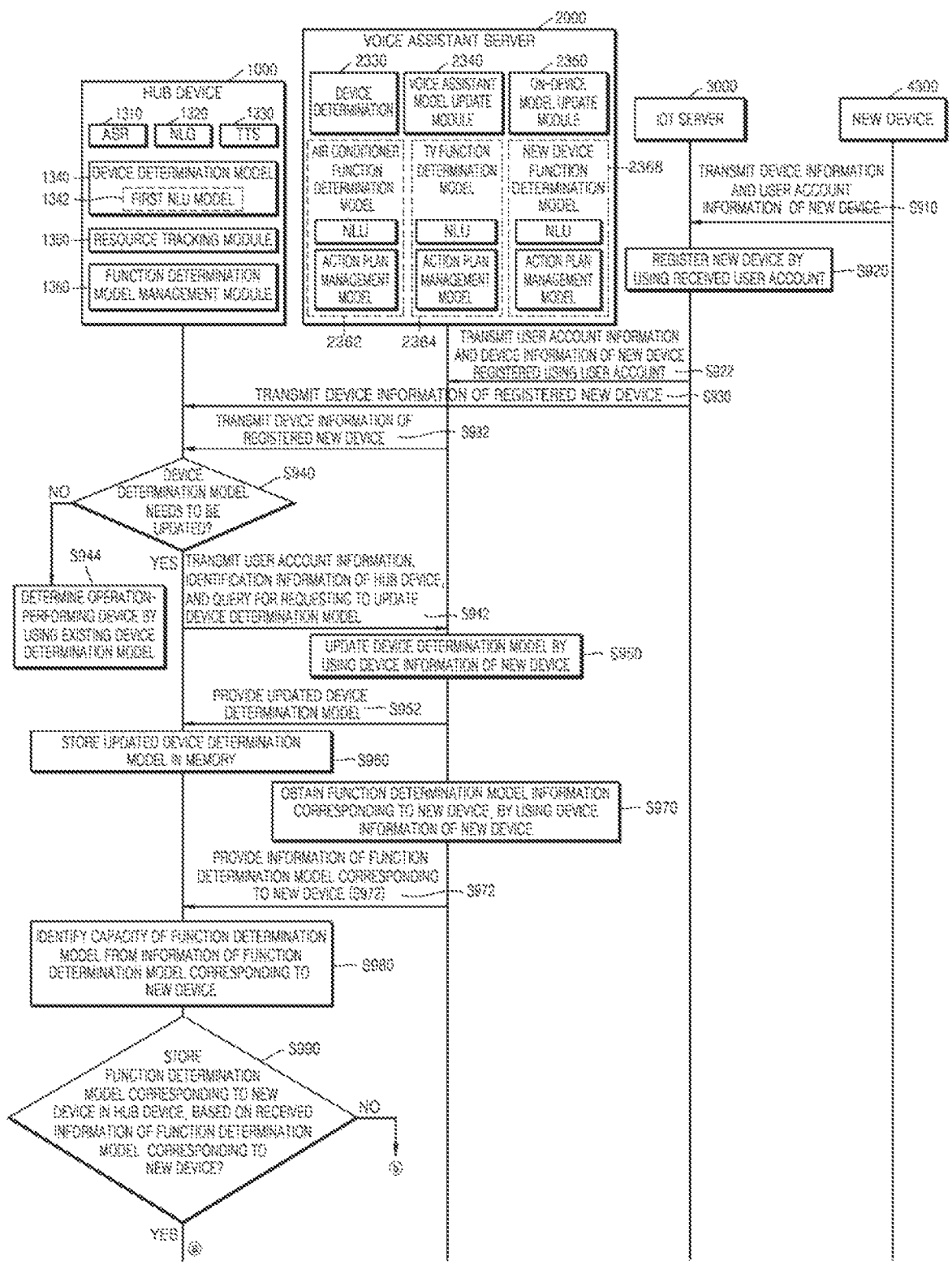
FIG. 9 is a flowchart of an operating method of a hub device, a voice assistant server, an IoT server, and a new device, according to an embodiment.

FIG. 9 is a flowchart of an operating method of the hub device 1000, the voice assistant server 2000, the IoT server 3000, and the new device 4300 according to an embodiment.

FIG. 9 illustrates operations of entities in a multi-device system environment including the hub device 1000, the voice assistant server 2000, the IoT server 3000, and an operation-performing device 4000*a*. Referring to FIG. 9, the hub device 1000 may include the ASR module 1310, the NLG module 1320, the TTS module 1330, the device determination model 1340, the resource tracking module 1350, and the function determination model management module 1360. In FIG. 9, the hub device 1000 may not store a function determination model, or may not store a function determination model corresponding to a new device.

The ASR module 1310, the NLG module 1320, the TTS module 1330, the device determination model 1340, the resource tracking module 1350, and the function determination model management module 1360 of FIG. 9 are the same as those illustrated in FIG. 2, and thus a repeated explanation will be omitted.

The voice assistant server 2000 may store the device determination model 2330, the voice assistant model update module 2340, the on-device model update module 2350, and the plurality of function determination models 2362, 2364, and 2368. For example, the function determination model 2362 that is a first function determination model and is stored in the voice assistant server 2000 may be a model used to determine a function of an air conditioner and obtain operation information about detailed operations related to the determined function and a relationship between the detailed operations. For example, the function determination model 2364 that is a second function determination model may be a model used to determine a function of a TV and obtain operation information about detailed operations related to the determined function and a relationship between the detailed operations, and the function determination model 2368 may be a model used to determine a function of an air purifier that is a new device and obtain operation information about detailed operations related to the determined function and a relationship between the detailed operations.

In FIG. 9, it may be determined that the operation-performing device 4000*a* is an 'air purifier' that is the new device 4300, and the function determination model 2368 corresponding to the air purifier may be stored in the voice assistant server 2000.

In operation S910, the new device 4300 transmits device information and user account information of the new device 4300 to the IoT server 3000. When a user of the hub device 1000 obtains the new device 4300, turns on the new device 4300, and then logs on to the new device 4300 by inputting a user account, the new device 4300 may transmit the user account information and the device information obtained during a login process to the IoT server 3000. The device information transmitted to the IoT server 3000 may include at least one of, for example, identification information of the new device (e.g., id information of the new device 4300), a device type of the new device 4300, function execution capability information of the new device 4300, position information, or state information.

In operation S920, the IoT server 3000 registers the new device 4300 by using the received user account. The IoT server 3000 may classify and register a plurality of devices according to user accounts.

The new device 4300 (or first device) may refer to a device that is newly obtained by the same user as the user of the hub device 1000 and is registered in the IoT server 3000 by being logged in by using the same user account as that of the hub device 1000.

In operation S922, the IoT server 3000 transmits the user account information and the device information of the new device 4300 registered by using the user account to the voice assistant server 2000.

In operation S930, the IoT server 3000 transmits the device information of the new device 4300 to the hub device 1000. The IoT server 3000 may identify the hub device 1000 that is pre-registered by using the received user account, and may transmit the device information of the new device 4300 to the identified hub device 1000.

In operation S932, the voice assistant server 2000 transmits the device information of the new device 4300 to the hub device 1000. The voice assistant server 2000 may identify the hub device 1000 that is pre-registered by using the user account received from the IoT server 3000, and may transmit the device information of the new device 4300 to the identified hub device 1000.

In operation S940, the hub device 1000 determines whether the device determination model 1340 needs to be updated. In an embodiment, the hub device 1000 may determine whether the device determination model 1340 stored in the memory 1300 (see FIG. 2) may determine the new device 4300 as an operation-performing device from a voice input of the user. For example, the hub device 1000 may analyze text converted from the voice input of the user by using the first NLU model 1342 included in the device determination model 1340, and may determine whether utterance data for obtaining an intent related to a function of the new device 4300 is included.

When it is determined that the device determination model 1340 related to the new device 4300 does not need to be updated (operation S944), the hub device 1000 determines an operation-performing device by using the device determination model 1340. In operation S944, the device determination model 1340 that is a model pre-stored in the memory 1300 (see FIG. 2) before the hub device 1000 receives the device information of the new device 4300 may obtain an intent related to the new device 4300 from the text even without a separate updating process and may determine the new device 4300 as an operation-performing device based on the obtained intent.

When it is determined that the device determination model 1340 related to the new device 4300 needs to be updated (operation S942), the hub device 1000 transmits user account information, identification information of the hub device 1000, and a query for requesting to update a device determination model to the voice assistant server 2000.

In operation S950, the voice assistant server 2000 updates the device determination model 2330 by using the device information of the new device 4300. The voice assistant server 2000 may update the device determination model 2330 to a new model by using the voice assistant model update module 2340 through learning or the like so that the device determination model 2330 interprets the intent from the text based on the received device information of the new device 4300 and determines the new device 4300 as an operation-performing device related to the intent as an interpretation result. In an embodiment, the voice assistant model update module 2340 may update a first NLU model to a new model through learning or the like so that the first NLU model of the device determination model 2330 interprets the text related to the new device 4300.

In operation S952, the voice assistant server 2000 provides the updated device determination model 2330 to the hub device 1000. In an embodiment, the voice assistant server 2000 may transmit at least one file constituting the updated device determination model 2330 to the hub device 1000.

In operation S960, the hub device 1000 stores the updated device determination model 2330 in the memory 1300 (see FIG. 2). In an embodiment, the updated device determination model 2330 received from the voice assistant server 2000 may replace the device determination model 1340 pre-stored in the hub device 1000 by using overwriting.

In operation S970, the voice assistant server 2000 obtains function determination model information corresponding to the new device 4300, by using the device information of the new device 4300. In an embodiment, the voice assistant server 2000 may obtain the function determination model 2368 corresponding to the new device 4300 by using the device information of the new device 4300 received from the IoT server 3000 in operation S922, and may store the obtained function determination model 2368 in the memory 2300 (see FIG. 3) in addition to the function determination models 2362 and 2364.

In operation S972, the voice assistant server 2000 provides information of the function determination model corresponding to the new device 4300 to the hub device 1000. The information of the function determination model may include at least one of, for example, capacity information of the function determination model 2368, RAM occupancy information used to read the function determination model 2368, or information about a simulated processing time required for the processor 1200 (see FIG. 2) of the hub device 1000 to obtain operation information through detailed operations according to a function and an order of the detailed operations by reading the function determination model 2368.

In operation S980, the hub device 1000 identifies a capacity of the function determination model 2368 from the information of the function determination model corresponding to the new device 4300. In an embodiment, the hub device 1000 may identify a capacity of at least one file constituting the function determination model 2368 from the information of the function determination model received from the voice assistant server 2000. However, the disclosure is not limited thereto, and the hub device 1000 may identify RAM occupancy information used to read the function determination model 2368 from the information of the function determination model and information about the simulated processing time required for the processor 1200 (see FIG. 2) of the hub device 1000 to read the function determination model 2368. In operation S990, the hub device 1000 determines whether to store the function determination model 2368 corresponding to the new device 4300 in the memory 1300 (see FIG. 2) in the hub device 1000, based on the received information of the function determination model 2368 corresponding to the new device 4300. Operation S990 is the same as operation S650 of FIG. 7 (including operations S710 through S740), and thus a repeated explanation will be omitted.

Figure 10:
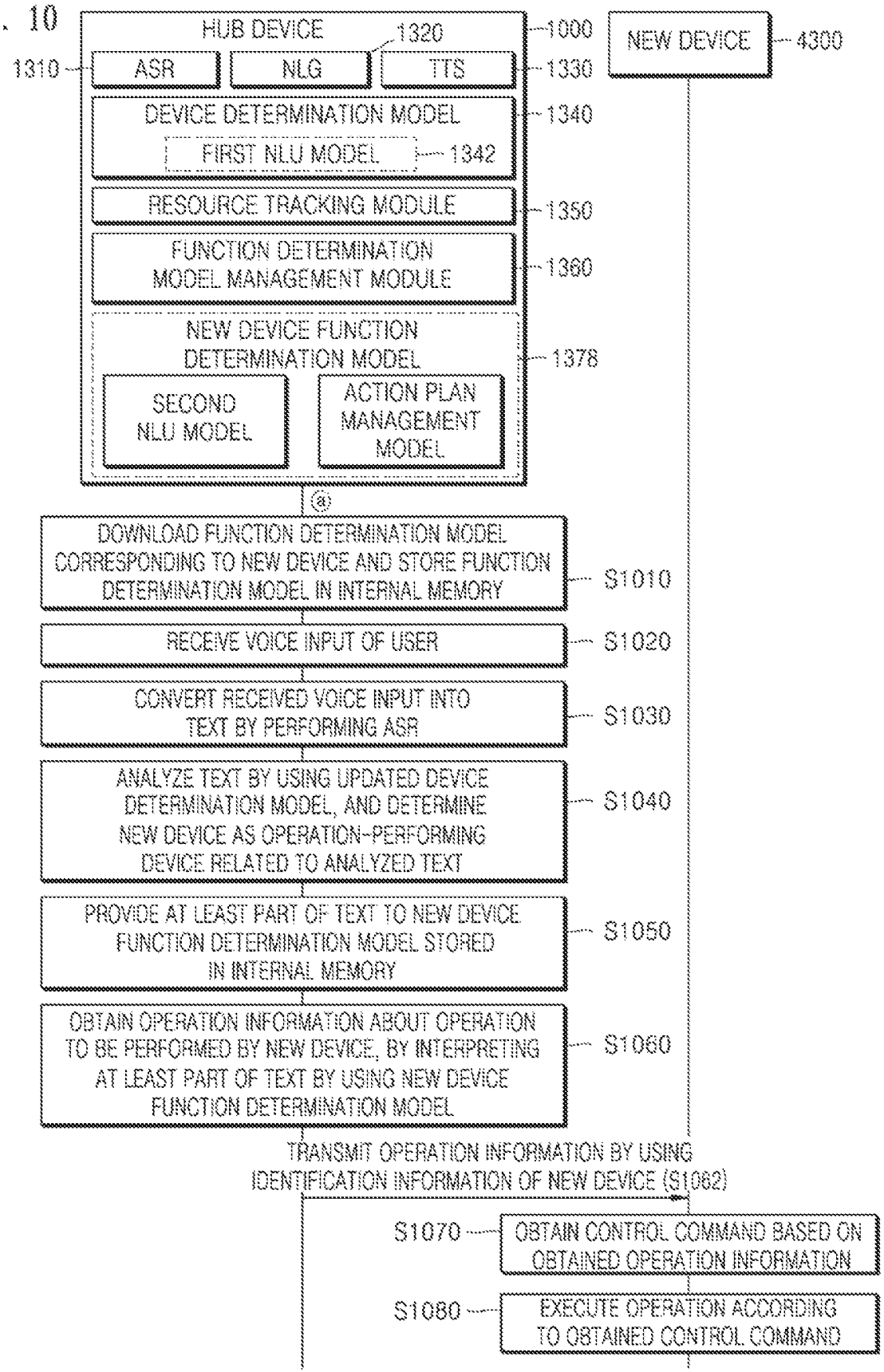
FIG. 10 is a flowchart of an operating method of a hub device and a new device, according to an embodiment.

FIG. 10 is a flowchart of an operating method of the hub device 1000 and the new device 4300 according to an embodiment.

FIG. 10 is a flowchart showing operations of entities in a multi-device system environment including the hub device 1000 and the new device 4300 after step (a) of FIG. 9. Step (a) of FIG. 9 indicates a state where it is determined that the hub device 1000 stores the function determination model 2368 corresponding to the new device 4300 in the hub device 1000.

In operation S1010, the hub device 1000 may download the function determination model 2368 corresponding to the new device 4300 from the voice assistant server 2000 and may store the function determination model 2368 in the memory 1300 (see FIG. 2). Referring to FIG. 10, the hub device 1000 may include a new device function determination model 1378. In operation S1010, the hub device 1000 may transmit a query for requesting to transmit the function determination model 2368 corresponding to the new device 4300 to the voice assistant server 2000, may download the function determination model 2368 from the voice assistant server 2000, and may store the function determination model 2368 in the memory 1300. The new device function determination model 1378 included in the hub device 1000 may be the same as the function determination model 2368 corresponding to the new device 4300 received from the voice assistant server 2000.

In operation S1020, the hub device 1000 receives a voice input of a user.

In operation S1030, the hub device 1000 converts the received voice input into text by performing ASR.

In operation S1040, the hub device 1000 analyzes the text by using the updated device determination model 1340 and determines the new device 4300 as an operation-performing device related to the analyzed text.

In operation S1050, the hub device 1000 provides at least part of the text to the new device function determination model 1378 stored in the memory 1300.

In operation S1060, the hub device 1000 obtains operation information about an operation to be performed by the new device 4300, by interpreting the at least part of the text by using the new device function determination model 1378.

Operations S1020 through S1060 are the same as operations S830 through S870 of FIG. 8, and thus a repeated explanation will be omitted.

In operation S1062, the hub device 1000 transmits the operation information by using identification information of the new device 4300. In an embodiment, the hub device 1000 may identify the new device 4300 by using the identification information of the new device 4300, for example, id information of the new device 4300, and may transmit the operation information to the identified new device 4300.

In operation S1070, the new device 4300 obtains a control command based on the obtained operation information. In operation S1070, the new device 4300 itself may include a control command conversion module for converting the operation information into a control command. The new device 4300 may convert the operation information into instructions or a set of instructions readable or executable by the new device 4300 by using the control command conversion module.

In operation S1080, the new device 4300 executes an operation according to the obtained control command.

In an embodiment, after executing the operation, the new device 4300 may transmit information about an operation execution result to the hub device 1000. However, the disclosure is not limited thereto, and the new device 4300 may transmit the information about the operation execution result to the IoT server 3000 (see FIG. 1).

Figure 11:
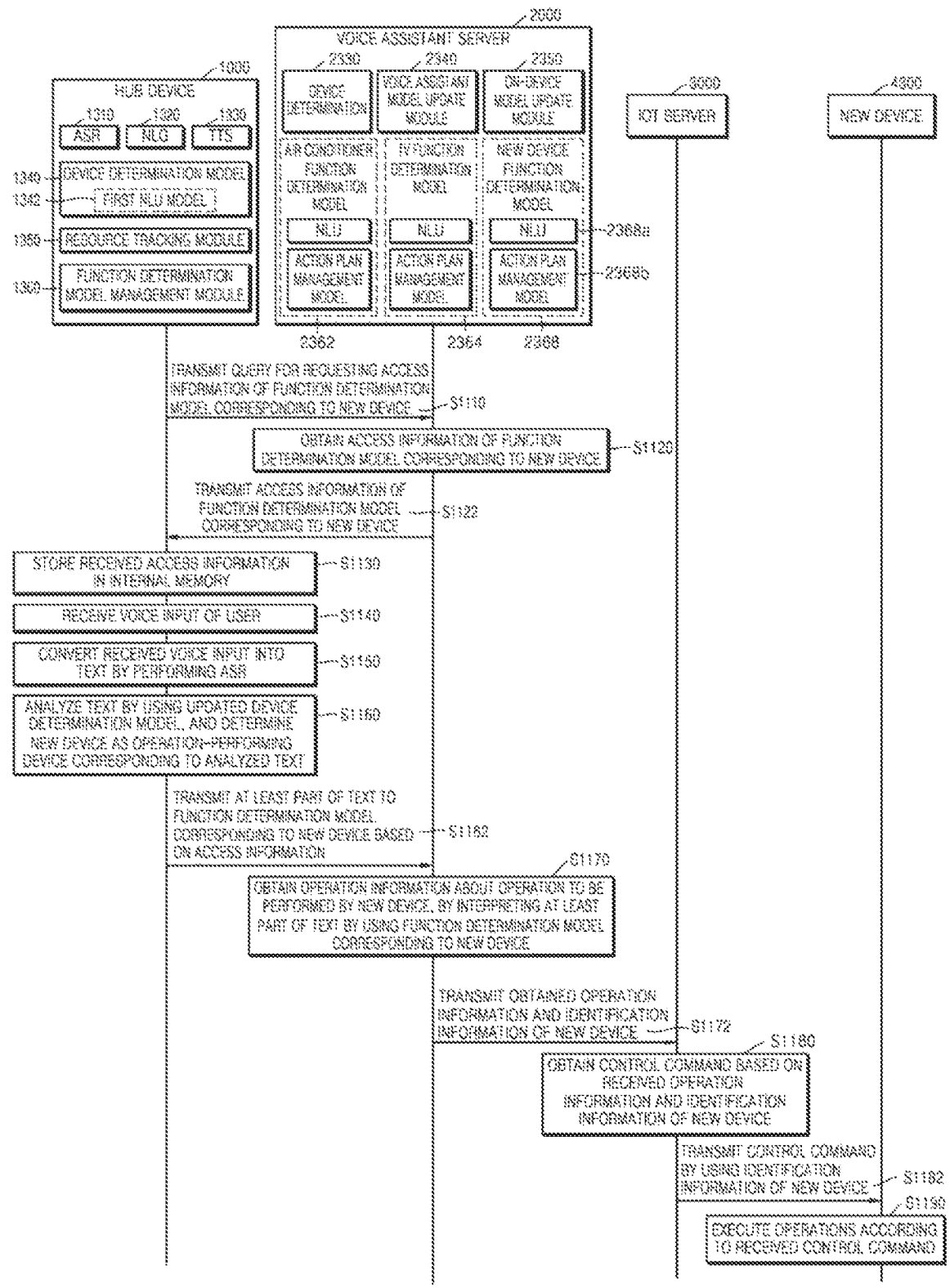
FIG. 11 is a flowchart of an operating method of a hub device, a voice assistant server, an IoT server, and a new device, according to an embodiment.

FIG. 11 is a flowchart of an operating method of the hub device 1000, the voice assistant server 2000, the IoT server 3000, and the new device 4300 according to an embodiment.

FIG. 11 is a flowchart showing operations of entities in a multi-device system environment including the hub device 1000, the voice assistant server 2000, the IoT server 3000, and the new device 4300 after step ⓑ of FIG. 9. Step ⓑ of FIG. 9 indicates a state where the hub device 1000 does not store the function determination model 2368 corresponding to the new device 4300 in the hub device 1000. Unlike the hub device 1000 of FIG. 10, the hub device 1000 of FIG. 11 does not include the new device function determination model 1378 because, in step ⓑ, it is determined that the function determination model 2368 corresponding to the new device 4300 is not stored in the memory 1300 (see FIG. 2).

In operation S1110, the hub device 1000 transmits a query for requesting the voice assistant server 2000 for access information of the function determination model 2368 corresponding to the new device 4300. The access information may include at least one of, for example, identification information (e.g., server id) of the voice assistant server 2000 storing the function determination model 2368 corresponding to the new device 4300, position information, IP address information, a MAC address, application programming interface (API) information accessible to the function determination model 2368 in the voice assistant server 2000, a use language of the function determination model 2368, or identification information of the corresponding new device 4300. In operation S1110, the hub device 1000 may transmit identification information and user account information of the hub device 1000 to the voice assistant server 2000.

In operation S1120, the voice assistant server 2000 obtains the access information of the function determination model 2368 corresponding to the new device 4300.

In operation S1122, the voice assistant server 2000 transmits the access information of the function determination model 2368 corresponding to the new device 4300 to the hub device 1000.

In operation S1130, the hub device 1000 stores the received access information in the memory 1300 (see FIG. 2).

In operation S1140, the hub device 1000 receives a voice input of a user.

In operation S1150, the hub device 1000 converts the received voice input into text by performing ASR.

In operation S1160, the hub device 1000 analyzes the text by using the updated device determination model 1340 and determines the new device 4300 as an operation-performing device corresponding to the analyzed text.

Operations S1140 through S1160 are the same as operations S830 through S850 of FIG. 8, and thus a repeated explanation will be omitted.

In operation S1162, the hub device 1000 transmits at least part of the text to the function determination model 2368 corresponding to the new device 4300 based on the access information. In an embodiment, the hub device 1000 may identify the voice assistant server 2000 storing the function determination model 2368 at least one of the identification information (e.g., server id) of the voice assistant server 2000 storing the function determination model 2368 corresponding to the new device 4300, the position information, the IP address information, the MAC address, the API information accessible to the function determination model 2368 in the voice assistant server 2000, the use language of the function determination model 2368, or the identification information of the new device 4300, and may transmit the at least part of the text to the function determination model 2368 of the voice assistant server 2000.

In operation S1170, the voice assistant server 2000 obtains operation information about an operation to be performed by the new device 4300 by interpreting the at least part of the text by using the function determination model 2368 corresponding to the new device 4300. In an embodiment, the voice assistant server 2000 selects the function determination model 2368 corresponding to the new device 4300 from among the plurality of function determination models 2362, 2364, and 2368, interprets the text by using an NLU model 2368a of the selected function determination model 2368, and determines an intent based on an analysis result. The voice assistant server 2000 may analyze the at least part of the text received from the hub device 1000, by using the NLU model 2368a of the function determination model 2368. The NLU model 2368a that is an AI model trained to interpret the text related to the new device 4300 may be a model trained to determine an intent and parameters related to an operation intended by the user. The NLU model 2368a may be a model trained to determine a function related to a type of the new device 4300 when the text is input.

In an embodiment, the voice assistant server 2000 may parse the at least part of the text in units of words or phrases by using the NLU model 2368a, may infer the meaning of a word extracted from the parsed text by using linguistic features (e.g., grammatical elements) of parsed morphemes, words, or phrases, and may obtain an intent and parameters from the text by matching the inferred meaning to predefined intents and parameters. In an embodiment, the voice assistant server 2000 may determine only the intent from the at least part of the text.

The voice assistant server 2000 obtains operation information about an operation to be performed by the new device 4300 based on the intent. In an embodiment, the voice assistant server 2000 plans the operation information to be performed by the new device 4300 based on the intent and the parameters, by using an action plan management module 2368b of the function determination model 2368. The action plan management module 2368b may interpret operations to be performed by the new device 4300 based on the intent and the parameters. The action plan management module 2368b may select detailed operations related to the interpreted operations from among operations of devices that are pre-stored, and may plan an execution order of the selected detailed operations. The action plan management module 2368b may obtain operation information about a detailed operation to be performed by the new device 4300 by using a planning result.

In operation S1172, the voice assistant server 2000 transmits the obtained operation information and the identification information of the new device 4300 to the IoT server 3000.

In operation S1180, the IoT server 3000 obtains a control command based on the identification information of the new device 4300 and the received operation information. The IoT server 3000 may include a database in which control commands and operation information for a plurality of devices are stored. In an embodiment, the IoT server 3000 may select a control command for controlling detailed operations of the new device 4300 based on the identification information of the new device 4300, from among the control commands related to the plurality of devices pre-stored in the database.

In operation S1182, the IoT server 3000 transmits the control command to the new device 4300 by using the identification information of the new device 4300.

In operation S1190, the new device 4300 executes operations corresponding to the control command, according to the received control command.

In an embodiment, after executing the operations, the new device 4300 may transmit information about an operation execution result to the IoT server 3000.

FIG. 12A is a conceptual diagram showing operations of a hub device and a listener device according to an embodiment;

Arrows in FIG. 12A indicate movement, transmission, and reception of data including a voice signal and text between a first device 4100a and a second device 4200a. Circled numbers indicate an order of operations.

The first device 4100a and the second device 4200a may be connected to each other by using a wired or wireless communication method and may perform communication. In an embodiment, the first device 4100a and the second device 4200a may be directly connected to each other through a communication network, but the disclosure is not limited thereto. In an embodiment, the first device 4100a and the second device 4200a may be connected to the voice assistant server 2000 (see FIG. 3), and may be connected to each other through the voice assistant server 2000.

Referring to FIG. 12A, the first device 4100a may be a listener device that receives a voice input from a user, and the second device 4200b may be a hub device that determines an operation-performing device by interpreting the voice input and controls the determined operation-performing device to perform an operation. For example, the first device 4100a may be an air conditioner, and the second device 4200a may be a TV.

The first device 4100a may be a listener device that receives a voice input including an utterance from the user. The listener device may be a device that only receives a voice input from the user, but the disclosure is not limited thereto. In an embodiment, the listener device may be an operation-performing device that performs an operation related to a specific function by receiving a control command from the hub device (the second device 4200a in FIG. 12A).

In an embodiment, the listener device may receive a voice input related to a function performed by the listener device from the user. For example, the first device 4100a receives a voice input such as "lower the air conditioner temperature to 20° C." from the user (step ①).

In an embodiment, the first device 4100a may convert a sound received through a microphone into an acoustic signal, and may obtain a voice signal by removing noise (e.g., a non-voice component) from the acoustic signal.

The second device 4100a transmits the voice signal to the second device 4200a that is a hub device (step ②).

The second device 4200a that is a hub device receives the voice signal from the first device 4100a, converts the voice signal into text, and determines the listener device as an operation-performing device by interpreting the text (step ③). In an embodiment, the second device 4200a may convert the voice signal into the text, by performing automatic speech recognition (ASR) by using data of an ASR module that is pre-stored in a memory. The second device 4200a may detect an intent from the text by interpreting the text by using a device determination model that is pre-stored in the memory, and may determine a device for performing an operation corresponding to the detected intent. In FIG. 12A, the second device 4200a may determine the first device 4100a as an operation-performing device.

A function determination model corresponding to the operation-performing device determined by the second device 4200a that is a hub device may be pre-stored in the memory of the hub device, may be stored in the first device 4100a itself that is determined as the operation-performing device, or may be stored in the memory 2300 (see FIG. 3) of the voice assistant server 2000 (see FIG. 3). A 'function determination model' corresponding to each device is a model used to obtain operation information about detailed operations for performing an operation according to a determined function of the device and a relationship between the detailed operations.

In FIG. 12A, the function determination model corresponding to the first device 4100a may be pre-stored in the memory of the first device 4100a. For example, the first device 4100a may store the function determination model 4132 (see FIG. 5) used to obtain operation information about detailed operations corresponding to an air conditioner and a relationship between the detailed operations.

The second device 4200a that is a hub device provides the text to the function determination model of the listener device (step ④).

The first device 4100a executes an operation by interpreting the received text (step ⑤). In an embodiment, the first device 4100a may analyze at least part of the text by using the NLU model 4134 (see FIG. 5) included in the function determination model 4132, and may obtain operation information about an operation to be performed by the first device 4100a based on an analysis result of the at least part of the text. The function determination model 4132 may include the action plan management module 4136 (see FIG. 5) configured to manage operation information related to a detailed operation of a device in order to generate detailed operations to be performed by the first device 4100a and an execution order of the detailed operations. The action plan management module 4136 may manage operation information about detailed operations executed by the first device 4100a and a relationship between the detailed operations. The action plan management module 4136 may plan detailed operations to be performed by the first device 4100a and an execution order of the detailed operations, based on an analysis result of the at least part of the text. The first device 4100a may plan the detailed operations and the execution order of the detailed operations based on an analysis result of the at least part of the text by the function determination model 4132, and may execute an operation based on a planning result.

Figure 12B:
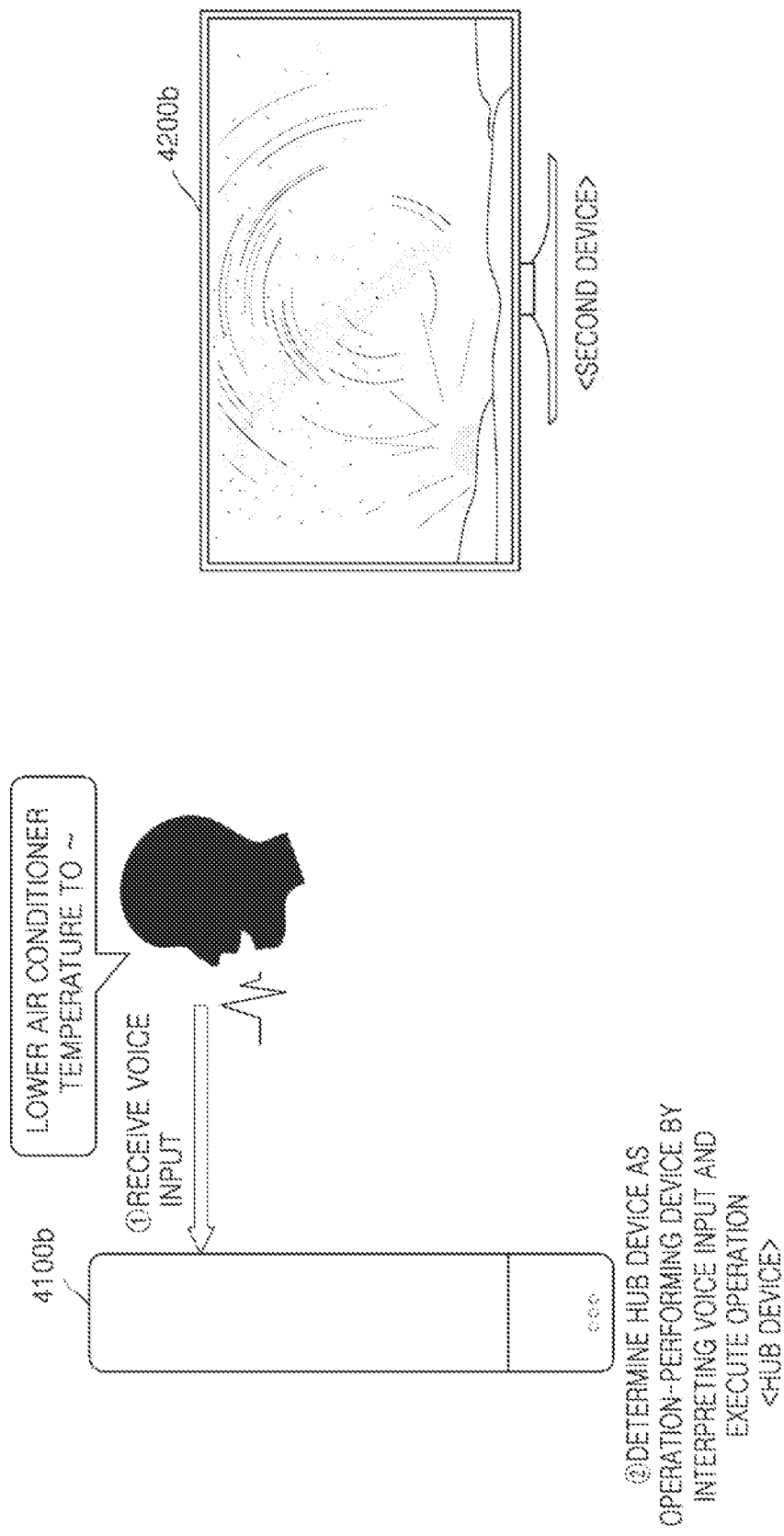
FIG. 12B is a conceptual diagram of a hub device and a second device, according to an embodiment.

FIG. 12B is a conceptual diagram showing operations of a hub device and a second device according to an embodiment.

Arrows of FIG. 12B indicate movement, transmission, and reception of data including a voice signal and text between a first device 4100b and a second device 4200b. Circled numbers indicate an order of operations.

Like in FIG. 12A, the first device 4100b and the second device 4200b of FIG. 12B may be connected to each other by using a wired or wireless communication method and may perform data communication.

Referring to FIG. 12B, the first device 4100b may be a listener device that receives a voice input from a user, and may be a hub device that determines an operation-performing device by interpreting the received voice input and controls the determined operation-performing device to perform an operation.

In FIG. 12B, the first device 4100b receives a voice input such as "lower the air conditioner temperature to 20° C." from the user (step ①).

The first device 4100b determines a hub device as an operation-performing device by interpreting the voice input and executes an operation (step ②). A method by which the first device 4100b that is a hub device converts a voice input into text, determines an operation-performing device by interpreting the converted text, obtains operation information for performing an operation of the operation-performing device, and executes an operation based on the obtained operation information is the same as a method of the first device 4100a of FIG. 12A, and thus a repeated explanation will be omitted.

In FIGS. 12A and 12B, operation-performing devices related to an utterance intention for an operation executed by the user through a specific device, for example, an intent for an operation of lowering a set temperature of an air conditioner, are both the first device 4100a and 4100b. However, because the first device 4100a is a listener device in FIG. 12A, the first device 4100a may not determine an operation-performing device by directly interpreting a voice input, and thus a process of transmitting a voice signal to the second device 4200a that is a hub device and receiving text from the second device 4200a is further required. However, because the first device 4100b is a hub device in FIG. 12B, an unnecessary process of transmitting a voice signal to the second device 4200b or receiving text from the second device 4200b is omitted. Accordingly, in FIG. 12B, a latency may be less than that in FIG. 12, and an utterance processing time may be less than that in FIG. 12A. An 'utterance processing time' refers to a time from when a user's utterance is received to when operation execution is completed. In an embodiment, an utterance processing time may refer to a time from when a user's utterance is received to when an operation execution completion message is output.

In an embodiment, a device that is more frequently used by a user among a plurality of device and requires a short utterance processing time may be determined as a hub device. Also, when there is a first device that is more frequently used by a user than a second device currently used as a hub device and requires a short utterance processing time, the hub device may be changed by being replaced with the first device. In FIGS. 12A and 12B, because a frequency of using an air conditioner in the summer increases and thus a frequency of utterance related to air conditioner control increases, considering a frequency of use and an utterance processing time, the second device 4200a that is a TV may no longer be used as a hub device and the first device 4100b that is an air conditioner (see FIG. 12B) may be used instead as a hub device, to reduce a latency. Also, a hub device may be replaced with another device in an exceptional situation where the hub device may not operate normally, such as a device currently used as the hub device is turned off or network connection is lost, to flexibly cope with the exceptional situation.

In an embodiment, a hub device may be periodically changed by periodically obtaining information about an utterance processing time and a frequency of use of each of a plurality of devices periodically according to a preset time interval and comparing an utterance processing time and a frequency of use of a device currently used as the hub device with the obtained information.

Figure 13:
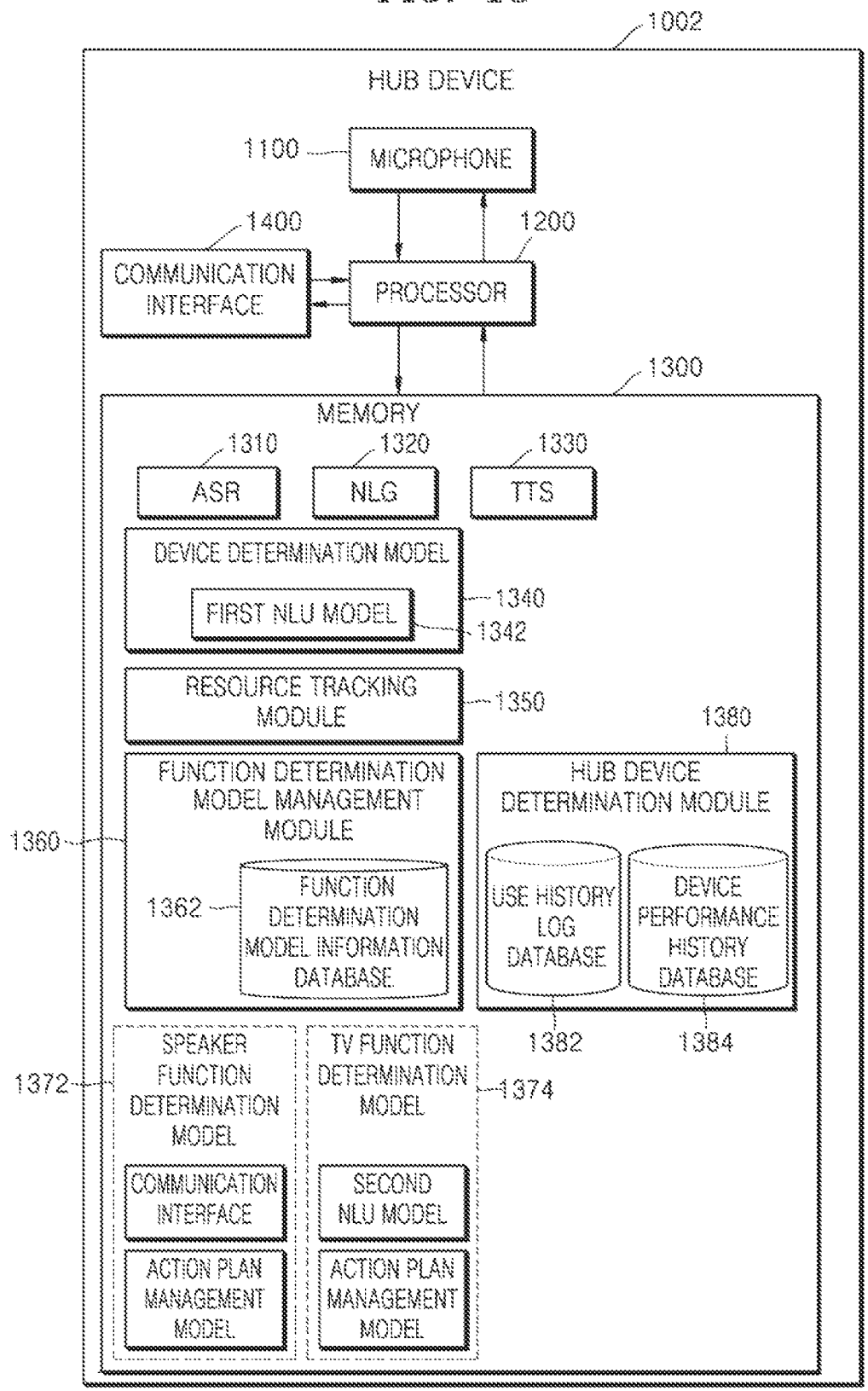
FIG. 13 is a block diagram of a hub device according to an embodiment.

FIG. 13 is a block diagram of a hub device 1002 according to an embodiment.

The hub device 1002 is a device that receives a voice input of a user and controls at least one of the plurality of devices 4000 based on the received voice input. The hub device 1002 may be a listener device that receives the voice input from the user.

Referring to FIG. 13, the hub device 1002 may include at least the microphone 1100, the processor 1200, the memory 1300, and the communication interface 1400. The microphone 1100, the processor 1200, and the communication interface 1400 from among elements of the hub device 1002 are respectively the same as those illustrated in FIG. 2, and thus a repeated explanation will be omitted.

The memory 1300 may store data about the ASR module 1310, data about the NLG module 1320, data about the TTS module 1330, data about the device determination model 1340, data about the resource tracking module 1350, data about the function determination model management module 1360, data about the plurality of function determination models 1370, and data about a hub device determination module 1380. The ASR module 1310, the NLG module 1320, the TTS module 1330, the device determination model 1340, the resource tracking module 1350, the function determination model management modules 1360, and the plurality of function determination models 1370 are the same as those illustrated in FIG. 2, and thus a repeated explanation will be omitted.

The hub device determination module 1380 is a module configured to determine, as a hub device, one of the hub device 1002 and the plurality of devices 4000 (see FIG. 5) pre-registered in the IoT server 3000 (see FIG. 4) according to a user account logged into the hub device 1002. The hub device determination module 1380 may include data, instructions, or program code configured to select at least one hub device candidate from among the plurality of devices 4000, determine one device from among the at least one hub device candidate based on use history information and performance information of each of the at least one hub device candidate, and change a hub device by replacing the current hub device 1002 with the determined device.

The processor 1200 may select at least one hub device candidate from among the plurality of devices 4000 by using data or program code about the hub device determination module 1380. In an embodiment, the processor 1200 may obtain at least one information from among consistency of power supply, computing power, or a power consumption amount of each of the plurality of devices 4000 by using the data or program code about the hub device determination module 1380, and may select at least one hub device candidate from among the plurality of devices 4000 based on at least one of consistency of power supply, the computing power, or the power consumption amount. Consistency of power supply refers to whether the power supplied to each of the plurality of device 400 is constant and continuous.

The processor 1200 may obtain use history information and performance information of each of at least one hub device candidate by using the data or program code about the hub device determination module 1380, and may determine one device from among the at least one hub device candidate based on the obtained use history information and performance information. The processor 1200 may change a hub device by replacing the current hub device 1002 with the determined device. For example, when the current hub device 1002 is a TV, the processor 1200 may determine an air conditioner from among the plurality of devices 4000 as a new hub device by using data about the hub device determination module 1380, and may change the hub device 1002 by replacing a TV that is the current hub device 1002 with the air conditioner.

The hub device determination module 1380 may include a use history log database 1382 and a device performance history database 1384. Although the use history log database 1382 and the device performance history database 1384 are included in the hub device determination module 1380 in FIG. 13, the disclosure is not limited thereto. In an embodiment, the use history log database 1382 and the device performance history database 1384 may not be included in the hub device determination module 1380, and may be stored in the memory 1300.

In another embodiment, at least one of the use history log database 1382 or the device performance history database 1384 may not be included in the hub device 1002, and may include an external database. In this case, the hub device 1002 may access at least one of the use history log database 1382 or the device performance history database 1384 through a network.

The use history log database 1382 is a database storing information about a frequency of use and a recent use history of each of the hub device 1002 and the plurality of devices 4000 in the form of a log. The use history log database 1382 may store, in the form of a log, at least one data from among a frequency at which each of the hub device 1002 and the plurality of devices 4000 is used by a user as a listener device, a frequency at which each of the hub device 1002 and the plurality of devices 4000 is used as an operation-performing device, a recent use history in which each of the hub device 1002 and the plurality of devices 4000 is used as a listener device, or a recent use history in which each of the hub device 1002 and the plurality of devices 4000 is used as an operation-performing device. The use history log database 1382 may store, for example, a voice input frequently received from the user or text converted from the voice input.

The device performance history database 1384 is a database storing performance history information of each of the hub device 1002 and the plurality of devices 4000 in the form of a log. The device performance history database 1384 may store, for example, data about an utterance processing time of each of the hub device 1002 and the plurality of devices 4000 in the form of a log. An 'utterance processing time' refers to a time from when a device receives a user's utterance to when operation execution is completed. In an embodiment, an utterance processing time may refer to a time from when a user's utterance is received to when an operation execution completion message is output. An utterance processing time is inversely proportional to the performance of a device. For example, as an utterance processing time decreases, the performance of a device increases.

In an embodiment, the hub device 1002 may obtain information about a simulation result of an utterance processing time from each of the plurality of devices 4000. In an embodiment, each of the plurality of devices 4000 may determine an operation-performing device by interpreting text of a user's utterance such as "lower the air conditioner temperature to 20° C." or "play the movie the Avengers on TV", may obtain operation information about an operation to be performed by the determined operation-performing device, may generate a control command by using the obtained operation information, and may simulate an utterance processing time required for the operation-performing device to execute an operation based on the generated control command. In an embodiment, each of the plurality of devices 4000 may simulate an utterance processing time by using a background process. The 'background process' refers to a process executed by the device itself in a background environment without user intervention. Each of the plurality of devices 4000 may transmit a simulation result to the hub device 1002. The hub device 1002 may store the simulation result of the utterance processing time obtained from each of the plurality of devices 4000 in the device performance history database 1384.

The processor 1200 may obtain information about a frequency of use of each of the hub device 1002 and at least one device candidate, by analyzing the use history log database 1382 by using the data or program code of the hub device determination module 1380. Also, the processor 1200 may obtain information about a utterance processing time of each of the hub device 1002 and the at least one hub device candidate, by analyzing the device performance history database 1384 by using the data or program code of the hub device determination module 1380. The processor 1200 may determine a device for replacing the current hub device 1002 based on the information about the frequency of use and the information about the utterance processing time of each of the hub device 1002 and the at least one hub device candidate. The processor 1200 may change the hub device 1002 to a second device, by replacing a first device used as the current hub device 1002 with the newly determined second device by using the data or program code of the hub device determination module 1380. A method by which the processor 1200 changes the hub device 1002 based on the information about the frequency of use and the information about the utterance processing time will be described in detail with reference to FIG. 15.

However, the disclosure is not limited to the processor 1200 that changes the hub device 1002 based on the information about the frequency of use and the information about the utterance processing time. In an embodiment, the hub device 1002 may receive a user input that selects one of the plurality of devices 4000, and may determine the selected device as a hub device based on the received user input. For example, the hub device 1002 may receive a voice input of a user that selects one of the plurality of devices 4000 through the microphone 1100, and the processor 1200 may convert the voice input into text by using data of the ASR module 1310 and may identify the device intended by the user by interpreting the text by using data of the first NLU model 1342. The processor 1200 may change a hub device to the identified device.

Figure 14:
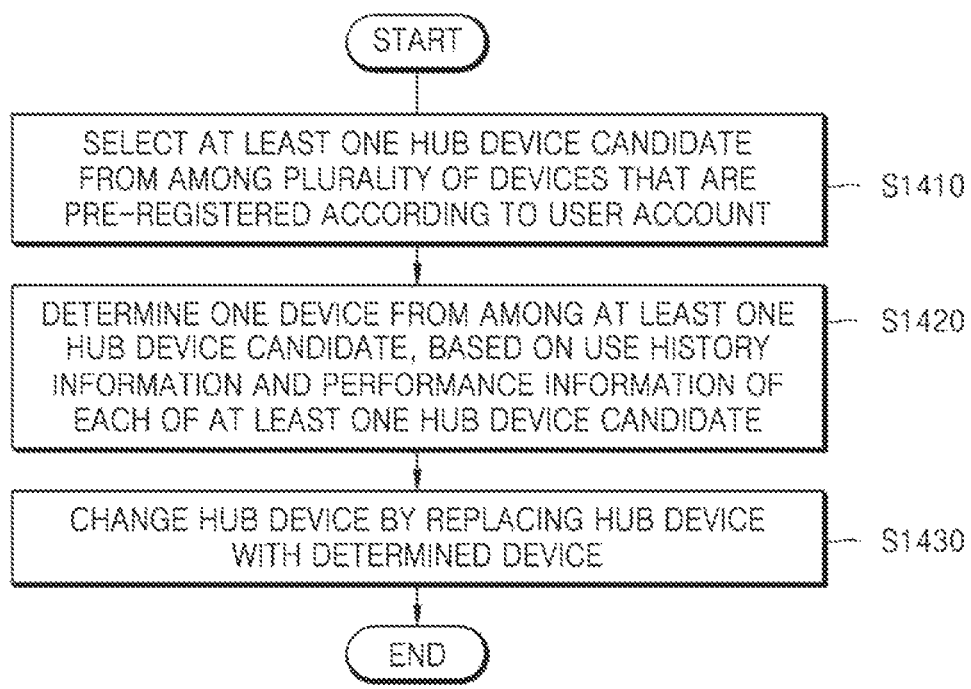
FIG. 14 is a flowchart of an operating method of a hub device according to an embodiment.

FIG. 14 is a flowchart of an operating method of the hub device 1002 according to an embodiment.

In operation S1410, the hub device 1002 selects at least one hub device candidate from among a plurality of devices 4000 (see FIG. 5) that are pre-registered according to a user account. In an embodiment, the hub device 1002 may obtain at least one information from among consistency of power supply, computing power, or a power consumption amount of each of the plurality of devices 4000 that are pre-registered in the IoT server 3000 (see FIG. 4) according to a user account logged into the hub device 1002 and are connected through a network to the hub device 1002, and may determine at least one hub device candidate from among the plurality of devices 4000 based on at least one of consistency of power supply, the computing power, or the power consumption amount.

In operation S1420, the hub device 1002 determines one device from among the at least one hub device candidate, based on use history information and performance information of each of the at least one hub device candidate.

In an embodiment, the hub device 1002 may obtain information about a frequency of use of each of the hub device 1002 and the at least one hub device candidate by analyzing the use history log database 1382 (see FIG. 13) stored in the memory 1300 (see FIG. 13). The hub device 1002 may obtain at least one use history information from, for example, a frequency at which each of the hub device 1002 and the at least one hub device candidate is used by a user as a listener device, a frequency at which each of the hub device 1002 and the at least one hub device candidate is used as an operation-performing device, a recent use history in which each of the hub device 1002 and the at least one hub device candidate is used as a listener device, and a recent use history in which each of the hub device 1002 and the at least one hub device candidate is used as an operation-performing device, from the use history log database 1382.

In an embodiment, the hub device 1002 may obtain performance history information of each of the hub device 1002 and the at least one hub device candidate by analyzing the device performance history database 1384 (see FIG. 13) stored in the memory 1300. The hub device 1002 may obtain, for example, information about an utterance processing time of each of the hub device 1002 and the at least one hub device candidate from the device performance history database 1384. An 'utterance processing time' refers to a time from when a user's utterance is received to when operation execution is completed. In an embodiment, an utterance processing time may refer to a time from when a user's utterance is received to when an operation execution completion message is output.

In an embodiment, the hub device 1002 may determine one device for replacing the hub device 1002 from among the at least one hub device candidate, by comparing frequency of use and utterance processing time of the at least one hub device candidate with a frequency of use and an utterance processing time of the current hub device 1002. For example, the hub device 1002 may determine one device from among the at least one hub device candidate, by comparing a largest value from among a frequency of use of the at least one hub device candidate with the frequency of use of the current hub device 1002 and comparing a smallest value from among an utterance processing time of the at least one hub device candidate with the utterance processing time of the current hub device 1002. A detailed method of determining one device from among the at least one hub device candidate will be described below in detail with reference to operations S1510 through S1550 of FIG. 15.

In operation S1430, the hub device 1002 changes the hub device 1002 by replacing the current hub device 1002 with the determined device. For example, when the current hub device 1002 is a TV, the hub device 1002 may change the hub device 1002 by replacing the TV with an air conditioner that is determined from among the at least one hub device candidate.

Figure 15:
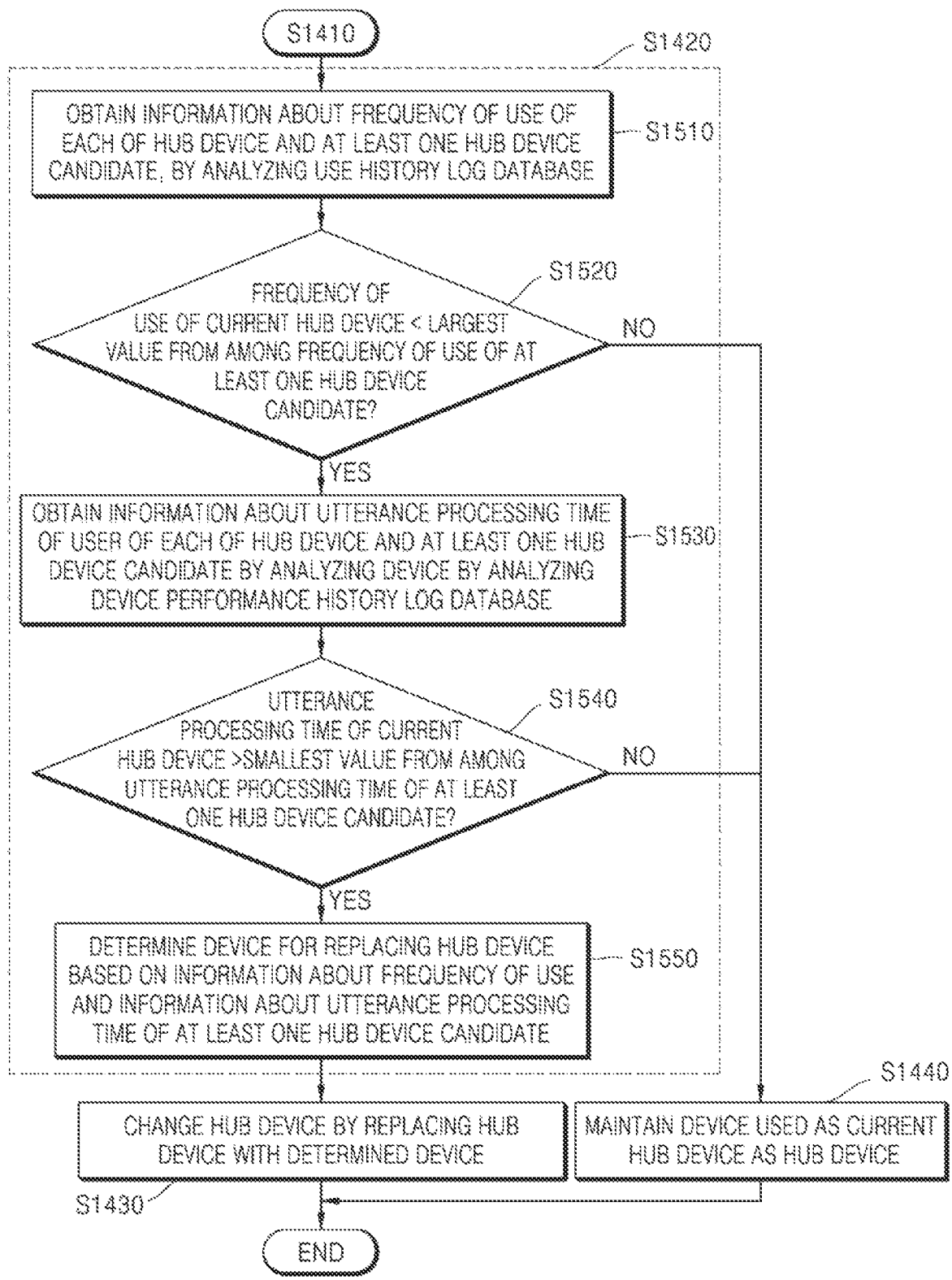
FIG. 15 is a flowchart of an operating method of a hub device according to an embodiment.

FIG. 15 is a flowchart of an operating method of the hub device 1002 according to an embodiment.

Operations S1510 through S1550 of FIG. 15 are detailed operations of operation S1420 of FIG. 14. Operation S1510 of FIG. 15 is performed after operation S1410 of FIG. 14.

In operation S1510, the hub device 1002 obtains information about a frequency of use of each of the hub device 1002 and at least one hub device candidate, by analyzing the use history log database 1382 (see FIG. 13). In an embodiment, the processor 1200 (see FIG. 13) of the hub device 1002 may access the use history log database 1382 stored in the memory 1300 (see FIG. 13), and may obtain information about a frequency of use including at least one of a frequency at which each of the hub device 1002 and the at least one hub device candidate is used by a user as a listener device or a frequency at which each of the hub device 1002 and the at least one hub device candidate is used as an operation-performing device by analyzing the use history log database 1382. Also, the processor 1200 may obtain information about a recent use history including at least one of a recent use history in which each of the hub device 1002 and the at least one hub device candidate is used as a listener device or a recent use history in which each of the hub device 1002 and the at least one hub device candidate is used as an operation-performing device by analyzing the use history log database 1382.

In operation S1520, the hub device 1002 compares a frequency of use of the current hub device 1002 with a largest value from among a frequency of use of the at least one hub device candidate, and determines whether the frequency of use of the hub device 1002 is equal to or less than the largest value from among the frequency of use of the at least one hub device candidate. When there is only one hub device candidate, the hub device 1002 may determine whether a frequency of use of a device used as the current hub device 1002 is less than a frequency of use of the hub device candidate.

When it is determined that the frequency of use of the device used as the current hub device 1002 is less than the largest value from among the frequency of use of the at least one hub device candidate (operation S1530), the hub device 1002 obtains information about an utterance processing time of each of the hub device 1002 and the at least one hub device candidate by analyzing the device performance history database 1384 (see FIG. 13). In an embodiment, the processor 1200 may access the device performance history database 1384 stored in the memory 1300, and may obtain the information about the utterance processing time of each of the hub device 1002 and the at least one hub device candidate by analyzing the device performance history database 1384. An 'utterance processing time' refers to a time from when a device receives a user's utterance to when operation execution is completed. In an embodiment, an utterance processing time may refer to a time from a time when a user's utterance is received to a time when an operation execution completion message is output. An utterance processing time is inversely proportional to the performance of a device. For example, as an utterance processing time decreases, the performance of a device increases.

In operation S1540, the hub device 1002 determines whether the utterance processing time of the current hub device 1002 is equal to or greater than a smallest value from among the utterance processing time of the at least one hub device candidate by comparing the utterance processing time of the device used as the current hub device 1002 with the smallest value from among the utterance processing time of the at least one hub device candidate. When there is only one hub device candidate, the hub device 1002 may determine whether the utterance processing time of the device used as the current hub device 1002 is greater than an utterance processing time of the hub device candidate.

When it is determined that the utterance processing time of the device used as the current hub device 1002 is greater than the smallest value from among the utterance processing time of the at least one hub device candidate (operation S1550), the hub device 1002 may determine a device for replacing the hub device 1002 based on information about a frequency of use and information about a utterance processing time of the at least one hub device candidate. In an embodiment, the hub device 1002 may determine a device having a largest frequency at which the device is used as at least one of a listener device or an operation-performing device from among the at least one hub device candidate and requiring a shortest utterance processing time as a device for replacing the hub device 1002. In one embodiment, although the hub device 1002 considers both a frequency of use and an utterance processing time together, the hub device 1002 may place a greater weight on the frequency of use to determine a device for replacing the hub device 1002. For example, the hub device 1002 may first select one or more devices having a large frequency of use from among the at least one hub device candidate, and then may determine a device having a shortest utterance processing time from among the selected one or more devices.

However, the disclosure is not limited thereto, and the hub device 1002 may first select one or more devices requiring an utterance processing time less than a preset threshold time from among the at least one hub device candidate, and then may determine a device having a largest frequency of use from among the selected one or more devices.

In operation S1430, the hub device 1002 changes a hub device by replacing the device used as the current hub device 1002 with the determined device.

In operation S1520, when the frequency of use of the current hub device is greater than the largest value from among the frequency of use of the at least one hub device candidate (operation S1440), the device used as the current hub device 1002 is maintained as a hub device. Likewise, in operation S1540, when the utterance processing time of the current hub device 1002 is equal to or less than the smallest value from among the utterance processing time of the at least one hub device candidate (operation S1440), the device used as the current hub device 1002 is maintained as a hub device. When the frequency of use of the device used as the current hub device 1002 is greater than a frequency of use of another device and the utterance processing time of the device used as the current hub device 1002 is less than an utterance processing time of the device, a hub device does not need to be changed, and thus the device used as the hub device 1002 is maintained.

Figure 16:
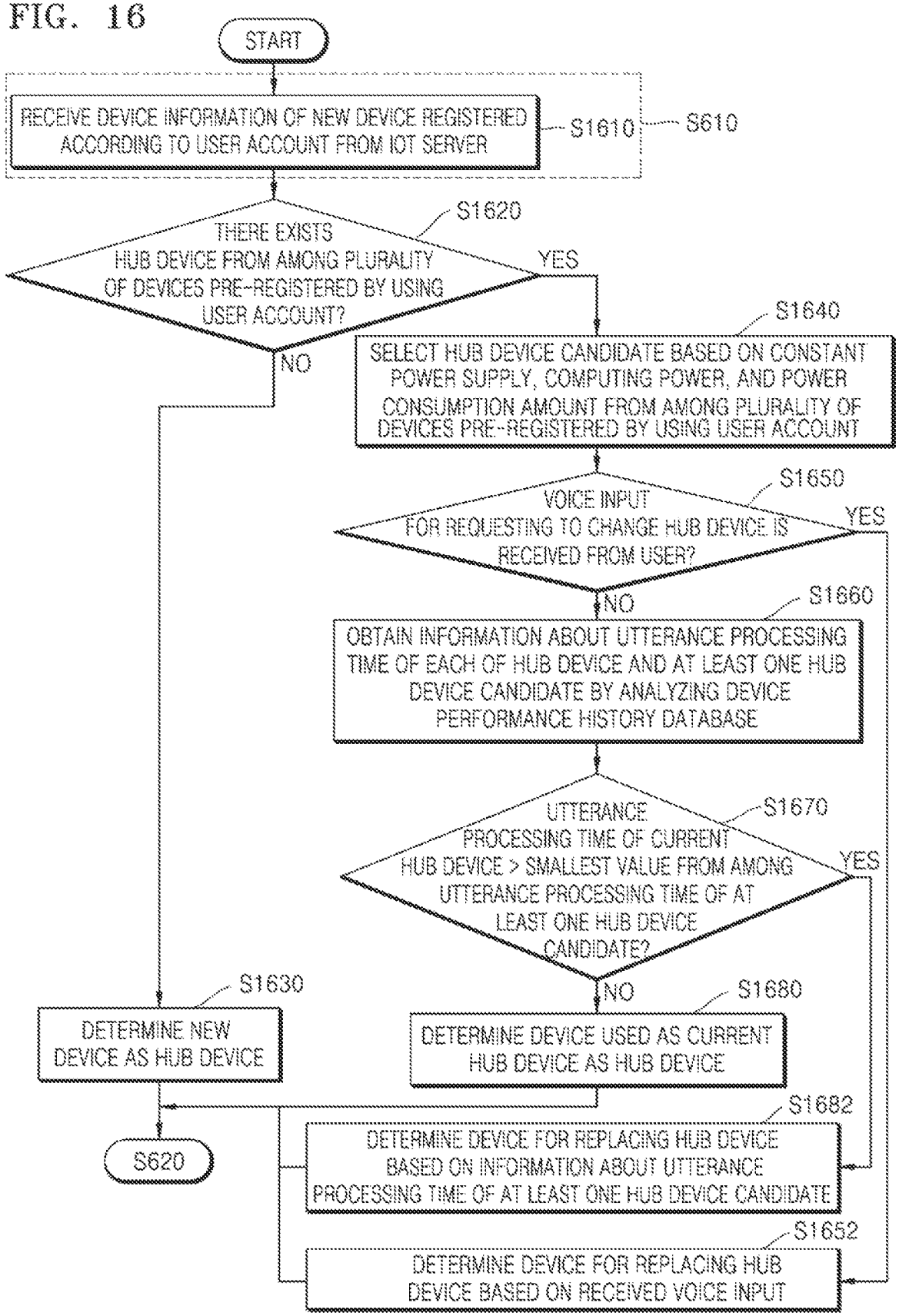
FIG. 16 is a flowchart of an operating method of a hub device according to an embodiment.

FIG. 16 is a flowchart of an operating method of the hub device 1002 according to an embodiment.

Operations S1610 through S1690 of FIG. 16 are operations performed between operations S610 and S620 of FIG. 6. Operation S1610 is the same as operation S610 of FIG. 6. After operations S1630, S1652, S1680, and S1682 are performed, operation S620 is performed.

In operation S1610, the hub device 1002 receives device information of a new device registered according to a user account from the IoT server 3000 (see FIG. 4). The new device refers to a device that is newly obtained by a user of the hub device 1002 through purchase or ownership transfer, and is registered in the IoT server 3000 by being logged in by using the same user account as that of the hub device 1002. The device information of the new device received by the hub device 1002 may include at least one of, for example, identification information (e.g., device id information) of the new device, a device type of the new device, function execution capability information of the new device, or position information. In an embodiment, the hub device 1000 may receive state information about power on/off of the new device or an operation that is being currently executed.

The hub device 1002 may receive the device information of the new device from the IoT server 3000. However, the disclosure is not limited thereto, and the hub device 1002 may receive the device information of the new device from the voice assistant server 2000 (see FIG. 2).

In operation S1620, the hub device 1002 determines whether there exists a hub device from among a plurality of devices that are pre-registered by using the user account. In an embodiment, the hub device 1002 may be determined by the voice assistant server 2000 (see FIG. 3) based on resource state information of the plurality of devices pre-registered in the IoT server 3000 according to the same user account as the user account logged into the hub device 1002. In an embodiment, the hub device may be a device including the device determination model 1340 (see FIG. 2) from among the plurality of devices and capable of determining an operation-performing device by interpreting a voice input received from the user.

When it is determined that there does not exist a hub device from among the plurality of devices (operation S1630), the new device is determined as the hub device 1002.

When it is determined that there exists the hub device 1002 from among the plurality of devices (operation S1640), the hub device 1002 selects a hub device candidate based on constant power supply, computing power, and a power consumption amount from among the plurality of devices pre-registered by using the user account. In an embodiment, the hub device 1002 may determine one or more hub device candidates from among the plurality of devices. Operation S1640 is the same as operation S1410 of FIG. 14, and thus a repeated explanation will be omitted.

In operation S1650, the hub device 1002 determines whether a voice input for requesting to change the hub device is received from the user. For example, when a device used as the current hub device 1002 is a TV, the hub device 1002 may receive a voice input for requesting to change a hub device such as "change the air conditioner as a hub device". However, the disclosure is not limited to reception of a voice input, and the hub device 1002 may receive, from the user, an input through a manipulation device such as a mouse or a keyboard or a touch input which changes a hub device by replacing the device used as the current hub device 1002 as the new device.

When the voice input for requesting to change the hub device is received (operation S1652), the hub device 1002 determines a device for replacing the hub device 1002 based on the received voice input. The hub device 1002 may convert the voice input into text, may identify a name or a type of the device intended by the user by interpreting the text by using an NLU model, and may determine the identified device as a device for replacing the hub device 1002. In an embodiment, the processor 1200 (see FIG. 13) of the hub device 1002 may convert the received voice input into the text by using data or program code about the ASR module 1310 (see FIG. 13), may parse the text in units of words or phrases by using data or the program code about the first NLU model 1342 (see FIG. 13), may recognize a word or a phrase specifying a name of the device, a common name, or an installation position of a device, and may identify the device from the recognized word or phrase. The hub device 1002 may determine the identified device as the device for replacing the hub device 1002.

When the voice input for requesting to change the hub device is not received from the user (operation S1660), the hub device 1002 obtains information about an utterance processing time of each of the hub device 1002 and at least one hub device candidate by analyzing the device performance history database 1384 (see FIG. 13).

In operation S1670, the hub device 1002 determines whether the utterance processing time of the current hub device 1002 is greater than a smallest value from among the utterance processing time of the at least one hub device candidate by comparing an utterance processing time of the device used as the current hub device 1002 with the smallest value from among the utterance processing time of the at least one hub device candidate.

Operations S1660 and S1670 are respectively the same as operations S1530 and S1540 of FIG. 15, and thus a repeated explanation will be omitted.

When the utterance processing time of the device used as the current hub device 1002 is equal to or less than the smallest value from among the utterance processing time of the at least one hub device candidate (operation S1680), the device used as the current hub device 1002 is determined as the hub device 1002.

When it is determined that the utterance processing time of the device used as the current hub device 1002 is greater than the smallest value from among the utterance processing time of the at least one hub device candidate (operation S1682), the hub device 1002 determines a device for replacing the hub device 1002 based on information about the utterance processing time of the at least one hub device candidate. In an embodiment, the hub device 1002 may determine a device having a shortest utterance processing time from among the at least one hub device candidate as the device for replacing the hub device 1002.

In operation S620, the determined hub device 1002 request the voice assistant server 2000 to update the device determination model 1340 (see FIG. 13) stored in the hub device 1002.

FIG. 17 is a diagram of a network environment including the hub device 1000, the plurality of devices 4000, and the voice assistant server 2000 according to an embodiment.

Referring to FIG. 17, the hub device 1000, the plurality of devices 4000, the voice assistant server 2000, and the IoT server 3000 may be connected by using a wired or wireless communication method, and may perform communication. In an embodiment, the hub device 1000 and the plurality of devices 4000 may be directly connected to each other through a communication network, but the disclosure is not limited thereto.

The hub device 1000 and the plurality of devices 4000 may be connected to the voice assistant server 2000, and the hub device 1000 may be connected to the plurality of devices 4000 through a server. Also, the hub device 1000 and the plurality of devices 4000 may be connected to the IoT server 3000. In another embodiment, each of the hub device 1000 and the plurality of devices 4000 may be connected to the voice assistant server 2000 through a communication network, and may be connected to the IoT server 3000 through the voice assistant server 2000. In another embodiment, the hub device 1000 may be connected to the plurality of devices 4000, and the hub device 1000 may be connected to the plurality of devices 4000 through one or more nearby access points. Also, the hub device 1000 may be connected to the plurality of devices 4000 in a state where the hub device 1000 is connected to the voice assistant server 2000 or the IoT server 3000.

The hub device 1000, the plurality of devices 4000, the voice assistant server 2000, and the IoT server 3000 may be connected through a local area network (LAN), a wide area network (WAN), a value-added network (VAN), a mobile radio communication network, a satellite communication network, or a combination thereof. Examples of the wireless communication method may include, but are not limited to, Wi-Fi, Bluetooth, Bluetooth low energy (BLE), Zigbee, Wi-Fi Direct (WFD), Ultra-wideband (UWB), Infrared Data Association (IrDA), and Near-Field Communication (NFC).

In an embodiment, the hub device 1000 may receive a voice input of a user. At least one of the plurality of devices 4000 may be a target device that receives a control command of the voice assistant server 2000 and/or the IoT server 3000 and performs a specific operation. At least one of the plurality of devices 4000 may be controlled to perform a specific operation based on the voice input of the user received by the hub device 1000. In an embodiment, at least one of the plurality of devices 4000 may receive a control command from the hub device 1000, without receiving a control command from the voice assistant server 2000 and/or the IoT server 3000.

The hub device 1000 may receive a voice input (e.g., an utterance) from the user. In an embodiment, the hub device 1000 may include an ASR model. In an embodiment, the hub device 1000 may include an ASR model having a limited function. For example, the hub device 1000 may include an ASR model having a function of detecting a designated voice input (e.g., a wake-up input such as 'Hi, Bixby' or 'OK, Google') or a function of pre-processing a voice signal obtained from part of a voice input. Although the hub device 1000 is an AI speaker in FIG. 17, the disclosure is not limited thereto. In an embodiment, one of the plurality of devices 4000 may be the hub device 1000. Also, the hub device 1000 may include a first NLU model, a second NLU model, and an NLG model. In this case, the hub device 1000 may receive a voice input of the user through a microphone, or may receive a voice input of the user from at least one of the plurality of devices 4000. When a voice input of the user is received, the hub device 1000 may process the voice input of the user by using the ASR model, the first NLU model, the second NLU model, and the NLG model, and may provide a response to the voice input of the user.

The hub device 1000 may determine a type of the target device for performing an operation intended by the user, based on the received voice signal. The hub device 1000 may receive a voice signal that is an analog signal, and may convert a voice part into computer-readable text by performing automatic speech recognition (ASR). The hub device 1000 may interpret the text by using a first NLU model and may determine the target device based on an interpretation result. The hub device 1000 may determine at least one of the plurality of devices 4000 as the target device. The hub device 1000 may select a second NLU model corresponding to the determined target device from among a plurality of stored second NLU models. The hub device 1000 may determine an operation to be performed by the target device requested by the user by using the selected second NLU model. When it is determined that there is no second NLU model corresponding to the determined target device from among the plurality of stored second NLU models, the hub device 1000 may transmit at least part of the text to at least one of the plurality of devices 4000 or the voice assistant server 2000. The hub device 1000 transmits information about the determined operation to the target device so that the determined target device executes the determined operation.

The hub device 1000 may receive information of the plurality of devices 4000 from the IoT server 3000. The hub device 1000 may determine the target device by using the received information of the plurality of devices 4000. Also, the hub device 1000 may control the target device to execute the determined operation, by using the IoT server 3000 as a relay server for transmitting the information about the determined operation.

The hub device 1000 may receive a voice input of the user through the microphone, and may transmit the received voice input to the voice assistant server 2000. In an embodiment, the hub device 1000 may obtain a voice signal from the received voice input, and may transmit the voice signal to the voice assistant server 2000.

In FIG. 17, the plurality of devices 4000 include, but are not limited to, the first device 4100 that is an air conditioner, the second device 4200 that is a TV, the new device 4300 that is a washing machine, and a fourth device 4400 that is a refrigerator. For example, the plurality of devices 4000 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. In an embodiment, the plurality of devices 4000 may be home appliances. The home appliances may include at least one of a TV, a digital video disk (DVD) player, an audio device, a refrigerator, an air conditioner, a cleaner, an oven, a microwave oven, a washing machine, an air purifier, a set-top box, a home automation control panel, a security control panel, a game console, an electronic key, a camcorder, or an electronic picture frame.

The voice assistant server 2000 may determine a type of the target device for performing an operation intended by the user, based on the received voice signal. The voice assistant server 2000 may receive a voice signal that is an analog signal from the hub device 1000, and may convert a voice part into computer-readable text by performing automatic speech recognition (ASR). The voice assistant server 2000 may interpret the text by using a first NLU model, and may determine the target device based on an interpretation result. Also, the voice assistant server 2000 may receive at least part of the text and information about the target device determined by the hub device 1000 from the hub device 1000. In this case, the hub device 1000 converts the voice signal into text by using an ASR model and a first NLU model of the hub device 1000, and determines the target device by interpreting the text. Also, the hub device 1000 transmits at least part of the text and information about the determined target device to the voice assistant server 2000.

The voice assistant server 2000 may determine an operation to be performed by the target device requested by the user by using a second NLU model corresponding to the determined target device. The voice assistant server 2000 may receive information of the plurality of devices 4000 from the IoT server 3000. The voice assistant server 2000 may determine the target device by using the received information of the plurality of devices 4000. Also, the voice assistant server 2000 may control the target device to execute the determined operation by using the IoT server 3000 as a relay server for transmitting information about the determined operation. The IoT server 3000 may store the information about the plurality of devices 4000 that are connected through a network and are pre-registered. In an embodiment, the IoT server 3000 may store at least one of identification information (e.g., device id information) of the plurality of devices 4000, a device type of each of the plurality of devices 4000, or function execution capability information of each of the plurality of devices 4000.

In an embodiment, the IoT server 3000 may store state information about power on/off of each of the plurality of devices 4000 or an operation that is being executed. The IoT server 3000 may transmit a control command for executing the determined operation to the target device from among the plurality of devices 4000. The IoT server 3000 may receive the information about the determined target device and the information about the determined operation from the voice assistant server 2000, and may transmit the control command to the target device based on the received information.

Figure 18A:
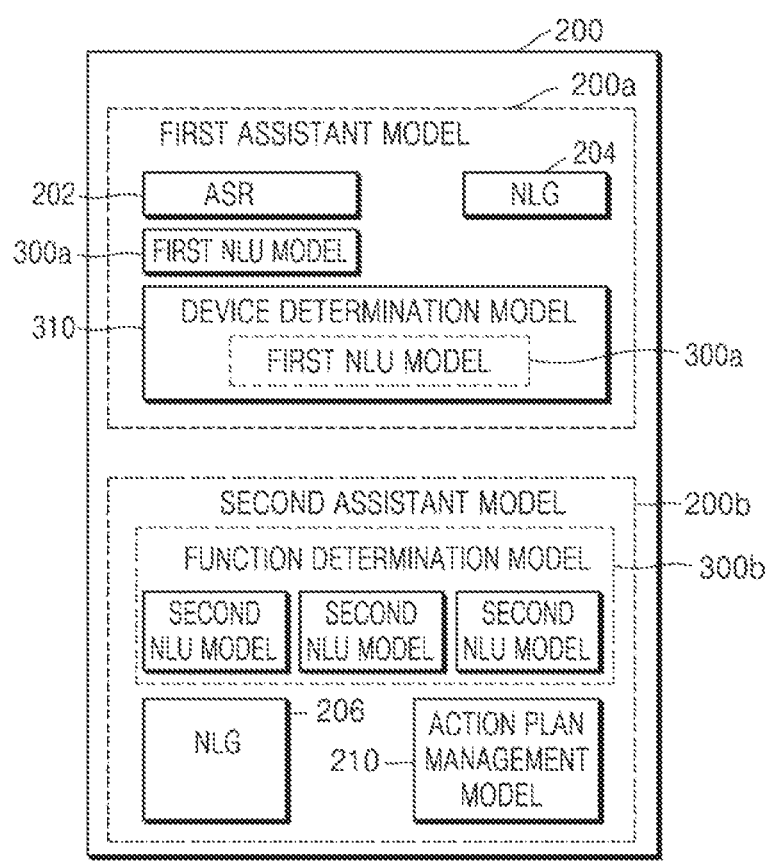
FIG. 18A is a diagram of a voice assistant model executable by the hub device and the voice assistant server, according to an embodiment.
Figure 18B:
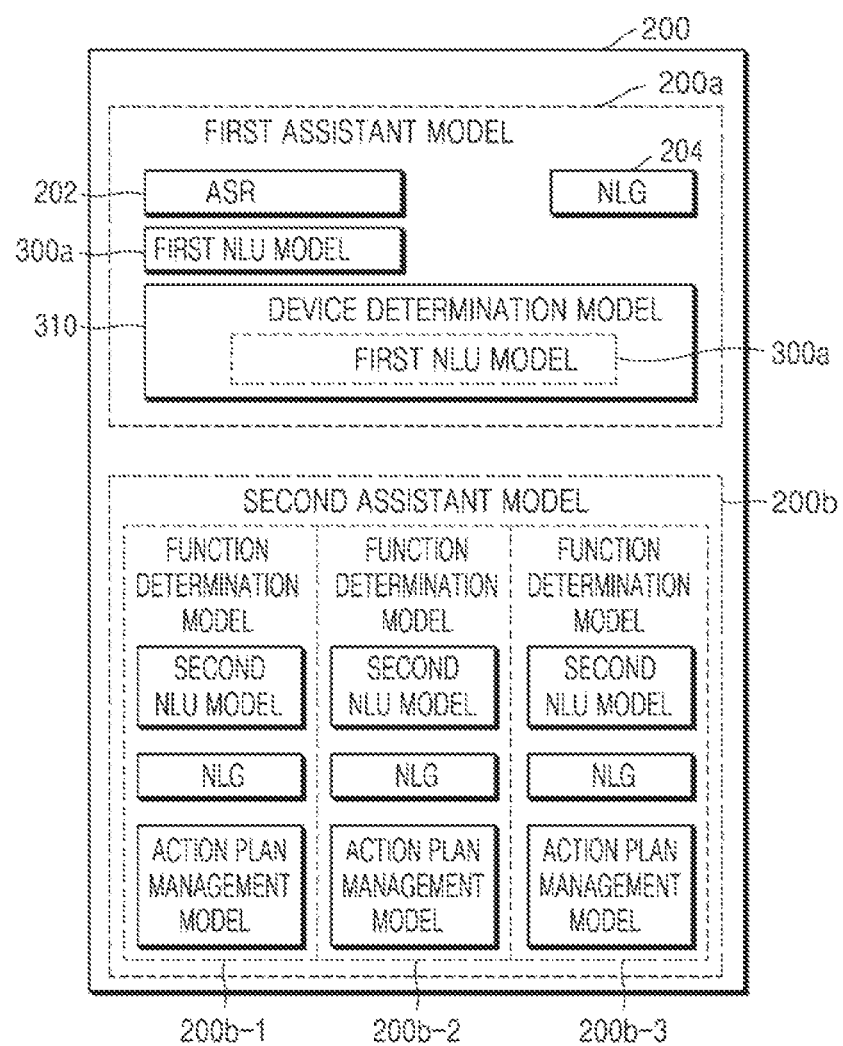
FIG. 18B is a diagram of a voice assistant model executable by the hub device and the voice assistant server, according to an embodiment.

FIGS. 18A and 18B are diagrams of a voice assistant model 200 executable by the hub device 1000 and the voice assistant server 2000 according to an embodiment.

Referring to FIGS. 18A and 18B, the voice assistant model 200 is implemented as software. The voice assistant model 200 may be configured to determine a user's intention from a voice input of the user and control a target device related to the user's intention. When a device controlled through the voice assistant model 200 is added, the voice assistant model 200 may include a first assistant model 200a configured to update an existing model to a new model through learning or the like and a second assistant model 200b configured to add a model corresponding to the added device to the existing model.

The first assistant model 200a is a model that determines the target device related to the user's intention by analyzing the voice input of the user. The first assistant model 200a may include an ASR model 202, an NLG model 204, a first NLU model 300a, and a device determination model 310. In an embodiment, the device determination model 310 may include the first NLU model 300a. In another embodiment, the device determination model 310 and the first NLU model 300a may be configured as separate elements.

The device determination model 310 is a model for performing an operation of determining the target device by using an analysis result of the first NLU model 300a. The device determination model 310 may include a plurality of detailed models, and one of the plurality of detailed models may be the first NLU model 300a. The first NLU model 300a or the device determination model 310 may be an AI model.

When a device controlled through the voice assistant model 200 is added, the first assistant model 200a may update at least the device determination model 310 and the first NLU model 300a through learning. The learning may refer to learning using both training data used to train an existing device determination model and a first NLU model and additional training data related to the added device. Also, the learning may refer to updating the device determination model and the first NLU model by using only the additional training data related to the added device.

The second assistant model 200b that is a model specialized for a specific device is a model that determines an operation to be performed by the target device corresponding to the voice input of the user from among a plurality of operations performable by the specific device. In FIG. 18A, the second assistant model 200b may include a plurality of second NLU models 300b, an NLG model 206, and an action plan management module 210. The plurality of second NLU models 300b may respectively correspond to a plurality of different devices. The second NLU model, the NLG model, and the action plan management model may be models implemented through a rule-based system. In an embodiment, the second NLU model, the NLG model, and the action plan management model may be AI models. A plurality of second NLU models may be elements of a plurality of function determination models.

When a device controlled through the voice assistant model 200 is added, the second assistant model 200b may be configured to add a second NLU model corresponding to the added device. That is, the second assistant model 200b may further include a second NLU model corresponding to the added device in addition to the existing plurality of second NLU models 300b. In this case, the second assistant model 200b may be configured to select a second NLU model corresponding to the determined target device, from among the plurality of second NLU models including the added second NLU model, by using information about the target device determined through the first assistant model 200a.

Referring to FIG. 18B, the second assistant model 200b may include a plurality of action plan management models and a plurality of NLG models. In FIG. 18B, the plurality of second NLU models included in the second assistant model 200b may respectively correspond to the second NLU models 300b of FIG. 18A, each of the plurality of NLG models included in the second assistant model 200b may correspond to the NLG model 206 of FIG. 18A, and each of the plurality of action plan management models included in the second assistant model 200b may correspond to the action plan management model 210 of FIG. 18A.

In FIG. 18B, the plurality of action plan management models may be configured to respectively correspond to the plurality of second NLU models. Also, the plurality of NLG models may be configured to respectively correspond to the plurality of second NLU models. In another embodiment, one NLG model may be configured to correspond to the plurality of second NLU models, and one action plan management model may be configured to correspond to the plurality of second NLU models.

In FIG. 18B, when a device controlled through the voice assistant model 200 is added, the second assistant model 200b may be configured to add a second NLU model, an NLG model, and an action plan management model corresponding to the added device.

In FIG. 18B, when a device controlled through the voice assistant model 200 is added, the first NLU model 300a may be configured to be updated to a new model through learning or the like. Also, when the device determination model 310 includes the first NLU model 300a, the device determination model 310 may be configured so that an existing model is entirely updated to a new model through learning or the like when a device controlled through the voice assistant model 200 is added. The first NLU model 300a or the device determination model 310 may be an AI model. The learning may refer to learning using both training data used to train an existing device determination model and a first NLU model and additional training data related to the added device. Also, the learning may refer to updating the device determination model and the first NLU model by using only the additional training data related to the added device.

In FIG. 18B, when a device controlled through the voice assistant model 200 is added, the second assistant model 200b may be updated by adding a second NLU model, an NLG model, and an action plan management model corresponding to the added device to an existing model. The second NLU model, the NLG model, and the action plan management model may be models implemented through a rule-based system.

In FIG. 18B, the second NLU model, the NLG model, and the action plan management model may be AI models. The second NLU model, the NLG model, and the action plan management model may each be managed as one device according to a corresponding device. In this case, the second assistant model 200b may include a plurality of second assistant models 200b-1, 200b-2, and 200b-3 respectively corresponding to a plurality of devices. For example, a second NLU model corresponding to a TV, an NLG model corresponding to the TV, and an action plan management model corresponding to the TV may be managed as the second assistant model 200b-1 corresponding to the TV. Also, a second NLU model corresponding to a speaker, an NLG model corresponding to the speaker, and an action plan management model corresponding to the speaker may be managed as the second assistant model 200b-2 corresponding to the speaker. Also, a second NLU model corresponding to a refrigerator, an NLG model corresponding to the refrigerator, and an action plan management model corresponding to the refrigerator may be managed as the second assistant model 200b-3 corresponding to the refrigerator.

When a device controlled through the voice assistant model 200 is added, the second assistant model 200b may be configured to add a second assistant model corresponding to the added device. That is, the second assistant model 200b may further include the second assistant model corresponding to the added device in addition to the existing plurality of second assistant models 200b-1 through 200b-3. In this case, the second assistant model 200b may be configured to select a second assistant model corresponding to the determined target device, from among the plurality of second assistant models including the second assistant model corresponding to the added device, by using information about the target device determined by the first assistant model 200a.

A program executed by the hub device 1000, the voice assistant server 2000, and the plurality of devices 4000 according to the disclosure may be realized as hardware components, software components, and/or a combination of hardware components and software components. The program may be executed by any system capable of executing computer-readable instructions.

Software may include a computer program, code, instructions, or a combination of one or more thereof, and may configure a processing device to operate as required or separately or collectively command the processing device.

Software may be implemented in a computer program that includes instructions stored in a computer-readable storage medium. Computer-readable storage media may include, for example, magnetic storage media (e.g., ROM, RAM, floppy disks, hard disks, etc.) and optical reading media (e.g., compact disk (CD)-ROM, DVD, etc.). The computer-readable recording media may be distributed in computer systems connected in a network and may store and execute computer-readable code in a distributed fashion. The media may be computer-readable, may be stored in a memory, and may be executed by a processor.

The computer-readable storage media may be provided in the form of non-transitory storage media. Here, 'non-transitory' means that the storage medium does not include a signal and is tangible, but does not distinguish whether data is stored semi-permanently or temporarily on the storage medium.

Further, the program according to the embodiments may be provided in a computer program product. The computer program product is a product purchasable between a seller and a purchaser.

The computer program product may include a software program and a computer-readable storage medium in which the software program is stored. For example, the computer program product may include a software program-type product (e.g., a downloadable application) electronically distributed by a manufacturer of a device or electronic markets (e.g., Google Play™ store, App Store, etc.). For electronic distribution, at least a portion of the software program may be stored in storage media or temporarily generated. In this case, the storage media may be a server of the manufacturer, a server of the electronic market, or a storage medium of a relay server temporarily storing the software program.

The computer program product may include a storage medium of a server or a storage medium of a device in a system including the server and the device. Alternatively, when there is a third device (e.g., a smartphone) connected with the server or the device for communication, the computer program product may include a storage medium of the third device. Alternatively, the computer program product may include a software program itself transmitted to the device or the third device from the server or to the device from the third device.

In this case, one of the server, the device, and the third device may perform a method according to the embodiments by executing the computer program product. Alternatively, at least two of the server, the device, and the third device may perform the method according to the embodiments in a distributed fashion by executing the computer program product.

For example, the server (e.g., an IoT server or a voice assistant server) may execute the computer program product stored in the server and control the device connected with the server for communication to perform the method according to the embodiments.

As another example, the third device may execute the computer program product and control the device connected to the third device for communication to perform the method according to the embodiments.

When the third device executes the computer program product, the third device may download the computer program product from the server and execute the downloaded computer program product. Alternatively, the third device may execute the computer program product provided in a free-loaded state and perform the method according to the embodiments.

Although the embodiments of the disclosure have been described by the limited embodiments of the disclosure and the drawings as described above, various modifications and variations are possible by one of ordinary skill in the art from the above description. For example, the described techniques may be performed in a different order from the described method, and/or elements of the described computer system, module, etc. may be combined or integrated in a different form from the described method, or may be replaced or substituted by other elements or equivalents to achieve appropriate results.

What is claimed is:

1. A method, performed by a voice assistant server and a hub device, of storing a voice assistant model for controlling a device, the method comprising:
   selecting, by the voice assistant server, the hub device based on use history information and performance information about each of a plurality of devices pre-registered according to a user account;
   after receiving information about a first device, requesting, by the hub device, the voice assistant server to update a device determination model stored in the hub device;
   based on receiving a request to update the device determination model, updating, by the voice assistant server, the device determination model of the hub device;
   receiving, by the hub device, the updated device determination model from the voice assistant server and storing the received updated device determination model;
   requesting, by the hub device, information about a function determination model corresponding to the first device from the voice assistant server;
   obtaining, by the voice assistant server, the information about the function determination model corresponding to the first device;
   transmitting, by the voice assistant server, the information about the function determination model to the hub device;
   receiving, by the hub device, the information about the function determination model corresponding to the first device from the voice assistant server; and
   determining, by the hub device, whether to store the function determination model in the hub device based on the received information.

2. The method of claim 1, further comprising, based on the function determination model being determined to be stored in the hub device, storing, by the hub device, the function determination model corresponding to the first device.

3. The method of claim 1, further comprising, based on the function determination model being determined not to be stored in the hub device, requesting, by the hub device, access information of the function determination model corresponding to the first device from the voice assistant server.

4. The method of claim 3, wherein the access information comprises at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

5. A system comprising a hub device and a voice assistant server, wherein the hub device comprises:
   a communication interface configured to perform data communication with the voice assistant server;
   a memory configured to store a program comprising one or more instructions; and
   a processor configured to execute the one or more instructions of the program stored in the memory to:
      control the communication interface to receive information about a first device and request the voice assistant server to update a device determination model pre-stored in the memory;
      receive the updated device determination model from the voice assistant server, and store the received updated device determination model in the memory;
      request, from the voice assistant server, information about a function determination model corresponding to the first device, and control the communication interface to receive the information about the function determination model corresponding to the first device from the voice assistant server; and
      determine whether to store the function determination model in the hub device based on the received information,
   wherein the voice assistant server is configured to select the hub device based on use history information and performance information about each of a plurality of devices pre-registered according to a user account, wherein the voice assistant server is further configured to, based on a request to update the device determination model being received from the hub device, update the device determination model pre-stored in the hub device, obtain the information about the function determination model corresponding to the first device, and transmit the obtained information to the hub device.

6. The system of claim 5, wherein the processor is further configured to execute the one or more instructions to, based on the function determination model being determined to be stored in the hub device, store the function determination model corresponding to the first device in the memory.

7. The system of claim 5, wherein the processor is further configured to execute the one or more instructions to, based on the function determination model being determined not to be stored in the hub device, request, from the voice assistant server, access information of the function determination model corresponding to the first device, and control the communication interface to receive the access information from the voice assistant server.

8. The system of claim 7, wherein the access information comprises at least one of identification information of the voice assistant server in which the function determination model corresponding to the first device is stored, position information, Internet protocol address information, a media access control address, application programming interface information accessible to the function determination model in the voice assistant server, a use language of the function determination model, or identification information of the first device.

* * * * *